(12) United States Patent
Ota

(10) Patent No.: US 6,570,737 B1
(45) Date of Patent: May 27, 2003

(54) DISK DRIVE APPARATUS

(75) Inventor: Toshiro Ota, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/553,370

(22) Filed: Apr. 20, 2000

(30) Foreign Application Priority Data

Apr. 23, 1999 (JP) .......................................... 11-116902

(51) Int. Cl.[7] .............................................. G11B 21/12
(52) U.S. Cl. .................................. 360/99.02; 360/99.06
(58) Field of Search ................................ 360/317, 266.5, 360/267.5, 266.2, 99.01, 99.02, 99.03, 99.06, 99.07, 254.1, 255.2; 369/13.11, 13.2, 13.21

(56) References Cited

U.S. PATENT DOCUMENTS

| | | | | |
|---|---|---|---|---|
| 5,438,465 A | * | 8/1995 | Noda | 360/254.1 |
| 5,471,356 A | * | 11/1995 | Tsuji | 360/99.03 |
| 5,586,092 A | * | 12/1996 | Seo | 369/13.21 |
| 5,726,832 A | * | 3/1998 | Inagaki et al. | 360/246.1 |
| 5,901,130 A | * | 5/1999 | Fukuyama et al. | 360/99.06 |
| 6,151,190 A | * | 11/2000 | Yamamoto et al. | 360/99.02 |
| 6,256,174 B1 | * | 7/2001 | Shimizu | 360/266.2 |
| 6,353,516 B2 | * | 3/2002 | Nishimoto | 360/255.2 |

* cited by examiner

Primary Examiner—David L. Ometz
Assistant Examiner—Angel Castro
(74) Attorney, Agent, or Firm—Frommer Lawrence & Haug LLP; William S. Frommer; Matthew K. Ryan

(57) ABSTRACT

To perform ejection of a disk cartridge and head loading (landing) and/or unloading (takeoff) with a single driving source and prevent damage to a disk upon head landing and takeoff. A cam protrusion which is an outputting section of a geared motor is moved at a low speed and acts upon a head lifting mechanism by which, by rotation of the geared motor in one direction (CW direction), ejection of a cartridge is performed, but by rotation in the other direction (CCW direction), landing of magnetic heads is performed for head loading of the magnetic heads.

8 Claims, 37 Drawing Sheets

FIG. I

DISK DRIVE APPARATUS

BACKGROUND OF THE INVENTION

A. Field of the Invention

The present invention relates to the field of a disk drive apparatus. More particularly, the present invention relates to a disk drive apparatus wherein unloading (ejection) of a disk cartridge and loading (landing) and/or unloading (takeoff) onto and/or from a disk-shaped recording medium can be performed by a single driving source and movement of the head onto and from (head landing, takeoff) the disk-shaped recording medium are performed at a low speed.

B. Related Art

Conventionally, the operation of ejecting a disk cartridge in which a disk-shaped recording medium, for example, a floppy disk, is accommodated from a cartridge loading condition to a cartridge unloading condition and the operations of loading and unloading a head onto and/or from the disk-shaped recording medium are performed independent of each other. Therefore, respective drive mechanisms (i.e., ejection mechanism, head lifting mechanism) which are independent of each other are provided and the drive mechanisms are individually operated by drive sources different from each other.

However, in such a conventional disk drive apparatus as described above, since the ejection operation and the head lifting mechanism are operated by driving sources different from each other, the size and the weight of the disk drive disadvantageously increases as well as the number of components increases in the disk drive apparatus.

Further, since conventionally the recording capacity of a floppy disk is approximately 1 MB or 2 MB and the magnetic layer of the disk is comparatively thick, the disk is strengthened against head crash and the disk is less liable to be damaged upon head loading (landing) and/or head unloading (takeoff). However, a floppy disk of a high density developed by the inventor of the present invention (the floppy disk is hereinafter described) has a problem also in that, since the magnetic layer is a thin film, if a conventional disk drive apparatus is used, the floppy disk can be damaged upon head landing and/or takeoff.

OBJECTS OF THE INVENTION

Therefore, it is an object of the present invention to provide a disk drive apparatus which avoids the aforementioned deficiencies of the prior art.

It is also an object of the present invention to provide a disk drive apparatus wherein the ejection operation of the disk cartridge and the head lifting mechanism are driven by the same driving source.

It is a further object of the present invention to provide a disk drive apparatus which is miniaturized in size, reduced in weight and reduced in its number of parts.

It is yet another object of the present invention to provide a disk drive apparatus for a high density disk-shaped recording medium which reduces the chance of damage to the disk upon head landing and/or takeoff.

Various other objects, advantages and features of the present invention will become readily apparent from the ensuing detailed description and the novel features will be particularly pointed out in the appended claims.

SUMMARY OF THE INVENTION

Thus, in order to achieve the objects described above, a disk drive apparatus according to the present invention has been designed which comprises a cartridge holder for holding a disk cartridge in which a disk-shaped recording medium is accommodated, the cartridge holder being supported for movement in upward and downward directions with respect to a chassis for moving the disk cartridge between a cartridge loading position and a cartridge unloading position, a slider supported for movement in forward and backward directions with respect to the chassis for moving the cartridge holder in the upward and downward directions biasing means for biasing the slider to move the cartridge holder to an eject position, a head supported on a carriage by a head arm and moved to a head landing position at which recording/reproduction onto from the disk-shaped recording medium in the loading condition of the disk cartridge, a head lifting mechanism for acting upon the head arm in the loading condition of the disk cartridge to move the head from a head loading position at which recording/reproduction of data onto/from the disk-shaped recording medium is possible to a head unloading position at which recording/reproduction of data is impossible with the head lifting mechanism being spaced away from the head arm to allow the head to move from the head unloading position to the head loading position, a locking member for locking a positional relationship between the slider and the cartridge holder in the cartridge loading condition of the cartridge holder and unlocking the positional relationship in response to forward or backward movement of the slider, and driving means rotatable to move the slider forwardly or backwardly to unlock the locking member and including an outputting section which moves at a low speed and when the driving member is rotated in a direction opposite to the direction in which the driving means acts upon the slider, the outputting section acts upon the head lifting mechanism to perform head loading.

Accordingly, with the disk drive apparatus of the present invention, unloading (ejection) of the disk cartridge and loading (landing) and/or unloading (takeoff) of the head onto/from a disk-shaped recording medium can be performed by a single driving source. Accordingly, by miniaturization and reduction in weight of the drive apparatus as well as reduction of the number of parts of the drive apparatus can be achieved. Further, since the outputting section of the driving member is moved at a low speed and head loading is performed by the head lifting mechanism, so-called "soft landing" of the head onto the disk can be realized. Consequently, damage to the disk upon head landing can be reduced.

Meanwhile, a disk drive apparatus according to another aspect of the present invention has been designed which includes a head supported on a carriage by a head arm which is movable to a head loading position wherein recording/reproduction onto/from a disk-shaped recording medium is possible in a loading condition of a disk cartridge, a head lifting mechanism for acting upon the head arm in the loading condition of the disk cartridge to move the head from a head loading position at which recording/reproduction of data onto/from the disk-shaped recording medium is possible to a head unloading position at which recording/reproduction of data is impossible and the head lifting mechanism being spaced away from the head arm to allow the head to move from the head unloading position to the head loading position, a biasing member for biasing the head lifting mechanism in a direction in which the head lifting mechanism acts upon the head arm, and a head retention mechanism for holding the head arm in a condition wherein a biasing force of the biasing member does not act upon the head lifting mechanism, and that, when the head retention mechanism is disengaged from the head arm, the head lifting mechanism acts upon the head arm while decreasing the biasing force of the biasing member to perform head unloading.

Accordingly, with the disk drive apparatus of the present invention, while the biasing force by the biasing member in the unloading direction of the head from the disk is attenuated, so-called "soft takeoff" of the head from the disk can be realized. Consequently, damage to the disk upon takeoff can be reduced.

BRIEF DESCRIPTION OF THE DRAWINGS

The following detailed description given by way of example, but not intended to limit the invention solely to the specific embodiments described, may best be understood in conjunction with the accompanying drawings in which.

DETAILED DESCRIPTION OF CERTAIN PREFERRED EMBODIMENTS

Figure 1:
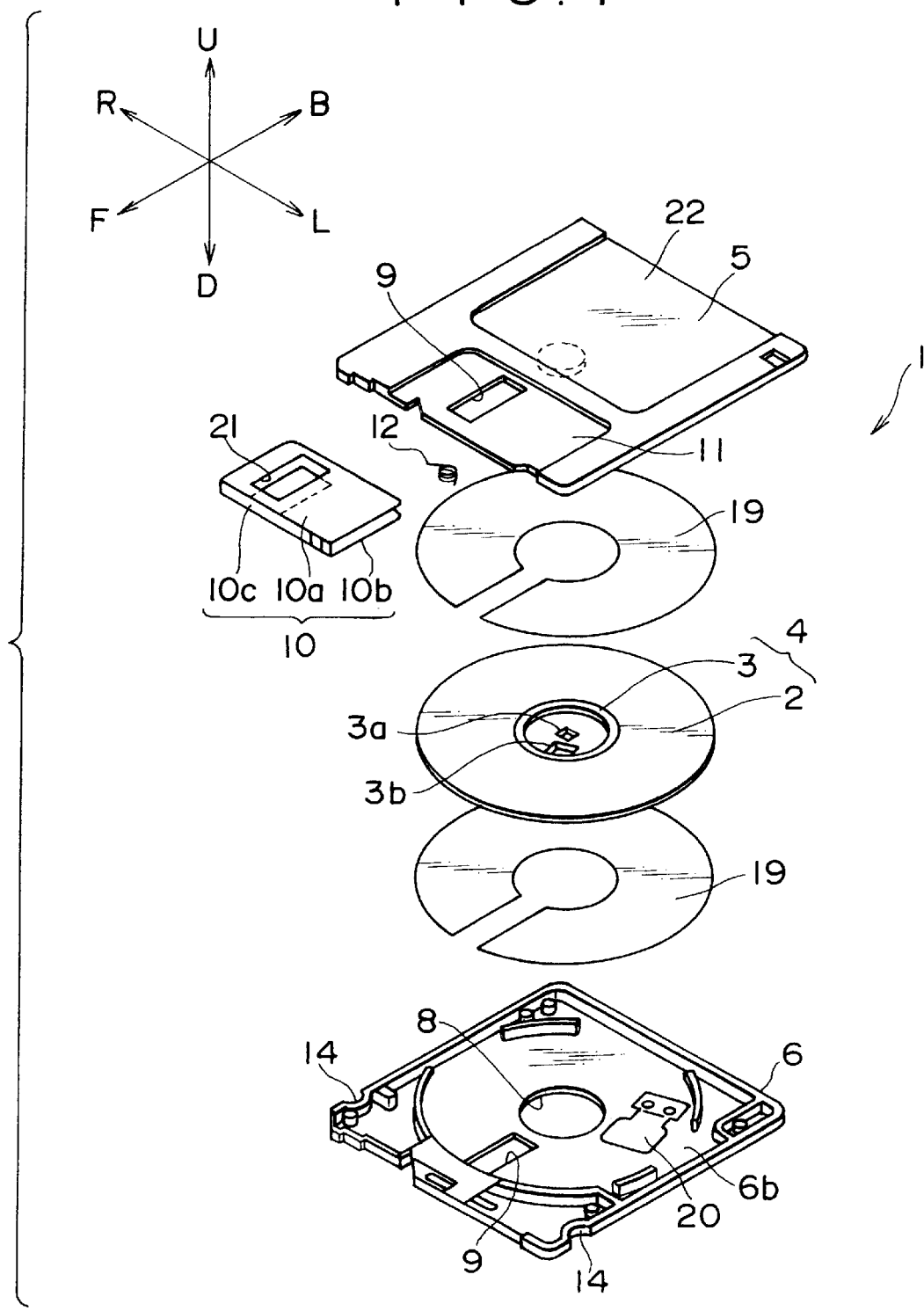
FIG. 1 is a front exploded perspective view of a floppy disk cartridge in a disassembled condition.
Figure 2:
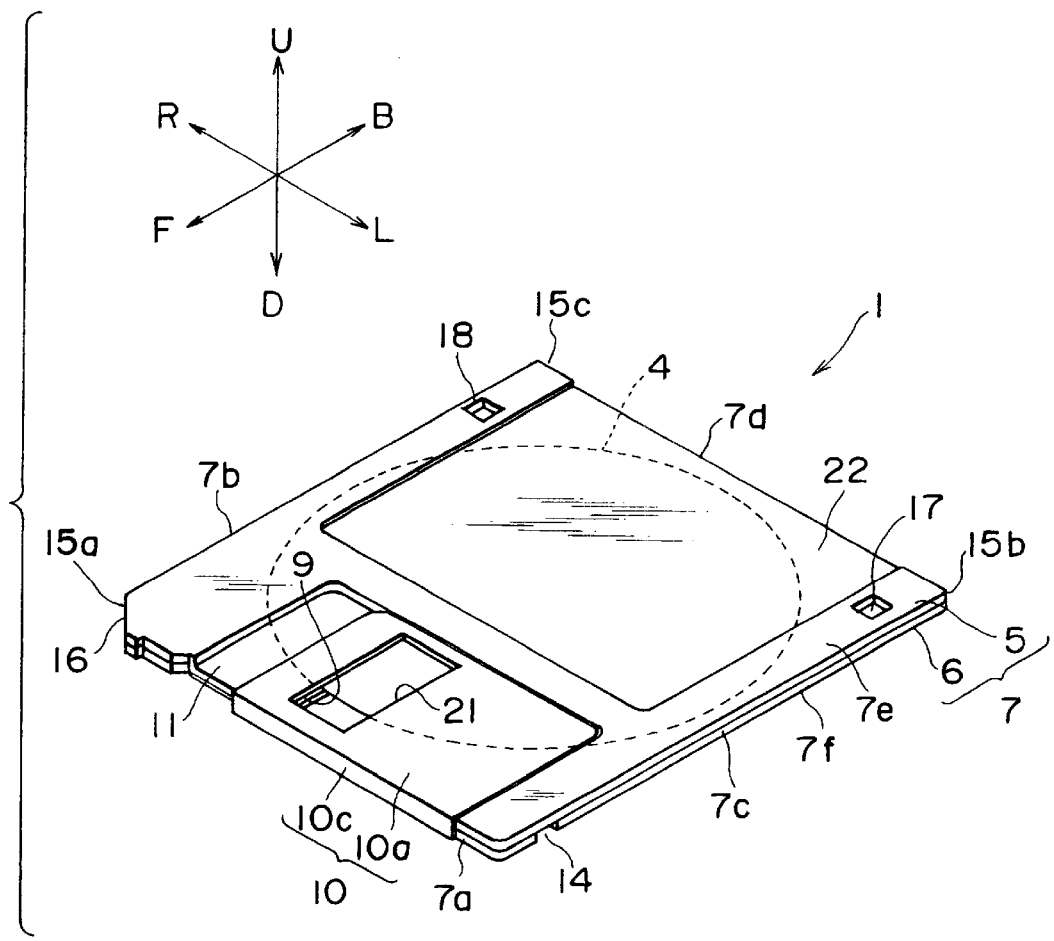
FIG. 2 is a front perspective view of the floppy disk cartridge of FIG. 1.

Referring now to the drawings, wherein like reference minerals are used to designate like features in the several view, certain preferred embodiments of a disk drive apparatus in accordance with the teachings of the present invention are illustrated.

As shown therein, the disk drive apparatus of the present invention is related to a floppy disk drive apparatus (hereinafter referred to as "FD drive apparatus") which can perform recording/reproduction onto/from both a small capacity floppy disk (hereinafter referred to simply as "FD") and a large capacity floppy disk (hereinafter referred to simply as "HiFD") and which is externally provided for a so-called computer mainframe.

In the following, the FD drive apparatus and a FD cartridge and a HiFD cartridge which are used by the FD drive apparatus are described in the following order.

(1) Outline of the FD and the HiFD
(2) FD cartridge
(3) HiFD cartridge
(4) Outline of the FD drive
(5) Frame body
(6) Insulator
(7) Chassis
(8) Disk rotational driving mechanism
(9) Head supporting mechanism
(10) Head feeding mechanism
(11) Mode selection mechanism
(12) Cartridge loading mechanism
(12-1) Cartridge holder
(12-2) Slider
(12-3) Cartridge pressing mechanism
(12-4) Locking member
(12-5) Cartridge loading operation
(12-6) Ejection operation
(13) Head loading mechanism
(13-1) Slide member
(13-2) Slide arm
(13-3) Pivotal arm
(13-4) Attracted arm
(13-5) Plunger
(13-6) Head retracting arm
(14) Head loading operation (head landing)
(15) Head unloading operation (head takeoff)

It is to be noted that the forward and backward directions of a FD cartridge and a HiFD cartridge are usually determined such that the side on which a shutter is provided is the front side, and the forward and backward directions of the FD drive apparatus are usually determined such that the side into which a FD cartridge is inserted is the front side. Therefore, in the present specification, the following description proceeds in conformity with these determinations. Consequently, in the description of a FD cartridge and a HiFD cartridge and the description of the FD drive apparatus, the forward and backward directions are reverse to each other.

Further, in any figure, a U direction, a D direction, an L direction, an R direction, an F direction and a B direction each indicated by an arrow signify an upward direction, a downward direction, a leftward direction, a rightward direction, a forward direction and a backward direction, respectively. Further, the directions described in the present specification are used for convenience and are used where the FD drive apparatus is used in a horizontally placed condition, but where the FD drive apparatus is used in a vertically oriented condition, the directions mentioned above are individually varied accordingly.

(1) Outline of the FD and the HiFD

A conventionally available small capacity floppy disk (FD) whose recording capacity is 1 to 2 MB is driven to rotate at a low speed (300 to 600 rpm) and recording/reproduction of data is performed in a condition wherein a magnetic head contacts with a disk face of the small capacity floppy disk (FD).

Meanwhile, the applicant of the present invention has previously developed a large capacity floppy disk (HiFD) whose recording capacity is greater than 100 MB. The HiFD is driven to rotate at a high speed (3,600 rpm), wherein high density recording/reproduction of data is performed in a condition (flying condition) wherein the head floats above the disk face by a distance on the order of a micron with an air film present therebetween.

In order to achieve an increase in speed of rotation and miniaturization of the data track width by high density recording, the large capacity floppy disk (HiFD) requires, for augmentation of the contacting disk surface with a head, augmentation of the surface roughness of the head and reduction of the thickness of the magnetic layer of the floppy disk. In order to achieve reduction of the thickness of the magnetic layer, it is necessary to make the size of magnetic particles as small as approximately 0.1 µm and make the application thickness as thin as approximately 0.2 µm.

(2) FD Cartridge

As shown in FIGS. 1 to 5, a small capacity floppy disk cartridge 1 (hereinafter referred to as "FD cartridge") accommodates a floppy disk 4 having a center core 3 wherein the disk is formed from a stainless steel plate and is adhered to a central portion of a magnetic sheet 2 having a diameter of 3.5 inches and having a recording capacity of 1 to 2 MB (megabytes). The disk 4 is accommodated for rotation in a substantially square cartridge 7 in the form of a flattened box composed of upper and lower shells 5, 6 formed from a synthetic resin by molding (see FIG. 1).

In this instance, the center core 3 of the floppy disk 4 is loosely fitted in a center core hole 8 formed in the center of the lower shell 6, and a pair of upper and lower head insertion holes 9, 9 of a rectangular shape are formed between a front end edge 7a of the cartridge 7 and the center core hole 8 along a cartridge center P1 in the upper and lower shells 5, 6. In particular, the cartridge center P1 coincides with a diametrical direction of the floppy disk 4 and with a seeking direction and a tracking direction (hereinafter referred to as "scanning direction") of a magnetic head with respect to the floppy disk 4 as hereinafter described.

In order to open and close the pair of upper and lower head insertion holes 9, 9, a shutter 10 is fitted in a shutter sliding recess 11 formed substantially in a U-shape on upper and lower faces 7e, 7f and the outer side of the front end edge 7a of the cartridge 7. The shutter 10 is mounted for sliding movement along the front end edge 7a. The shutter 10 is formed in a U-shaped cross section from a pair of upper and lower horizontal plate portions 10a, 10b and a front and vertical plate portion 10c. The shutter 10 is normally biased to slide leftwardly to a lid closing position by a spring 12 built thereinto (see FIG. 1).

Figure 3:
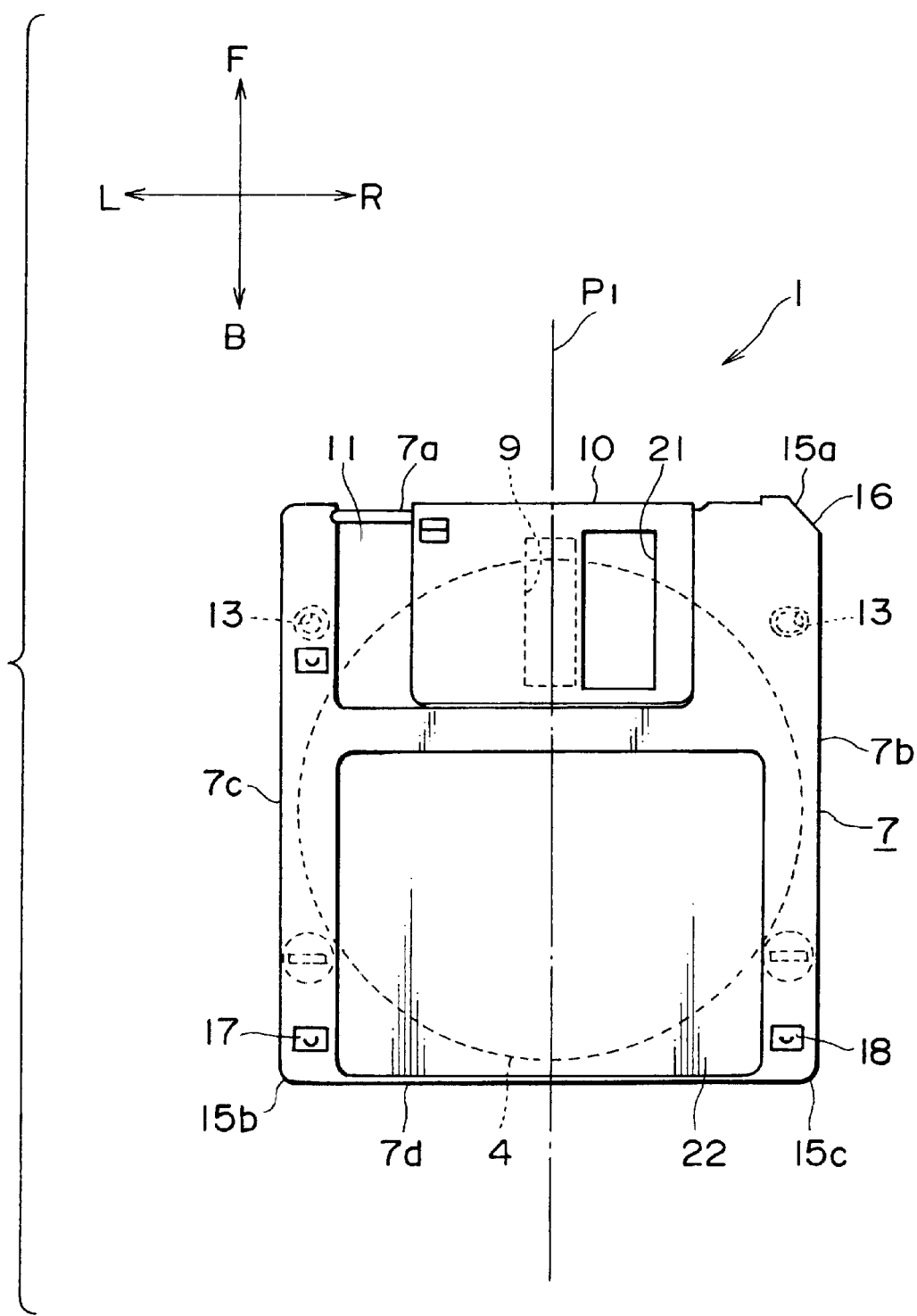
FIG. 3 is a top plan view of the floppy disk cartridge of FIGS. 1 and 2.
Figure 4:
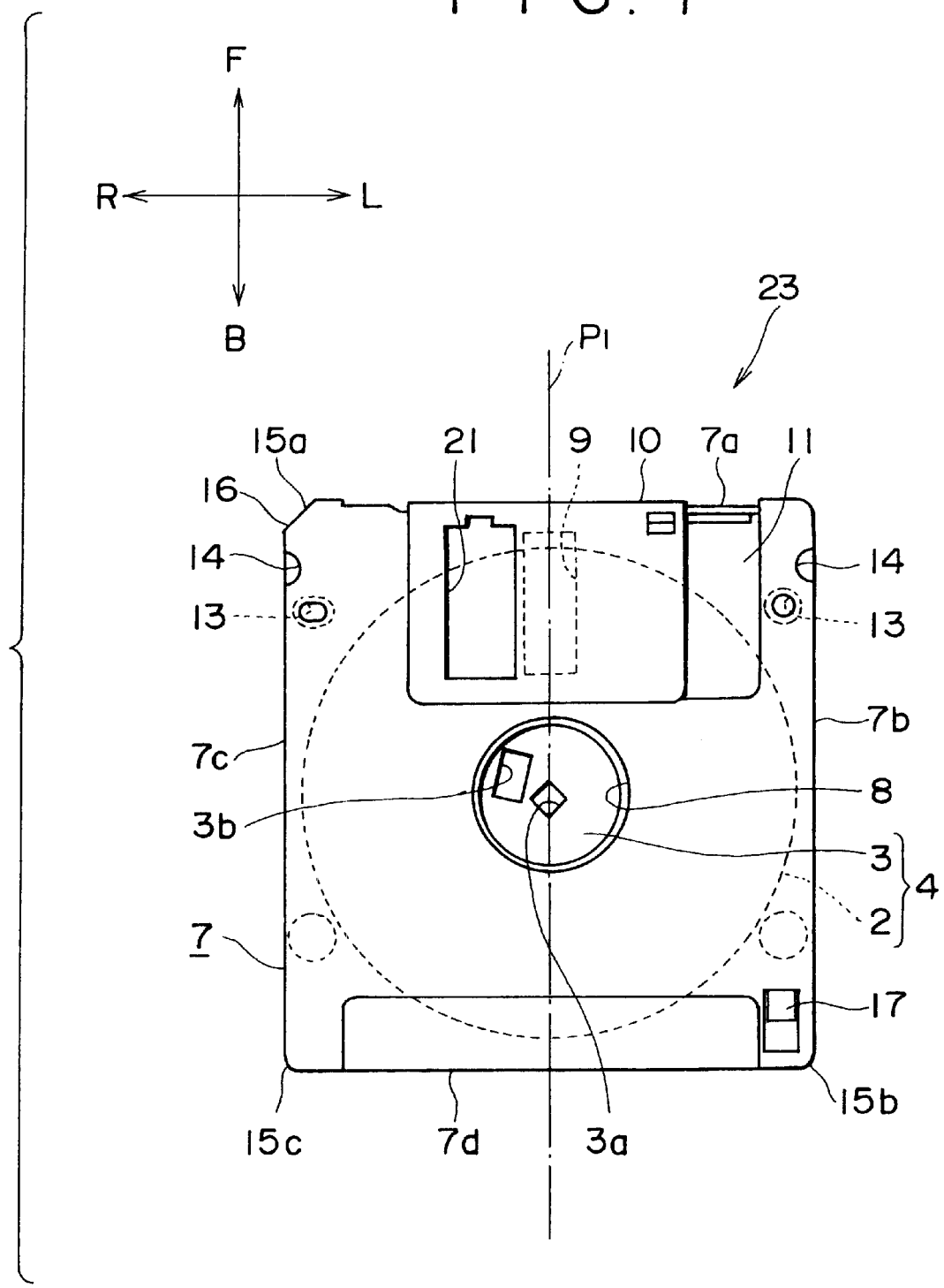
FIG. 4 is a bottom plan view of the floppy disk cartridge of FIGS. 1 and 2.
Figure 5:
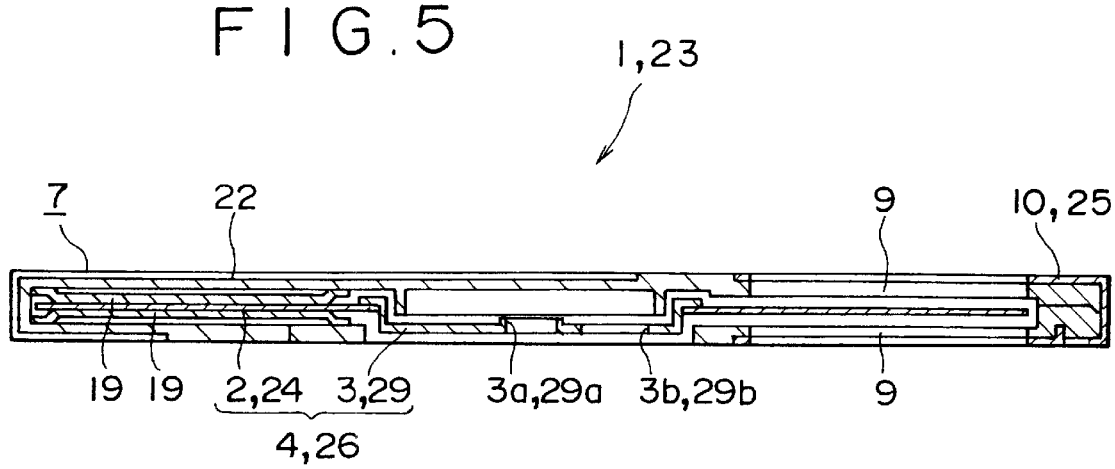
FIG. 5 is a longitudinal sectional view of the floppy disk cartridge of FIGS. 1 and 2.

As shown in FIG. 3, a pair of left and right positioning reference holes 13, 13 are positioned on the lower shell 6 near the front end edge 7a of the cartridge 7. One of the holes 13, 13 is generally of a circular shape and the other hole is generally of an elliptical shape. Further, a pair of left and right semicircular recesses 14 are formed on the opposite left and right side edges 7b, 7c of the cartridge 7 in the proximity of the front end edge 7a side of the lower shell 6 (see FIGS. 1, 4).

At a corner 15a between the front end edge 7a and the right side edge 7b of the cartridge 7, an erroneous insertion preventing inclined face 16 is formed as a so-called C face by cutting the entire upper and lower shells 5, 6 at approximately 45°. Further, at a corner 15b of the cartridge 7 defined by the left end edge 7c and the rear end edge 7d, a write protector 17 for preventing erroneous erasure of information is incorporated, and a capacity identification hole 18 is formed at a corner 15c between the rear end edge 7d and the right side edge 7b (see FIGS. 2, 3).

As shown in FIG. 1, a pair of upper and lower cleaning sheets 19, 19 are laid on the inner side faces 5b, 6b of the upper and lower shells 5, 6 by adhesion or the like. These upper and lower cleaning sheets 19, 19 are made of non-woven fabric cut substantially in a U-shape. In addition, a lifter 20 for resiliently contacting the pair of upper and lower cleaning sheets 19, 19 with the opposite upper and lower faces of the magnetic sheet 2 is mounted on either (or both) of the upper and lower shells 5, 6. Accordingly, the floppy disk 4 is rotated at a substantially central location in the thicknesswise direction in the cartridge 7 while it is held between the pair of upper and lower cleaning sheets 19, 19. Further, a pair of shutter holes 21, 21 of a rectangular shape are formed in the pair of upper and lower horizontal plate portions 10a, 10b of the shutter 10 in an opposed relationship to the pair of upper and lower head insertion holes 9, 9 formed in the upper and lower shells 5, 6. Furthermore, a label application recess 22 is formed in the opposite upper and lower faces 7e, 7f of the upper and lower shells 5, 6 of the cartridge 7 without being formed near the rear end edge 7d (see FIG. 1)

(3) HiFD Cartridge

A large capacity floppy disk cartridge 23 (hereinafter referred to as "HiFD cartridge") is constructed such that it has a compatibility with the FD cartridge 1 in the FD drive apparatus which is hereinafter described. Accordingly, the HiFD cartridge 23 is formed with outer profile dimensions substantially equal to those of the FD cartridge 1 described above and is different from the FD cartridge 1 in the material of a magnetic sheet 24 and a location for identification.

More particularly, in order to increase the recording capacity of the magnetic sheet 24 of the HiFD cartridge 23 to 100 MB or more, preferably to 300 to 700 MB, the thickness of the magnetic film on the opposite upper and lower faces of the magnetic sheet 24 is reduced to the order of a sub micron, and the speed of rotation of the magnetic sheet 24 is raised to a high speed rotational region of approximately 3,600 rpm or more.

Figure 6:
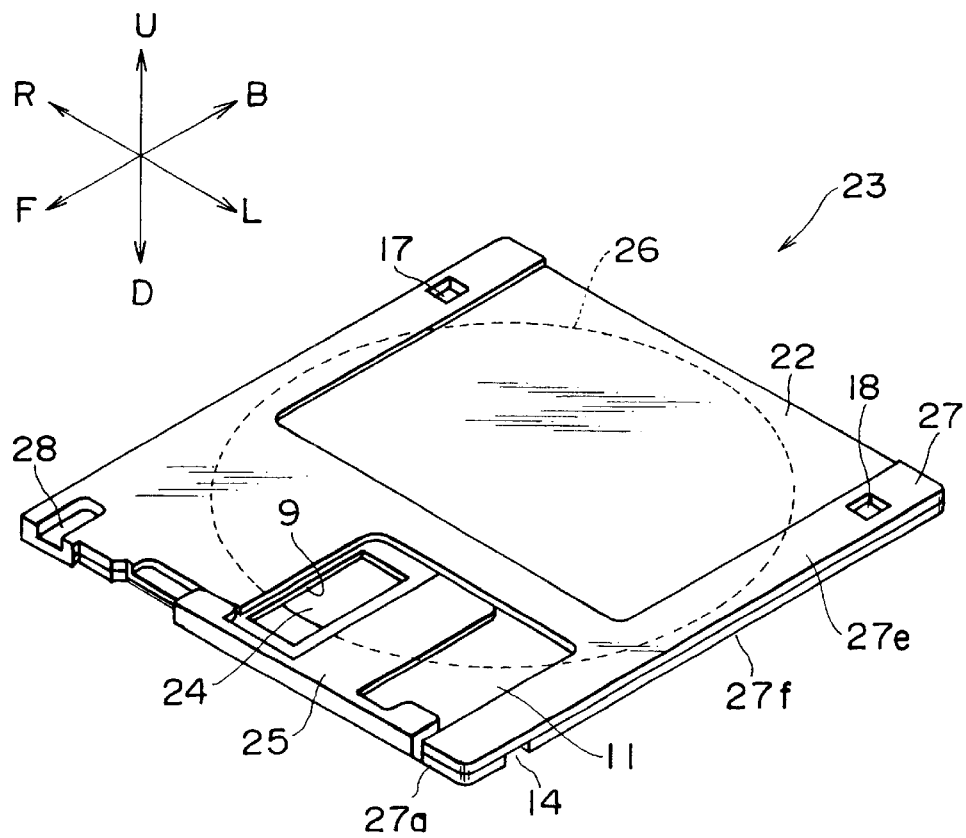
FIG. 6 illustrates a front perspective view of a high density floppy disk cartridge.
Figure 7:
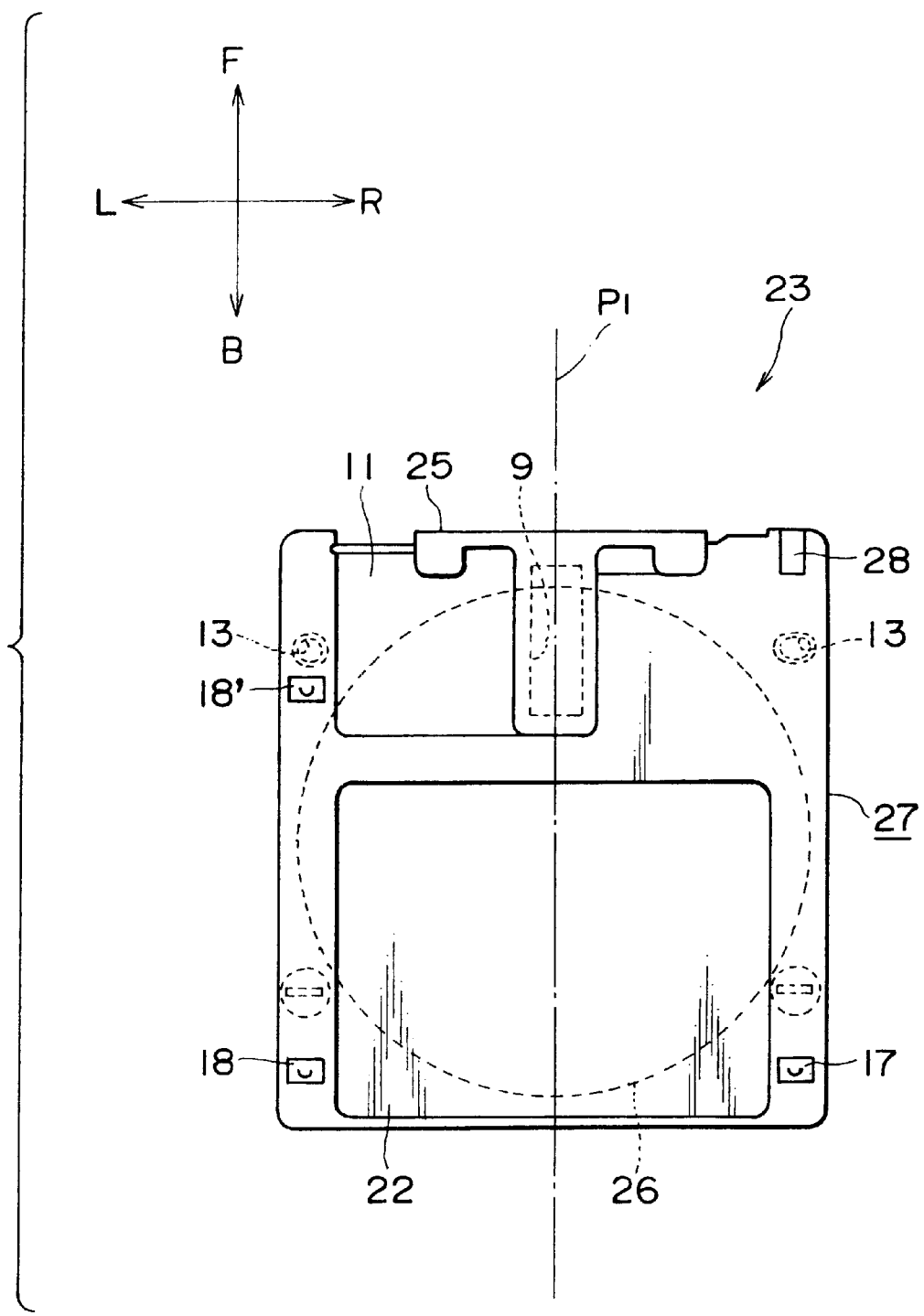
FIG. 7 is a top plan view of the high density floppy disk of FIG. 6.
Figure 8:
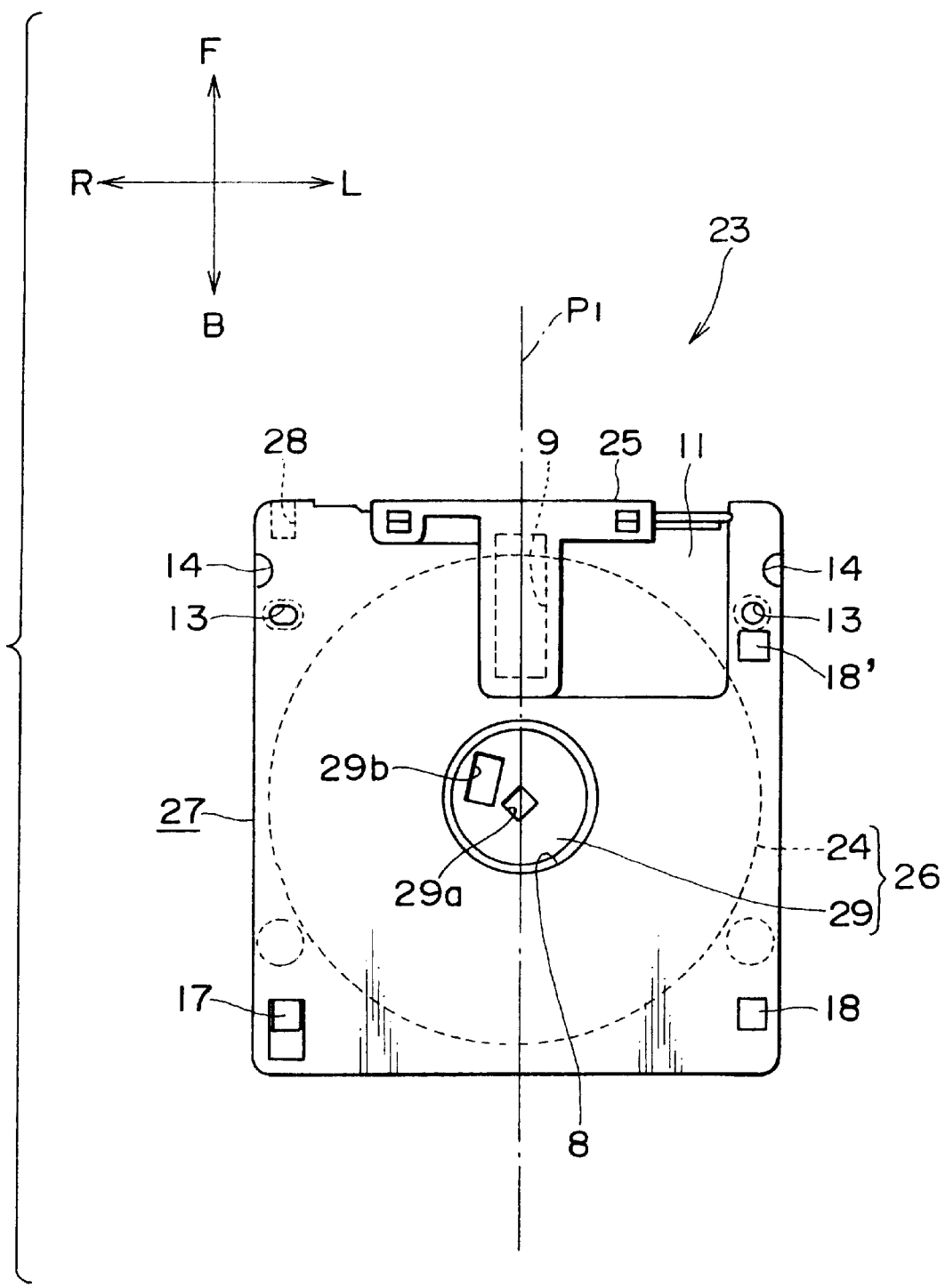
FIG. 8 is a bottom plan. view of the high density floppy disk of FIG. 6.

Further, in order that the HiFD cartridge 23 can be identified from the FD cartridge 1 by the FD drive apparatus, the HiFD cartridge 23 is constructed such that the arrangement of the write protector 17 and the capacity identification hole 18 are reversed and a large capacity identification hole 18' is formed at a position in the proximity of the reference hole 13. In the HiFD cartridge 23, the shape of a shutter 25 is substantially T-shape to increase the internal effective area of a cartridge 27 and an erroneous insertion preventing groove 28 is formed at a corner 15a on one end side of a front end edge 27a on an upper face 27e of the cartridge 27. Further, a rotational driving pin fitting hole 29b formed in a center core 29 of a floppy disk 26 in the HiFD cartridge 23 is of a dimension sufficiently greater than a rotational driving pin fitting hole 3b formed in the center core 3 of the floppy disk 4 of the FD cartridge 1 described hereinabove. In contrast to the conventional FD cartridge 1, the HiFD cartridge 23 is positioned (centered) on a circumference to effect tracking by a tracking servo system (see FIGS. 6 to 8).

(4) Outline of the FD Drive

Figure 9:
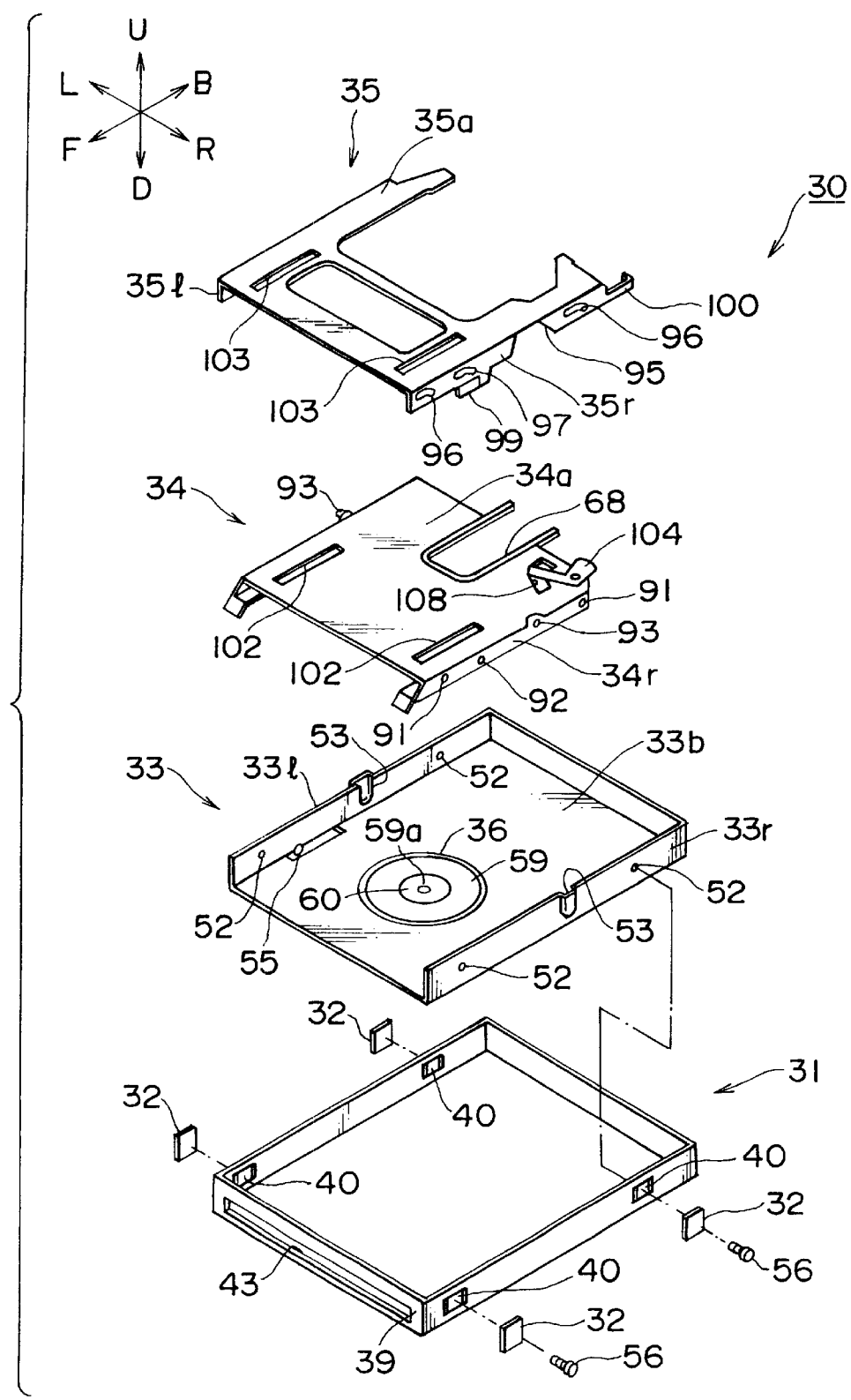
FIG. 9 is a front exploded perspective view of a preferred embodiment of a disk drive apparatus in accordance with the teachings of the present invention in a disassembled condition.

As shown in FIG. 9, a FD drive apparatus 30 includes a frame body 31 serving as a stationary side member, a chassis 33 supported on the frame body 31 with insulators 32, 32 interposed therebetween, a cartridge holder 34 for holding the FD cartridge 1 or the HiFD cartridge 23 (hereinafter referred merely as "disk cartridge 1 or 23") thereon and supported for upward and downward movement with respect to the chassis 33, a slider 35 for moving the cartridge holder 34 upwardly or downwardly by the forward or backward movement thereof and supported for movement in forward and backward directions with respect to the chassis 33, a disk rotational driving mechanism 36 supported on the chassis 33 for rotating the floppy disk 4 or 26 of the disk cartridge 1 or 23, and two upper and lower magnetic heads 37, 37 for performing recording/reproduction of a signal onto/from the floppy disk 4 or 26 (see FIGS. 9, 10).

(5) Frame Body

Figure 11:
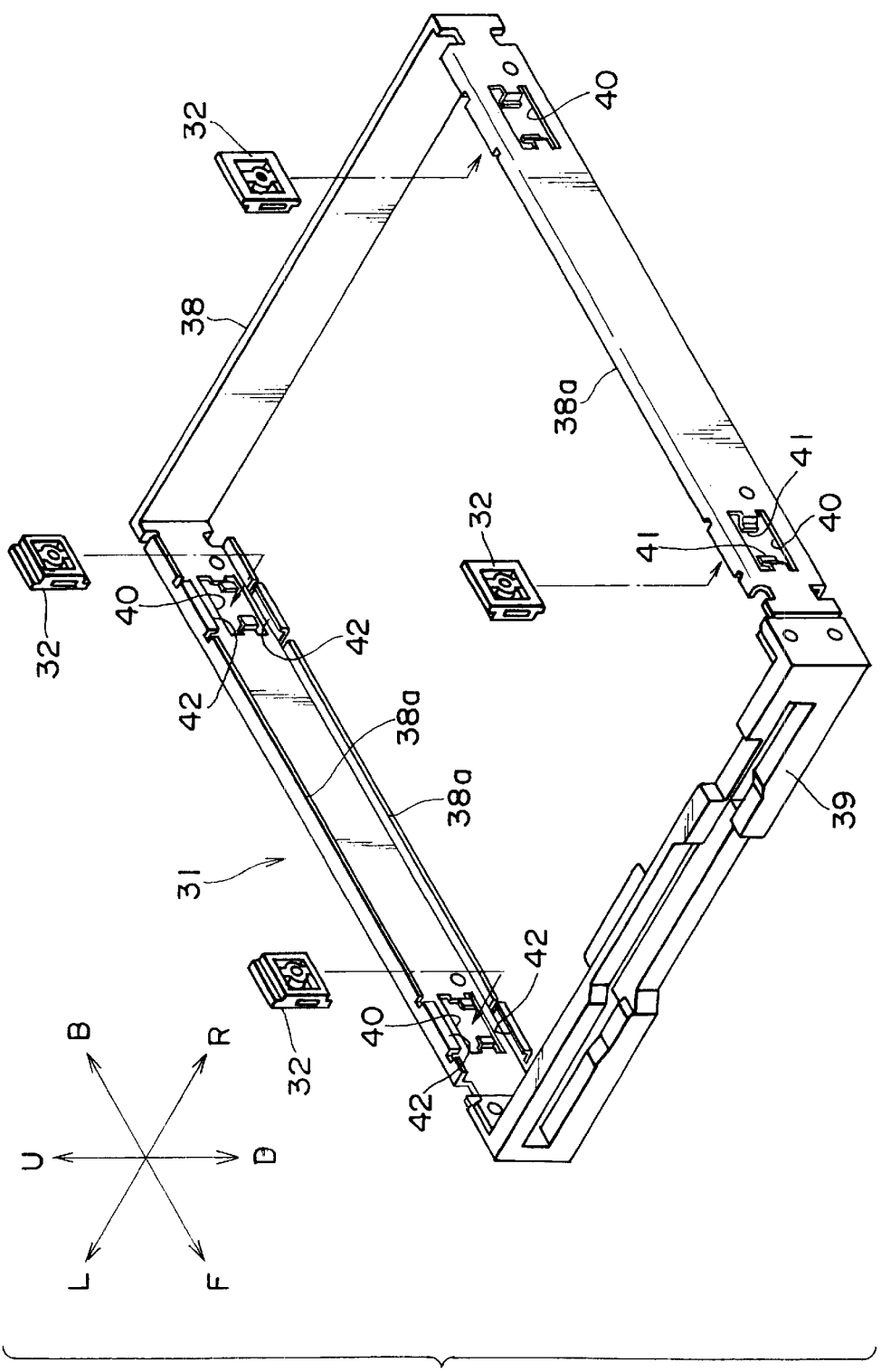
FIG. 11 is a perspective view of a frame body of the disk drive apparatus of FIG. 9.

FIG. 11 illustrates that the frame body 31 includes a sheet metal part 38 formed in a forwardly opened U-shape by bending a sheet metal member, and a front panel 39 formed from a molded part so as to cover over the front side opening of the sheet metal part 38. The frame body 31 is generally formed as a rectangular frame and built into an outer housing (not shown) of the FD drive apparatus 30. In addition, narrow bent portions 38a, 38a are formed at upper and lower edge portions of left and right side walls of the sheet metal part 38 to increase the strength of the frame body 31 (see FIG. 11).

Figure 12:
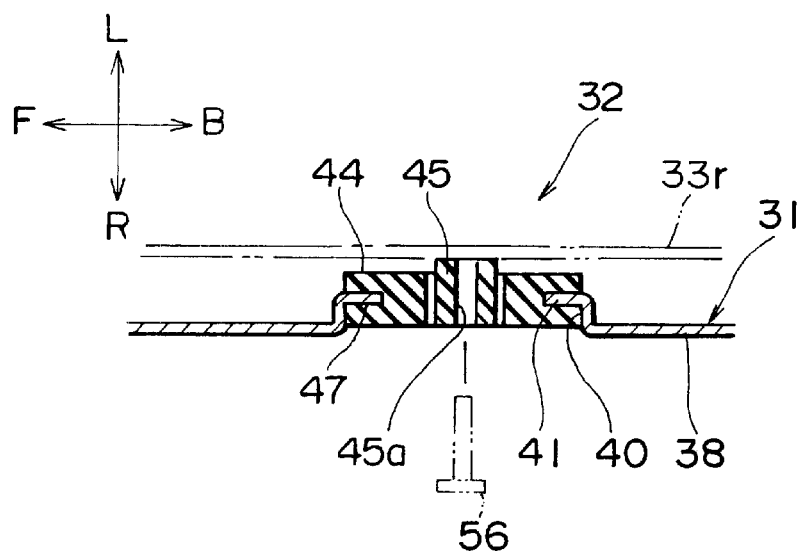
FIG. 12 is a horizontal sectional view of an insulator attached to the frame body of FIG. 11.

The left and right side walls of the sheet metal part 38 have rectangular insulator mounting holes 40, 40, formed near to the opposite front and rear ends thereof. At those edge portions of a circumferential edge of each insulator mounting hole 40 which oppose each other in the forward and backward directions, front and rear mounting pieces 41, 41 having an L-shape are formed as inwardly projecting cut-and-raised pieces. Further, at portions of the side edges of the bent portions 38a, 38a of the left and right sheet metal parts 38, 38 which correspond to the insulator mounting holes 40, 40, L-shaped upper and lower mounting pieces 42, 42 are bent downwardly or upwardly such that they project further inwardly are formed (see FIGS. 12, 13).

The front panel 39 has a cartridge slot 43 of a horizontally elongated shape formed therein, and an inwardly openable opening and closing lid (not shown) is provided on the inner side of the cartridge slot 43. Further, an eject button and a light emitting indication section for indicating an operation condition of the drive are provided on the front panel 39 (see FIGS. 9, 11).

The frame body 31 is secured to an outer housing (not shown) by means of screws or the like and serves as a stationary side member.

(6) Insulator

Each insulator 32 is unitarily formed and made of a resilient material, such as rubber, and includes a frame body 44 in the form of a rectangular ring, a boss portion 45 positioned substantially at the center of the frame body 44, and boss supporting portions 46, 46 which connect the boss portion 45 upwardly and downwardly to the frame body 44. The insulator 32 is held at the frame body 44 thereof on the stationary side member (frame body 31) and supports a supported member (the chassis 33) with a screw fitted in a boss hole 45a formed in the boss portion 45 (see to FIGS. 12, 13 and 14).

Since the insulator 32 has the shape as described above, the insulator 32 supports vibrations (a load) in the upward and downward directions through compression or elongation of the boss supporting portions 46, 46 and supports vibrations in the forward and rearward directions and the leftward and rightward directions through resiliency of the boss supporting portions 46, 46 in a horizontal direction. Accordingly, the insulator 32 has a vibration suppression performance higher in the forward and backward directions or the leftward and rightward directions than in the upward and downward directions. The forward and rearward directions of the chassis 33 coincide with the scanning direction of the magnetic heads 37, 37 with respect to the floppy disk 4 or 26 as hereinafter described.

Figure 13:
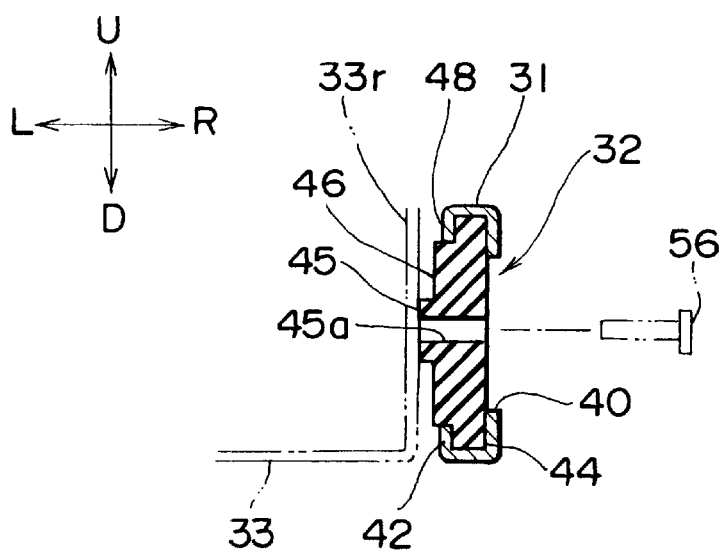
FIG. 13 is a vertical sectional view of another insulator attached to the frame body of FIG. 11.

The frame body 44 is formed such that the size thereof in the upward and downward directions is substantially equal to the upward and downward dimensions of the sheet metal part 38 and the size in the forward and backward directions is substantially equal to the size of the insulator mounting hole 40 described hereinabove (see FIG. 13).

Figure 14:
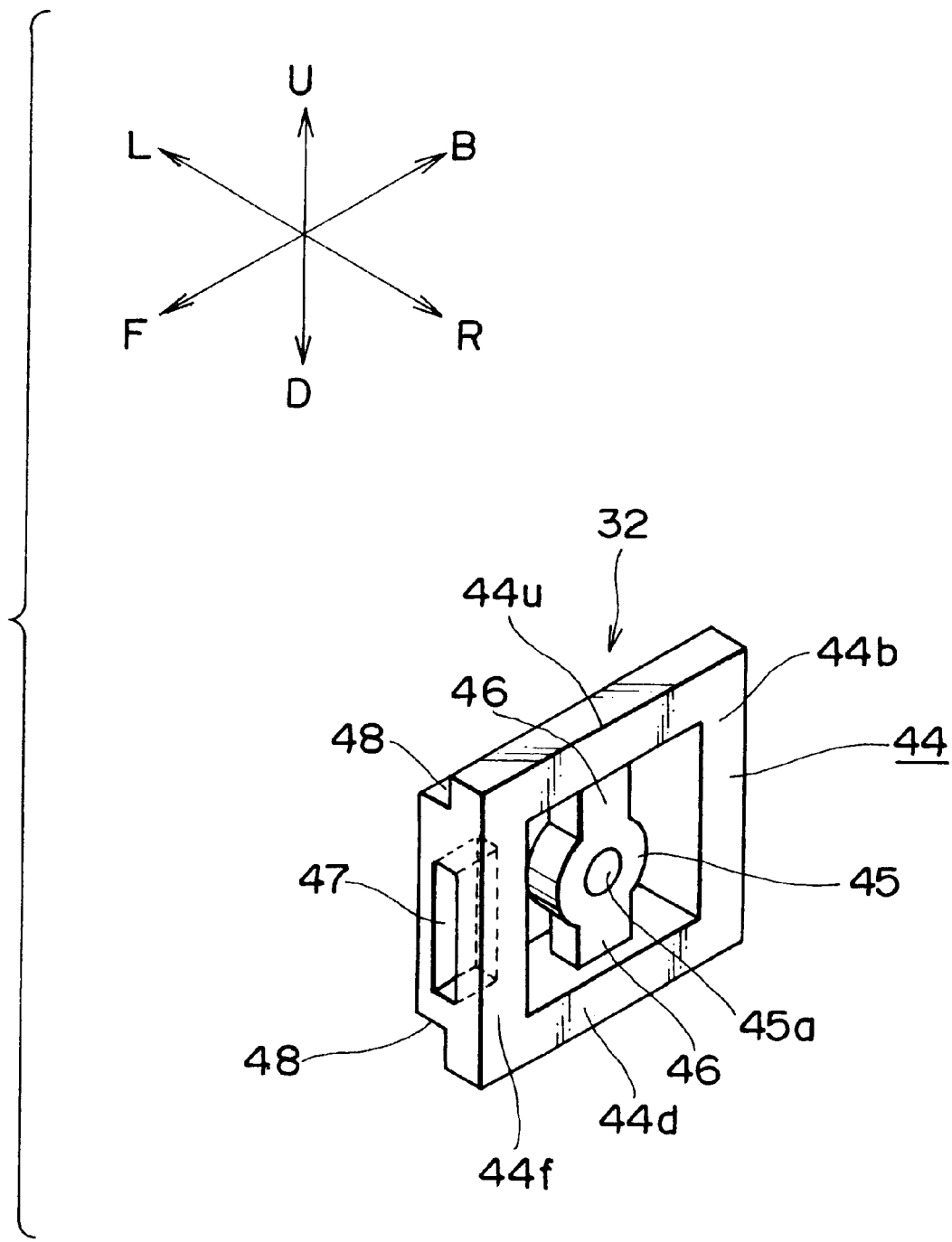
FIG. 14 is a front perspective view of the insulator attached to the frame body of FIGS. 12 and 13.

As shown in FIG. 14, bottomed slits 47, 47 are formed in the front and rear faces of front and rear frame side portions 44f, 44b of the frame body 44 of the insulator 32, and stepped portions 48, 48 are formed at the opposite upper and lower end portions of upper and lower frame side portions 44u, 44d.

This insulator 32 as described above is positioned into each of the insulator mounting holes 40 of the sheet metal part 38 from the inner side. The insulator 32 is attached to the sheet metal part 38 such that the front and rear mounting pieces 41, 41 of the sheet metal part 38 are fitted in the slits 47, 47 of the frame body 44 and the stepped portions 48, 48 of the insulator 32 are held by the upper and lower mounting pieces 42, 42. While details are hereinafter described, screws fitted into the boss holes 45a of the boss portions 45 of the insulators 32 are screwed into the chassis 33 so that the chassis 33 is supported on the frame body 31 by the insulators 32, 32, (see FIGS. 12 and 13).

(7) Chassis

Figure 15:
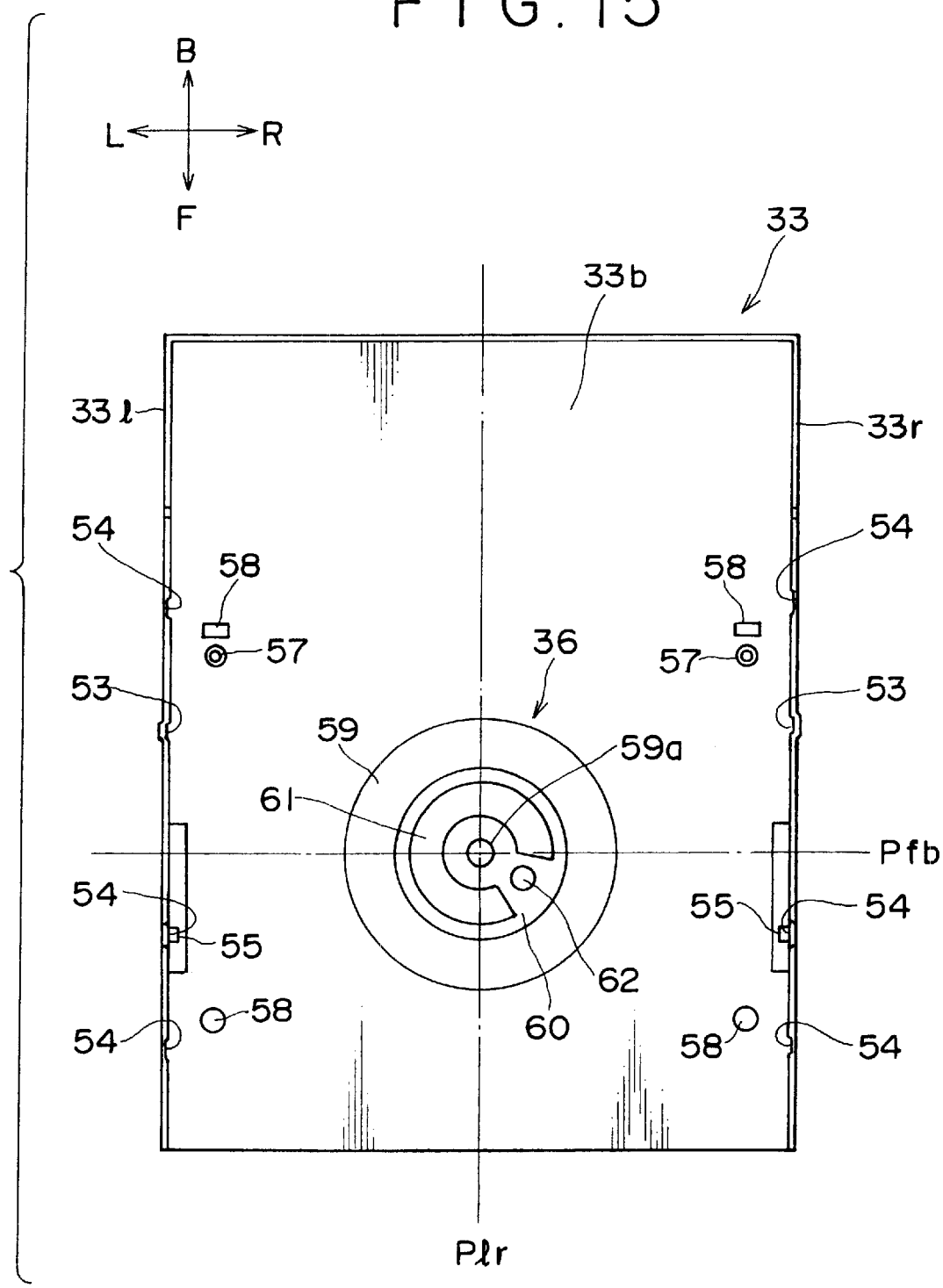
FIG. 15 is a top plan view of a chassis of the disk drive apparatus of FIG. 9.

Preferably, the chassis 33 is in the form of a flattened box which is open to the top and the front, and an outer profile thereof is formed with a size which is smaller than the frame body 31 and can be substantially fitted in the frame body 31. The chassis 33 is formed in a predetermined shape by presswork of, for example, an aluminum sheet metal material (see FIGS. 9, 15).

The chassis 33 has the aforementioned disk rotational driving mechanism 36 disposed at a position displaced forwardly from the central portion thereof. Further, a head supporting mechanism 49 on which the magnetic heads 37, 37 are supported and a head feeding mechanism 50 for feeding the head supporting mechanism 49 in the forward and backward directions are disposed substantially at central positions of a rear end portion of the chassis 33. In addition, a mode selection mechanism 51 for selecting various modes is disposed on the right side of the rear end portion of the chassis 33 (see FIGS. 10 and 15).

Left and right side. walls 33l, 33r of the chassis 33 have tapped holes 52, 52 formed at positions near to the opposite front and rear ends thereof such that the tapped holes 52, 52 extend through the thickness of the left and right side walls 33l, 33r. Further, groove recesses 53, 53 (hereinafter referred to as "guide groove recesses") are formed at substantially central positions in the forward and backward directions (positions displaced rearwardly from a front-rear reference line Pfb which is hereinafter described) on inner side faces of the left and right side walls 33l, 33r of the chassis 33 such that they extend in the upward and downward directions to the upper side edges of the left and right side walls 33l, 33r. Furthermore, groove recesses 54, 54, 54 (hereinafter referred to as "escape groove recesses") which are somewhat shallower than the guide groove recesses 53 described above are formed at three positions on each of the left and right side walls 33l, 33r of the chassis 33. More specifically, two positions of the groove recesses 54, 54 are provided forwardly of the guide groove recess 53 spaced suitably from each other in the forward and backward directions and another groove recess 54 is located at a position suitably displaced rearwardly from the guide groove recess 53 (a position displaced forwardly from the front-rear reference line Pfb which is hereinafter described) (see FIG. 15).

Further, tongue-like sliding pieces 55, 55 are formed as cut-and-raised pieces at positions on the left and right side walls 33l, 33r of the chassis 33. These sliding pieces 55, 55 are displaced forwardly from the front-rear reference line Pfb and project inwardly in the proximity of the lower edges of the left and right side walls 33l, 33r (see FIG. 15).

The tapped holes 52, 52 of the left and right side walls 33*l*, 33*r* are formed at positions to which the boss holes 45*a*, 45*a* of the boss portions 45, 45 of the insulators 32, 32 supported on the frame body 31 correspond when the chassis 33 is positioned on the inner side of the frame body 31. The chassis 33 is supported on the frame body 31 by inserting screws 56, 56 into the boss holes 45*a*, 45*a* from outwardly and screwing them into the tapped holes 52, 52 of the chassis 33 (see FIGS. 12 and 13).

The guide groove recesses 53 are engaged for sliding movement by vertical guide pins, which are hereinafter described. The vertical guide pins are formed on the opposite left and right side walls 34*l*, 34*r* of the cartridge holder 34 to guide the cartridge holder for movement in the upward and downward directions (see FIGS. 26, 27).

Figure 10:
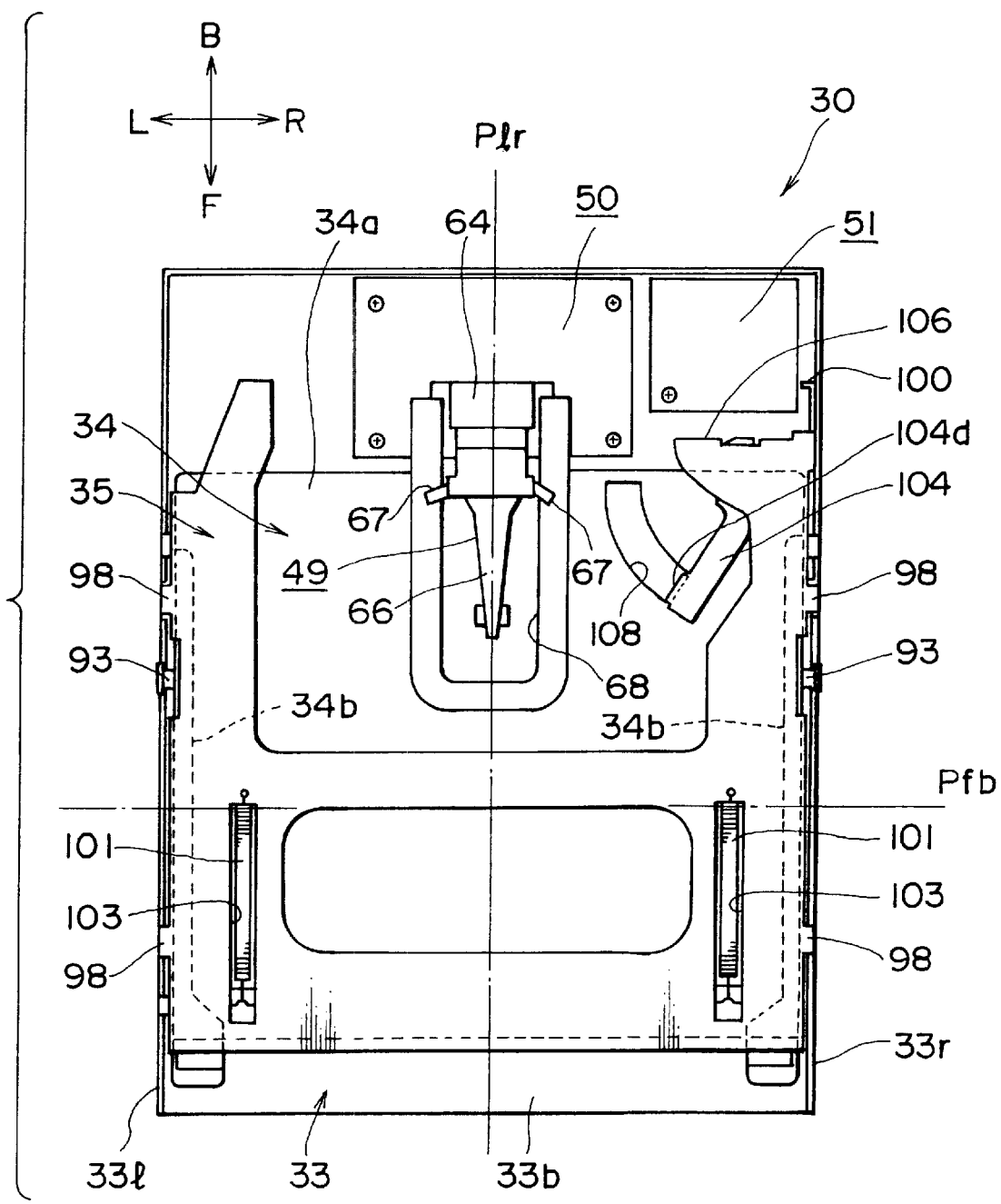
FIG. 10 is a top plan view of the disk drive apparatus of FIG. 9.

The escape groove recesses 54, 54, 54 are provided to allow those portions of guided pins or pressed pins formed on the opposite left and right side walls 34*l*, 34*r* of the cartridge holder 34 which extend outwardly from inclined grooves formed on the slider 35 to be contained therein so as to avoid interference of the guided pins with the chassis 33 (see FIG. 10).

A pair of projecting left and right positioning reference pins 57, 57 are formed at positions along a bottom plate 33*b* of the chassis 33 near to the opposite left and right side walls 33*l*, 33*r*. These reference pins 57, 57 are displaced somewhat rearwardly from the center in the forward and backward directions. When the disk cartridge 1 or 23 is loaded, the positioning reference pins 57, 57 are inserted into the reference holes 13, 13 of the cartridge 7 or 27 to effect positioning of the disk cartridge 1 or 23 with respect to the FD drive apparatus 30 (see FIGS. 15, 37). Then, when the disk cartridge 1 or 23 is positioned with respect to the FD drive apparatus 30, the cartridge center P1 of the disk cartridge 1 or 23 is aligned with a left-right reference line Plr which is hereinafter described.

Further, projecting protrusions 58, 58, which have a comparatively low height are formed at four positions; namely, positions in the proximity of the left and right positioning reference pins 57, 57 of the chassis 33 and positions near to the front end portions adjacent to the opposite left and right side walls 33*l*, 33*r*. When the disk cartridge 1 or 23 is loaded, the protrusions 58, 58 are contacted by the bottom face of the disk cartridge 1 or 23 to provide a reference to the height (see FIGS. 15, 37).

Furthermore, though not shown, a switchboard on which a cartridge insertion detection switch, an erroneous erasure preventing detection switch, a small capacity detection switch, and a large capacity detection switch are mounted is disposed on the chassis 33.

(8) Disk Rotational Driving Mechanism

The disk rotational driving mechanism 36 includes a spindle motor 59 serving as a driving source, and a disk table 60 securely mounted at an upper portion of a spindle shaft 59*a* of the spindle motor 59. A magnet sheet 61 for chucking the disk table 60 and a revolutionary driving pin 62 are provided on an upper face of the disk table 60. The spindle motor 59 is mounted on a motor board provided on a lower face of the chassis 33 and is positioned into the chassis 33 through a motor hole formed in the chassis 33 (see FIGS. 9, 15).

The center of rotation of the spindle shaft 59*a* of the disk rotational driving mechanism 36 serves as a reference to dimensions of the FD drive apparatus 30 in the forward and backward directions and the leftward and rightward directions (in the following description, the reference line in the forward and backward directions is referred to as "front-rear reference line Pfb", and the reference line in the leftward and rightward direction is referred to as "left-right reference line Plr"). The spindle shaft 59*a* is provided such that it is displaced rearwardly by approximately ⅓ the length of the chassis 33 in the forward and backward directions from the front end of the chassis 33 and positioned at the center in the leftward and rightward directions. Therefore, the reference lines Pfb, Plr described above serve as references to dimensions also of the cartridge holder 34 and the slider 35 in the forward and backward directions and the leftward and rightward directions. As a result, the front-rear reference line Pfb with regard to the slider 35 which moves in the forward and backward directions is determined with reference to a condition of the slider 35 wherein the slider 35 is positioned at the front end of the range of movement thereof (a cartridge loading condition).

(9) Head Supporting Mechanism

Figure 16:
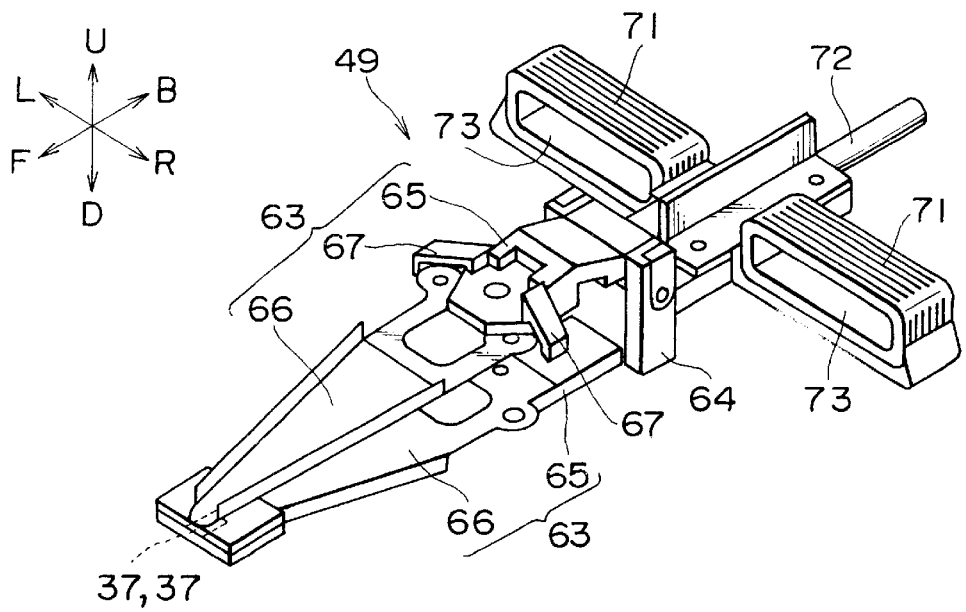
FIG. 16 is a perspective view of a head supporting mechanism of the disk drive apparatus of FIG. 9.

As shown in FIG. 16, the head supporting mechanism 49 includes head arms 63, 63 for supporting the two upper and lower magnetic heads 37, 37. The head supporting mechanism 49 also includes a carriage 64 which supports rear end portions of the head arms 63, 63 and is moved in the forward and backward directions by the head feeding mechanism 50 described hereinabove (see FIG. 16). In addition, a so-called "flying head" is achieved by the magnetic heads 37, 37. More particularly, when the floppy disk 26 of the HiFD cartridge 23 rotates at a predetermined speed (high speed rotation: 3,600 rpm), an air film is formed between the loaded magnetic head 37 and the floppy disk 26 so that the two may be kept in a non-contacting condition. Further, since rotation of the floppy disk 4 of the FD cartridge 1 is at a relatively low speed (i.e., 300 to 600 rpm), no air film is formed between each magnetic head 37 and the floppy disk 4, and the two assume a mutually contacting condition.

The pair of upper and lower head arms 63, 63 are composed of arm bases 65, 65 formed from rigid members in the form of molded parts made of a synthetic resin or a light metal such as aluminum or magnesium. The head arms 63 also include suspensions 66, 66 formed from resilient members such as leaf springs. Each suspension 66 is coupled integrally to an end (front end) of an arm base 65 by fastening with screws, integral molding such as outset molding or the like (see to FIGS. 16 to 18).

Figure 19:
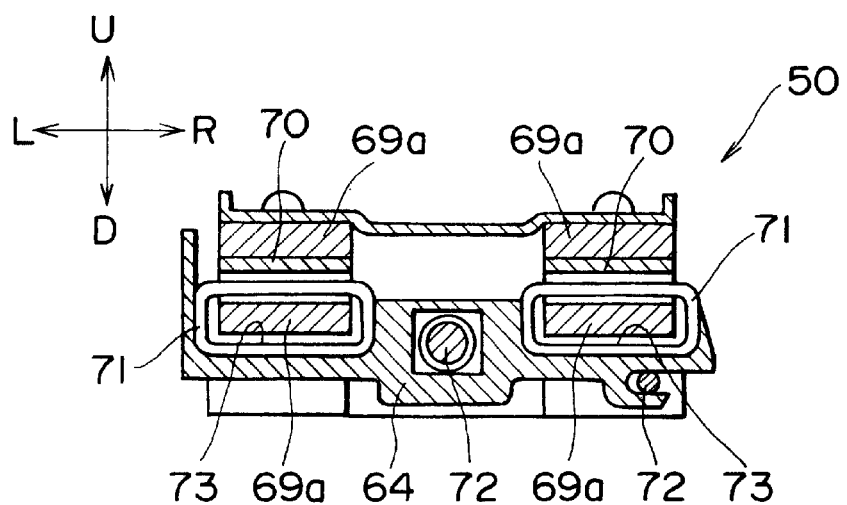
FIG. 19 is a vertical sectional view of the head feeding mechanism of FIG. 18.

The carriage 64 is formed from a rigid member made of a synthetic resin or a light metal material such as aluminum or magnesium, and the two arm bases 65, 65 are mounted at a front end of the carriage 64 in a vertically spaced relationship from each other in a direction wherein the head arms 63, 63 thereof extend forwardly (see FIGS. 16, 19).

Figure 17:
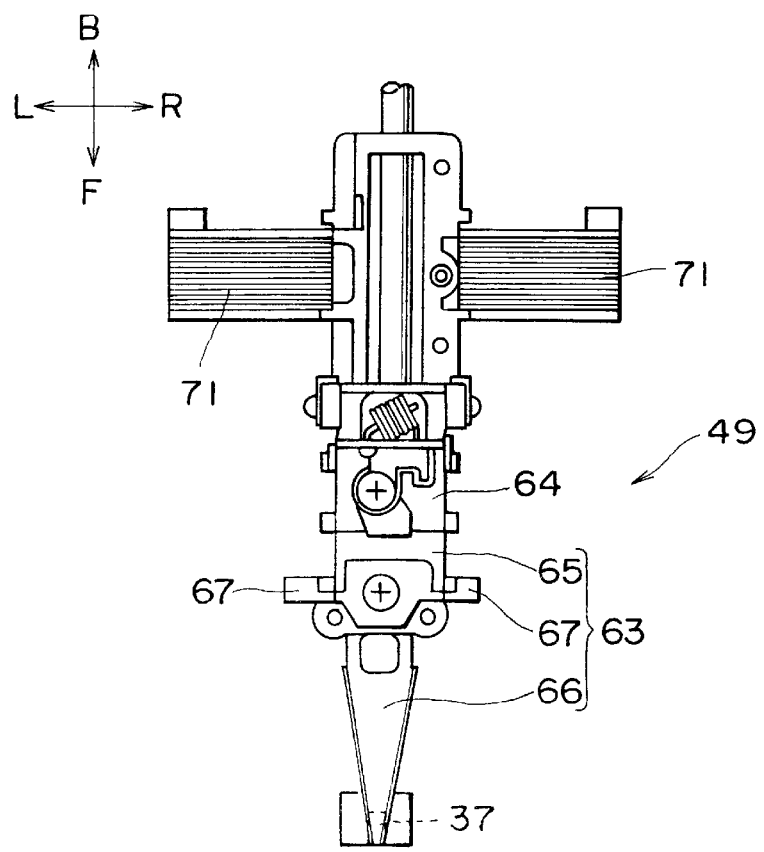
FIG. 17 is a top plan view of the head supporting mechanism of FIG. 16.

The magnetic heads 37, 37 described hereinabove are mounted on vertically opposing faces of the ends (front ends) of the suspensions 66, 66 of the pair of upper and lower head arms 63, 63 by head bases and gimbals plates (see to FIGS. 16 to 18).

In the present embodiment, the arm base 65 of the lower side head arm 63 is integrally formed with the carriage 64. As a result, since the disk cartridge 1 or 23 is moved downwardly after it is inserted (moved rearwardly) into the FD drive apparatus 30 (chassis 33), the lower side magnetic head 37 does not interfere with the disk cartridge 1 or 23, and consequently, there is no necessity to pivot the lower side head arm 63 with respect to the carriage 64 (see FIGS. 20, 21).

In contrast, the upper side head arm 63 must be kept away from the locus of the disk cartridge 1 or 23. Otherwise, the upper side head arm 63 interferes with the disk cartridge 1 or 23 upon loading or unloading of the disk cartridge 1 or 23.

Figure 20:
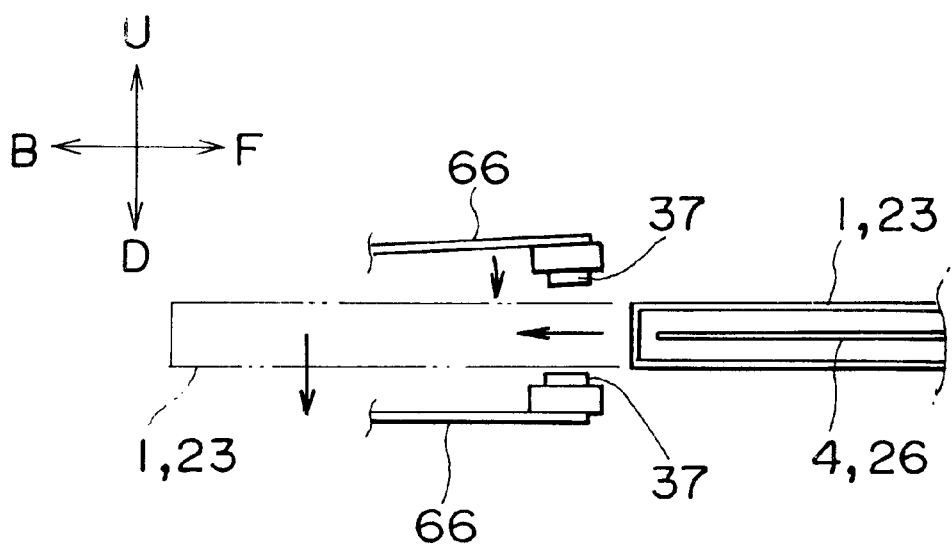
FIG. 20 is a side elevational view illustrating insertion and removal of a disk cartridge between upper and lower magnetic heads.
Figure 21:
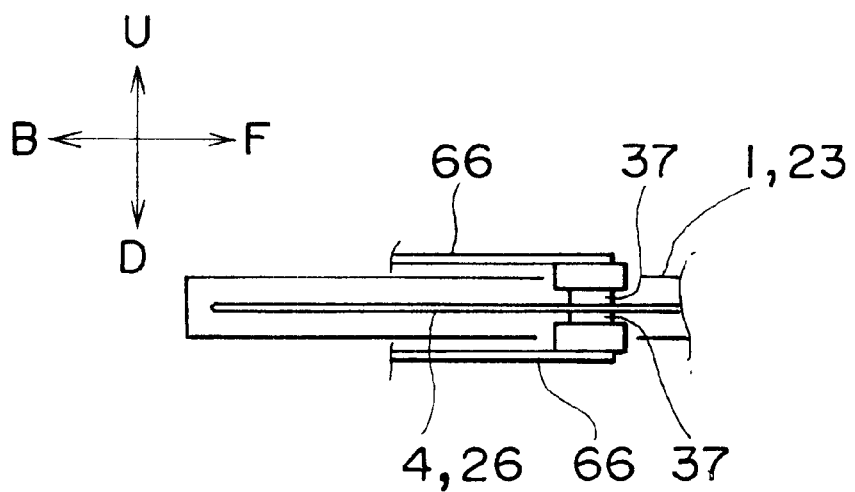
FIG. 21 is a side elevational view illustrating recording/reproduction of the disk cartridge inserted between the upper and lower magnetic heads.

Therefore, the arm base 65 of the upper side head arm 63 is mounted for pivotal motion in the upward and downward directions with respect to the carriage 64 (see to FIGS. 20, 21).

A pair of sliding arms 67, 67 extending sidewardly leftwardly and rightwardly are integrally molded on the opposite left and right side portions of the arm base 65 of the upper side head arm 63. When the upper side magnetic head 37 is brought into contact with the floppy disk 4 or 26, the pair of left and right sliding arms 67, 67 are placed onto the opposite left and right side edges of a head insertion opening 68 formed at a rear end portion of a top plate 34a of the cartridge holder 34 (see FIG. 10). The downward pivotal motion of the upper side arm base 65 is thereby restricted.

(10) Head Feeding Mechanism

The head feeding mechanism 50 is formed as a so-called linear actuator and includes two yokes 69, 69 having a horizontally laid U-shape as viewed from a side thereof. The yokes 69, 69 are disposed on the chassis 33 in a suitably spaced relationship from each other in the leftward and rightward directions. A magnet plate 70 is mounted on an upper side of one of the yoke pieces 69a, 69a of the opposing yokes 69. Voice coils 71, 71 are provided separately at the opposite left and right side portions of the carriage 64, and two guide shafts 72, 72 are disposed on the chassis 33 in such a manner as to extend in the forward and backward directions of the chassis 33 for supporting the carriage 64 for sliding movement thereon. The head feeding mechanism 50 is disposed at a substantially central portion in the leftward and rightward directions of a rear end portion of the chassis 33. One of the guide shafts 72, 72 serves as a main guide shaft while the other serves as a sub guide shaft (see FIGS. 18, 19).

Figure 18:
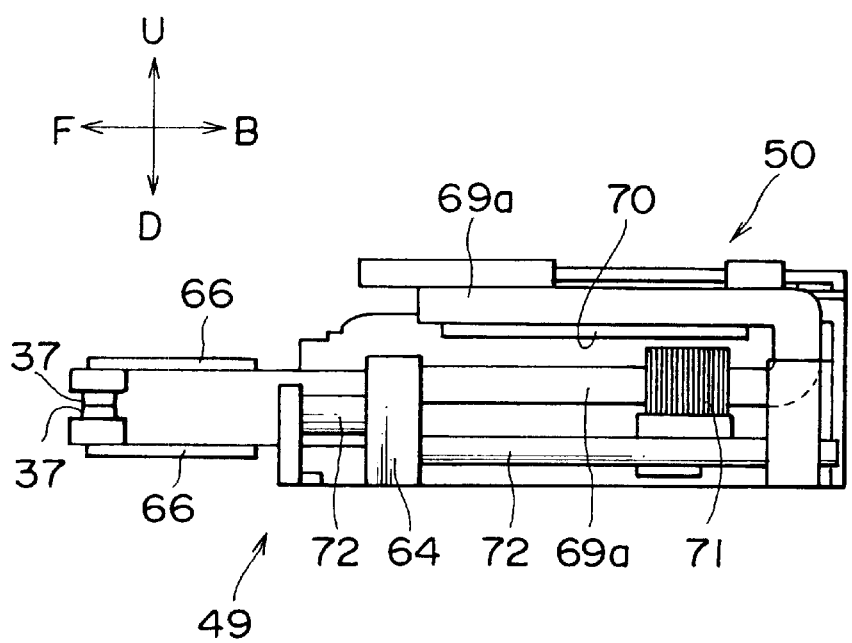
FIG. 18 is a side elevational view of the head supporting mechanism and a head feeding mechanism of the disk drive apparatus of FIG. 9.

The yokes 69 and the magnet plate 70 are elongated in the forward and backward directions and are formed substantially equal in length to or somewhat longer than the range of movement of the carriage 64 supported for sliding movement on the guide shafts 72, 72 (see FIG. 18).

Each voice coil 71 is formed as a hollow, rectangularly wound coil and is mounted on the carriage 64 such that a space 73 surrounded by the voice coil 71 is directed in the forward and backward directions and the yoke piece 69a and the magnet plate 70 are positioned in a non-contacting condition in the space 73 (see FIG. 18).

The direction of movement of each of the magnetic heads 37, 37 mounted on the carriage 64 is in the forward and backward directions of the chassis 33 and coincides with the left-right reference line Plr described hereinabove (see FIG. 10).

Accordingly, the magnetic heads 37, 37 are moved in a diametrical direction of the floppy disk 4 or 26. Moreover, since the direction of movement of the magnetic heads 37, 37 is the scanning direction, the forward and backward directions of the chassis 33 and the scanning direction coincide with each other.

(11) Mode Selection Mechanism

Modes which can be selected by the mode selection mechanism 51 include a cartridge unloading (hereinafter referred to as "ejection") mode, a head loading mode and a head unloading mode. The head loading mode includes a head position holding mode, and the head unloading mode includes a head retraction mode.

The ejection mode is performed by a cartridge loading mechanism 74, and the head loading mode and the head unloading mode are performed by a head loading mechanism 75. The head loading mechanism 75 includes a head lifting mechanism 76 for performing head loading (landing) or head unloading (takeoff) of the magnetic heads 37, 37 onto or from the floppy disk 4 or 26, a head loading rentention mechanism 77 for forming the retention mode of the loading head position and a head retraction mechanism 78 for forming the head retraction mode (see FIG. 39).

The mode selection mechanism 51 includes a geared motor 79 and a cam disk 80 which is rotated by the geared motor 79, and is disposed at a right end portion of the rear side of the chassis 33. The cam disk 80 projects from the right side face of a casing 79a of the geared motor 79 and is positioned such that a rotary shaft thereof extends in the leftward and rightward directions (see FIG. 22).

A cam protrusion 81 is provided at a position of the cam disk 80 displaced from the center of rotation of the cam disk 80 such that it projects rightwardly. When the cam disk 80 is rotated comparatively slowly by driving of the geared motor 79, the cam protrusion 81 is moved in a circumferential direction.

While details are hereinafter described, where the position of the cam protrusion 81 of the cam disk 80 when it is positioned most forwardly in its locus of revolution is represented as an initial position A, the cam protrusion 81 can revolve in the lower side revolutionary direction from the initial position A (the counterclockwise direction, hereinafter referred to as "CCW direction" opposite to the clockwise direction, as viewed from the right) and revolve in the upper side revolution from the initial position A (the clockwise direction, hereinafter referred to as "CW direction", as viewed from the right) (see FIG. 22).

Further, the mode selection mechanism 51 includes a position detection switch 82 for detecting the position of the cam protrusion 81. The position detection switch 82 detects four positions of the cam protrusion 81 including the initial position A mentioned hereinabove, a position B reached by revolution of 90 degrees in the CCW direction from the initial position A, a position C reached by revolution of 180 degrees in the CCW direction from the initial position A, and a position D reached by revolution of 270 degrees in the CCW direction from the initial position A (see FIG. 22).

Figure 23:
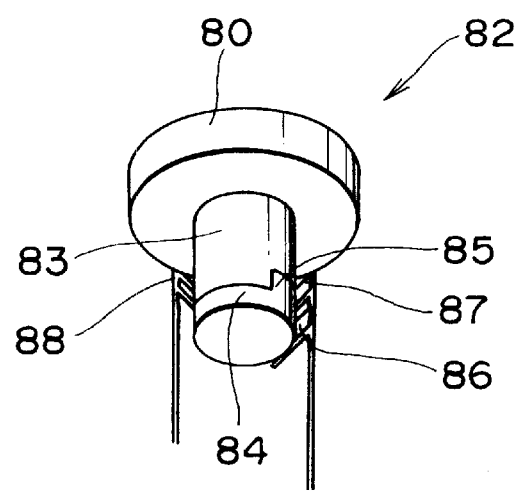
FIG. 23 is a perspective view illustrating a position detection switch of the disk drive apparatus of FIG. 9.
Figure 24:
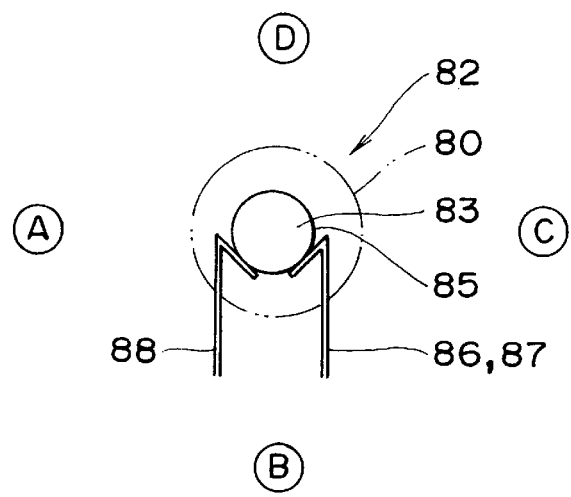
FIG. 24 is a side elevational view illustrating a position detection switch used in the disk drive apparatus of FIG. 9.

The position detection switch 82 includes a ring contact 84 formed over an entire outer periphery of a stem 83 formed integrally with the cam disk 80, a partial contact 85 formed over substantially half the outer periphery of the stem 83 which is formed integrally with the ring contact 84, and an A terminal piece 87, and a B terminal piece 88 for selectively contacting with the partial contact 85. The position detection switch 82 is built in the casing 79a of the geared motor 79 (see FIGS. 23, 24).

The A terminal piece 87 and the B terminal piece 88 are spaced from each other by approximately 90 degrees in the circumferential direction and provided so as to contact an outer peripheral phase on which the partial contact 85 is formed. Consequently, when the stem 83 rotates, the A terminal piece 87 and/or the B terminal piece 88 selectively contact the partial contact 85.

If the A terminal piece 87 and/or the B terminal piece 88 contact the partial contact 85, then the A terminal piece 87 and/or the B terminal piece 88 are electrically connected to the ground terminal piece 86 described above. Consequently, four conditions of ON conditions or OFF conditions of the A terminal piece 87 and the ground terminal piece 86 and ON conditions or OFF conditions of the B terminal piece 88 and the ground terminal piece 86 can be detected. Accordingly, since such four conditions correspond to the four positions (A, B, C, D) of the cam protrusion 81 described above, the positions (A, B, C, D) of the cam protrusion 81 can be detected (see FIG. 25).

Figure 25:
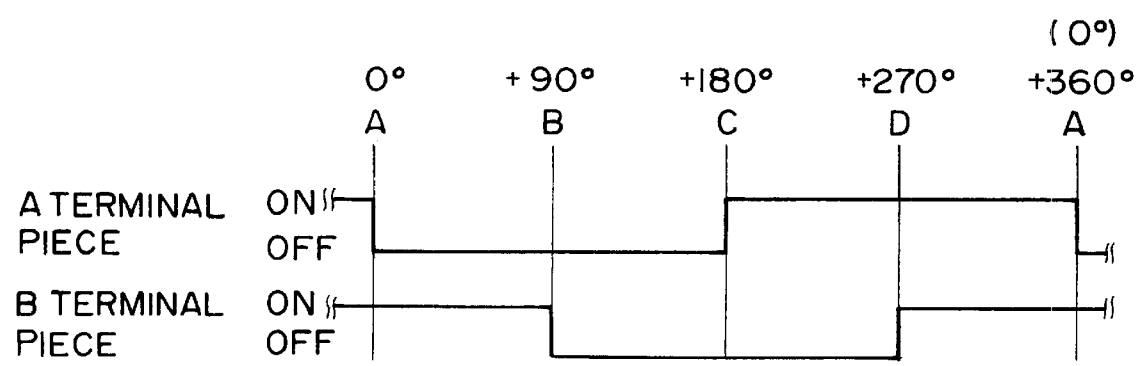
FIG. 25 is a chart representing the rotational displacement of terminal pieces of the position detection switch of FIG. 24.

When transition from an ON state to an OFF state or from an OFF state to an ON state between each of the terminal pieces 87, 88 and the partial contact 85 is detected, the initial position A, the position B, the position C or the position D is immediately detected (see FIG. 25).

More particularly, position detection of the cam protrusion 81 is performed such that the initial position A is detected when the B terminal piece 88 and the A terminal piece 87 begins transition from an ON state to an OFF state, the position B is detected at a moment at which the B terminal piece 88 begins transition from an OFF state to an ON state and the A terminal piece 87 is in an OFF state, the position C is detected when the B terminal piece 88 is in an OFF state and the A terminal piece 87 begins transitions from an OFF state to an ON state, and the position D is detected at a moment at which the B terminal piece 88 begins transition from an OFF state to an ON state and the A terminal piece 87 is in an ON state (see FIG. 25).

As will be discussed in more detail below, an arresting portion of the slider 35 is positioned rearwardly of the cam protrusion 81 corresponding to the lower side revolution of the cam protrusion, and a pressed edge of a slide member of the head loading mechanism 75 is positioned rearwardly of the cam protrusion 81 corresponding to the upper side revolution.

Figure 22:
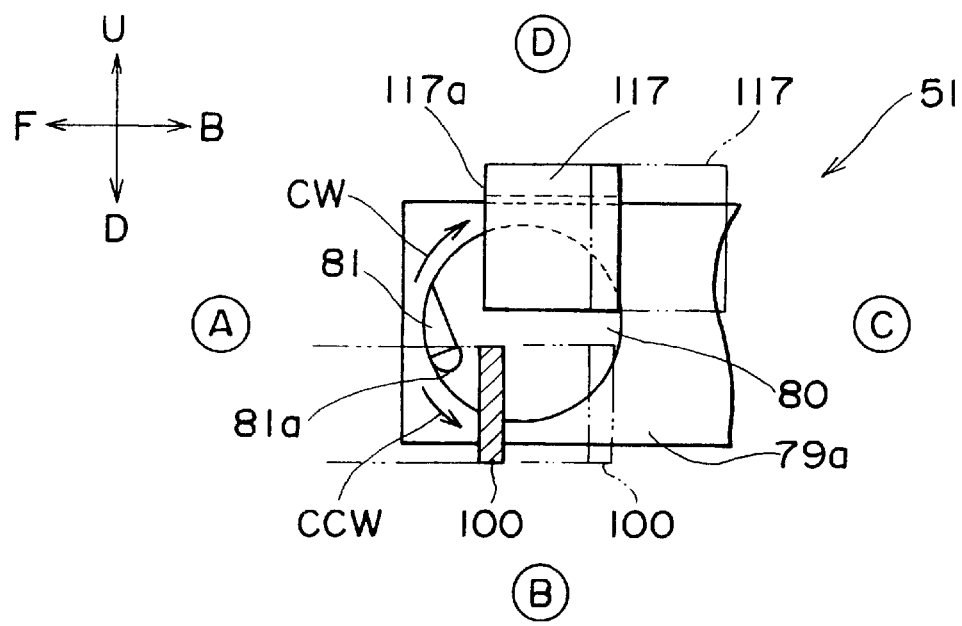
FIG. 22 is a side elevational view illustrating of a mode selection mechanism of the disk drive apparatus of FIG. 9.

Depending upon whether the cam protrusion 81 performs the lower side revolution or the upper side revolution, the cam protrusion 81 selectively arrests the hooking portion or the pressed edge to press it rearwardly or cause slow rearward movement thereof during the forward return of the pressed edge in accordance with its revolution so that various modes may be achieved (see FIG. 22).

An end face of the cam protrusion 81 is formed as an inclined face 81a whose end portion in the CCW direction may approach the base portion side toward the CCW direction. Consequently, in such an abnormal situation as hereinafter described, the inner side (left side) of a right side piece of the slider member can ride downwardly along the inclined face 81a so that the slider member can be restored its normal condition (see FIGS. 58 to 62).

(12) Cartridge Loading Mechanism

Figure 26:
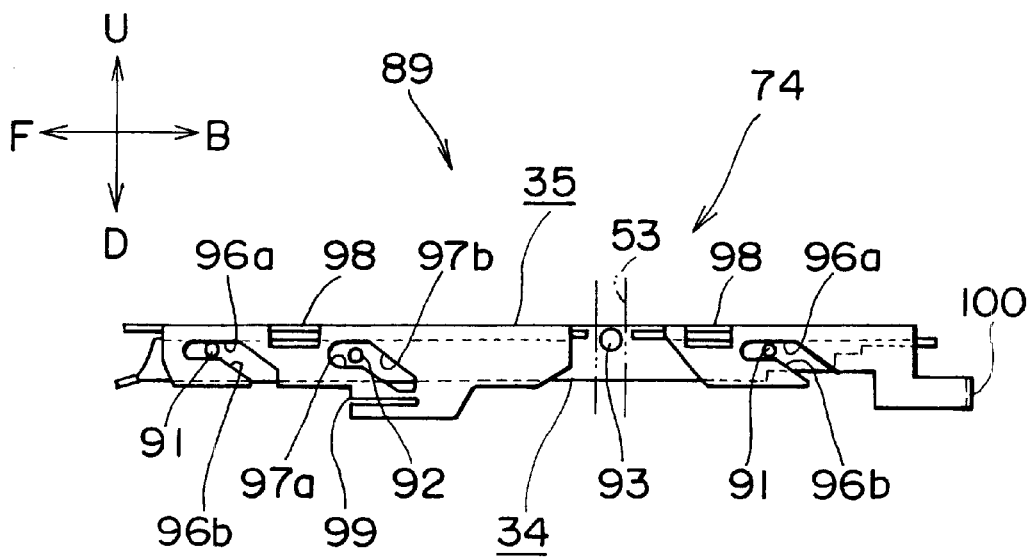
FIG. 26 is a side elevational view illustrating the cartridge loading mechanism of the disk drive apparatus of FIG. 9 in an ejection condition.
Figure 27:
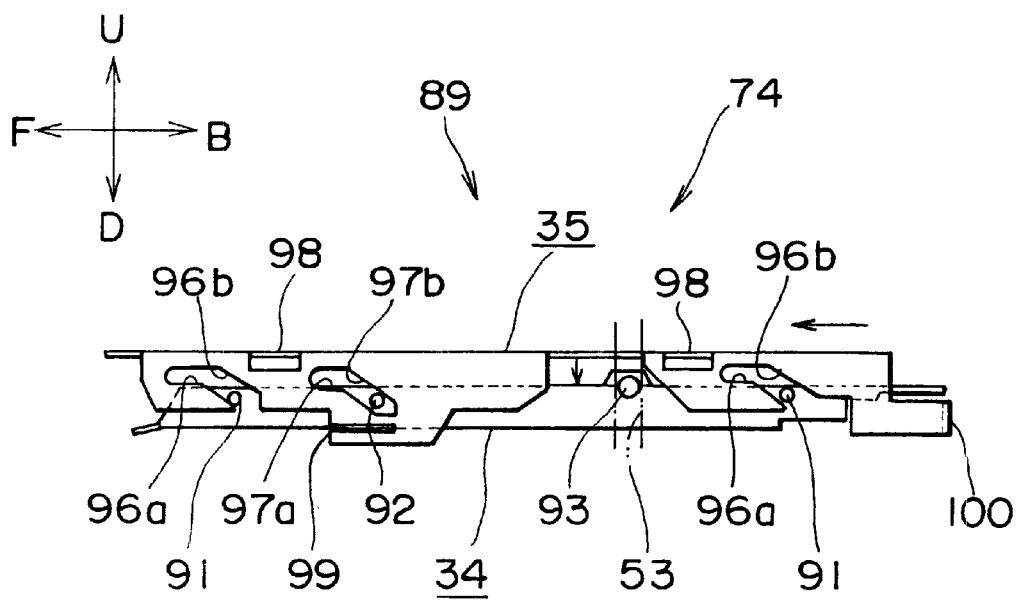
FIG. 27 is a side elevational view illustrating the cartridge loading mechanism of the disk drive apparatus of FIG. 9 in a loading condition.

The cartridge loading mechanism 74 includes the cartridge holder 34, the slider 35, cartridge pressing member 89 for pressing the disk cartridge 1 or 23 to the cartridge loading position, and a locking member 90 for holding the cartridge holder 34 and the slider 35 at the cartridge loading position (see FIGS. 26, 27).

(12-1) Cartridge Holder

Figure 28:
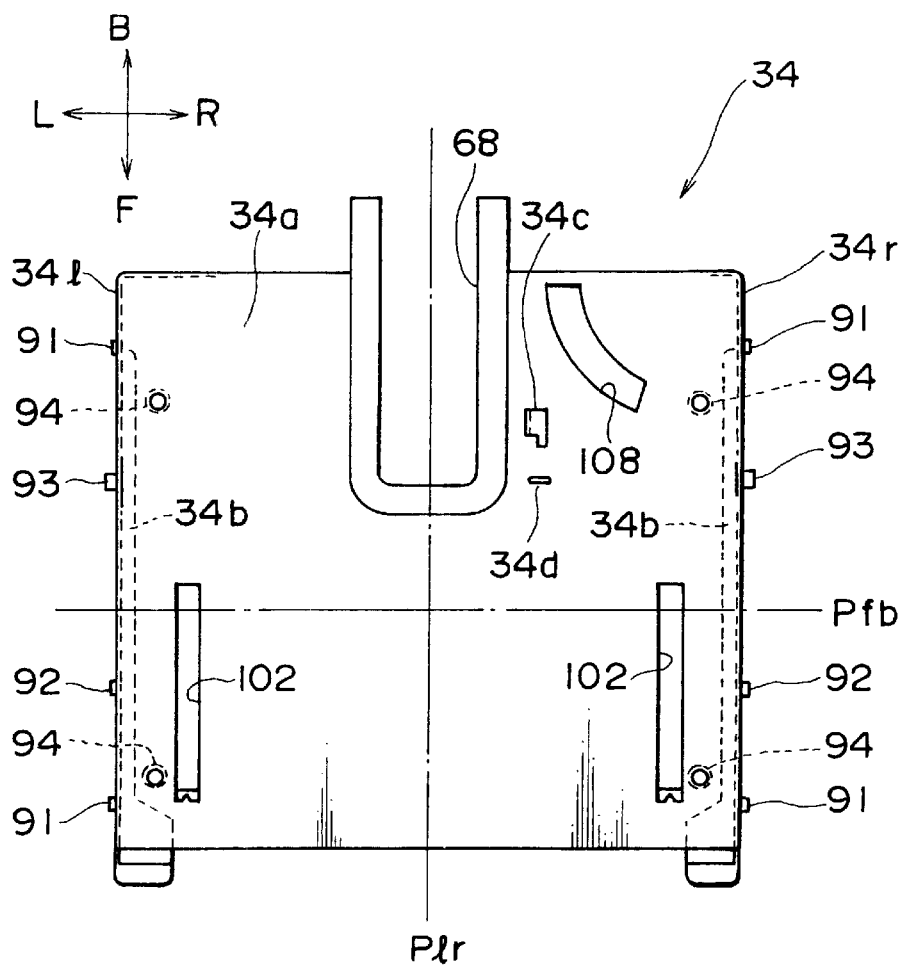
FIG. 28 is a top plan view of a cartridge holder used in the disk drive apparatus of FIG. 9.
Figure 29:
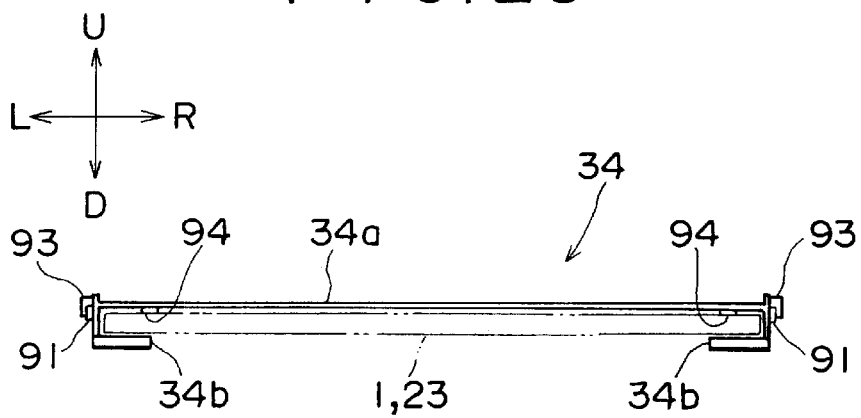
FIG. 29 is a front elevational view of the cartridge holder of FIG. 28.

As shown in FIGS. 28 and 29, the cartridge holder 34 includes a top plate 34a having a horizontal dimension slightly greater than the disk cartridge 1 or 23, the opposite left and right side walls 34l, 34r extending downwardly from the opposite left and right side edges of the top plate 34a, and lower supporting pieces 34b, 34b projecting toward each other from lower side edges of the opposite left and right side walls 34l, 34r. The cartridge holder 34 is formed from a sheet metal material by presswork as a unitary member. The opposite left and right side walls 34l, 34r are formed with a vertical dimension slightly greater than the thickness of the disk cartridge 1 or 23. Consequently, the disk cartridge 1 or 23 can be inserted from the front into the cartridge holder 34 and held with a slight clearance left therebetween.

The left and right side walls 34l, 34r of the cartridge holder 34 are formed with a height which is substantially equal to one half the height of the opposite left and right side walls 33l, 33r of the chassis 33. The cartridge holder 34 is supported for movement between the ejection position at which it is positioned in the upper half in the chassis 33 and the cartridge loading position in which it is positioned in the lower half in the chassis 33.

The left and right side walls 34l and 34r of the cartridge holder 34 are formed such that the distance therebetween is smaller than the distance between the left and right side walls 33l and 33r of the chassis 33 and is slightly smaller than the distance between left and right side pieces 35l and 35r of the slider 35 (see FIG. 10).

On the outer side faces of the opposite left and right side walls 34l, 34r of the cartridge holder 34, guided pins 91, 91, are formed integrally at positions near to the opposite front and rear ends, and pressed pins 92, 92 are formed forwardly from the front-rear reference line Pfb. The guided pins 91, 91 and the pressed pins 92, 92 individually correspond to the escape groove recesses 54, 54, 54 of the chassis 33 (see FIGS. 28, 29).

Further, the cartridge holder 34 includes integrally formed vertically extending guide pins 93, 93 which project slightly more than and have a slightly greater diameter than the guided pins 91, 91 or the pressed pins 92, 92 at positions substantially intermediate between the guided pins 91 and the front-rear reference line Pfb on the rear sides of the outer side faces of the opposite left and right side walls 34l, 34r of the cartridge holder 34. The vertically extending guide pins 93 correspond to the guide groove recesses 53 of the chassis 33 (see FIGS. 26, 27).

Pressing protrusions 94, 94 are formed at random positions of a rectangular portion of the top plate 34a of the cartridge holder 34 such that the pressing protrusions project from a lower face of the top plate 34a. As hereinafter described, when the disk cartridge 1 or 23 is loaded, the pressing protrusions 94, 94 press corresponding locations of the disk cartridge 1 or 23 downwardly to press the disk cartridge 1 or 23 against the protrusions 58, 58 formed on the chassis 33. The pressing protrusions 94, 94 are formed at arbitrary positions at which the floppy disk 4 or 26 is not positioned in the disk cartridge 1 or 23 (see FIGS. 28, 29, 37).

(12-2) Slider

Figure 30:
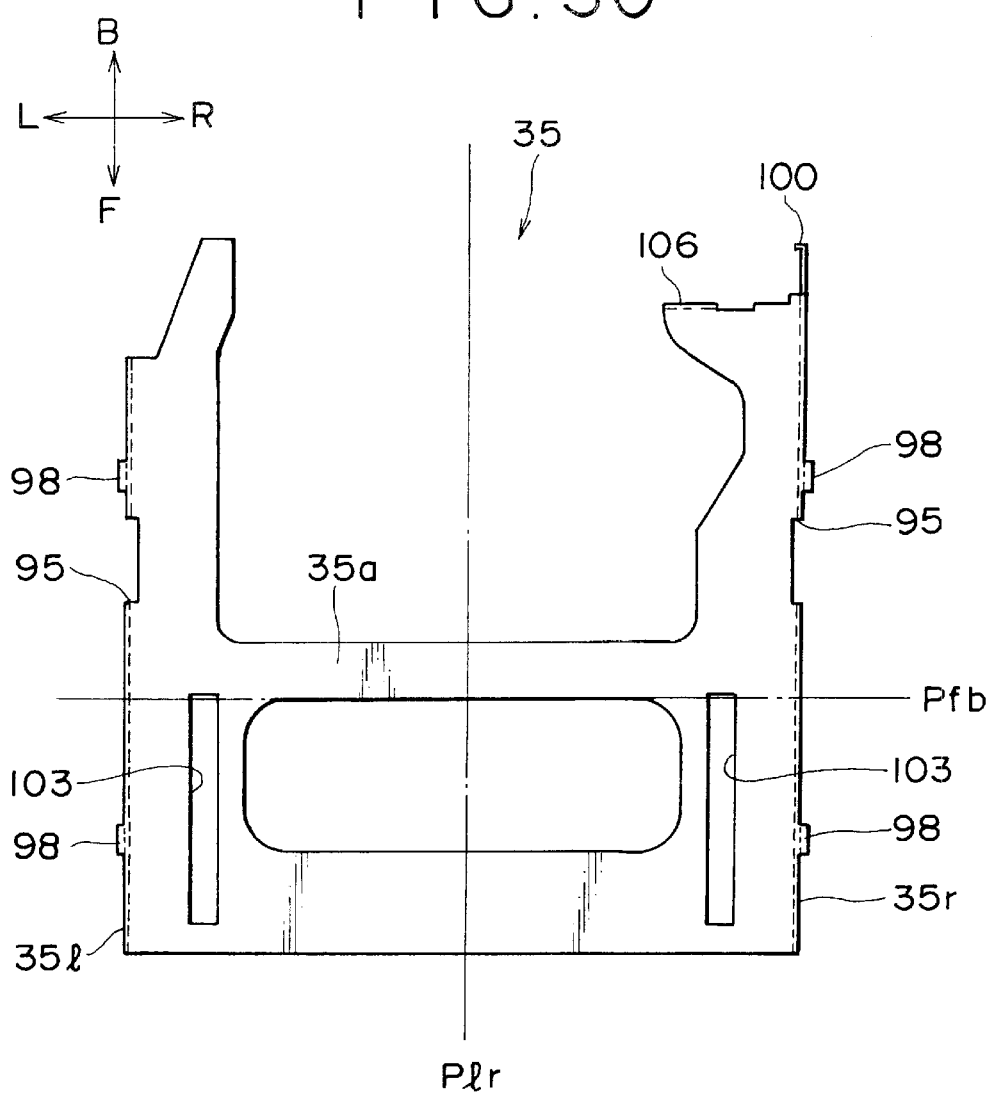
FIG. 30 is a top plan view of a slider used in the disk drive apparatus of FIG. 9.
Figure 31:
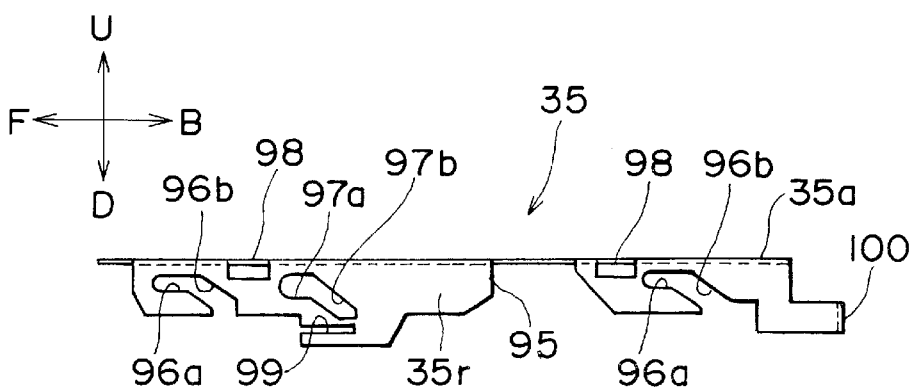
FIG. 31 is a side elevational view of the slider of FIG. 30.

As shown in FIGS. 30 and 31, the slider 35 includes a substantially U-shaped top plate 35a which is opened rearwardly. The opposite left and right side pieces 35l, 35r of the slider 35 extend downwardly from the opposite left and right side edges of the top plate 35a. The slider 35 is formed from a sheet metal material by presswork as a unitary member (see FIGS. 30, 31).

The left and right side pieces 35l and 35r of the slider 35 are formed such that the distance therebetween is slightly smaller than the distance between the left and right side walls 33l and 33r of the chassis 33 and is slightly greater than the distance between the left and right side walls 34l and 34r of the cartridge holder 34 (see FIG. 10).

Consequently, when the cartridge holder 34 and the slider 35 are assembled to the chassis 33, a slight clearance is provided between the chassis 33 and the slider 35 and a slight clearance is provided between the slider 35 and the cartridge holder 34 (see FIG. 10).

Recesses 95, 95 are formed in the opposite left and right side pieces 35l, 35r of the slider 35 displaced rearwardly from the front-rear reference line Pfb and corresponding to the vertically extending guide pins 93, 93 of the cartridge holder 34. Further, inclined guide grooves 96, 96 for moving the cartridge holder 34 vertically are formed at the opposite front and rear end portions of the opposite left and right side pieces 35l, 35r of the slider 35. In addition, inclined pressing grooves 97, 97 for pressing the cartridge holder 34 downwardly are formed at the opposite left and right side pieces 35*l*, 35*r* of the slider 35 displaced forwardly from the front-rear reference line Pfb (see FIG. 31).

Each inclined guide groove 96 includes a horizontal portion 96*a* at an upper portion and an inclined portion 96*b* which extends downwardly toward the rear side from a rear end portion of the horizontal portion 96*a*. One of the guided pins 91 of the cartridge holder 34 is held in engagement with the inclined guide groove 96 for sliding movement (see FIGS. 26, 27).

Further, the lower edge side of the opposite upper and lower edges which form the horizontal portion 96*a* and the inclined portion 96*b* of the inclined guide groove 96 is smoothly formed so that, when the cartridge holder 34 is moved obliquely downwardly rearwardly or obliquely upwardly forwardly relative to the slider 35, the guided pins 91, 91 of the cartridge holder 34 smoothly move in the inclined guide grooves 96, 96, (see FIGS. 26, 27).

Each inclined pressing groove 97 has substantially the same shape as the inclined guide groove 96 and includes a horizontal portion 97*a* at an upper portion thereof and an inclined portion 97*b* which extends downwardly toward a rear end portion of the horizontal portion 97*a*. One of the pressed pins 92 of the cartridge holder 34 is engaged for sliding movement in the inclined pressing groove 97 (see FIGS. 26, 27).

The upper end side of the opposite upper and lower edge portions which define the horizontal portion 97*a* and the inclined portion 97*b* of the inclined pressing groove 97 is smoothly formed so that, when the cartridge holder 34 is moved downwardly, the pressed pins 92, 92 of the cartridge holder 34 are pressed downwardly with a high degree of accuracy by the upper edge portions (see FIGS. 26, 27).

As a consequence thereof, when the cartridge holder 34 moves downwardly obliquely rearwardly or upwardly obliquely forwardly relative to the slider 35, the pressed pins 92, 92 do not contact the edge portions of the inclined pressing grooves 97, 97. On the other hand, when the cartridge holder 34 moves downwardly and the disk cartridge 1 or 23 is pressed against the protrusions 58, 58 of the chassis 33, the edge portions of the inclined guide grooves 96, 96 do not contact with the guided pins 91, 91 (see FIGS. 26, 27).

Tongues 98, 98, projecting horizontally outwardly at the upper edges of the opposite left and right side pieces 35*l*, 35*r* of the slider 35 corresponding to locations between the front side inclined guide grooves 96 and the inclined pressing grooves 97 slightly forwardly of the rear side inclined guide grooves 96 (see FIGS. 20, 31).

Slits 99, 99 are formed below the inclined pressing grooves 97 of the slider 35, and the sliding pieces 55, 55 formed on the chassis 33 are inserted for sliding movement in the slits 99, 99 (see FIG. 31).

When the slider 35 is assembled to the chassis 33, the tongues 98, 98 are placed onto the upper side edges of the left and right side walls 33*l*, 33*r* of the chassis 33 and the sliding pieces 55, 55 are inserted into the slits 99, 99 of the left and right side pieces 35*l*, 35*r* of the slider 35. Consequently, the slider 35 is mounted for movement in the forward and backward directions with respect to the chassis 33 while the slider 35 retains its horizontal position. In addition, removal of the slider 35 from the chassis 33 is prevented.

The rear end of the right side piece 35*r* of the slider 35 further extends rearwardly and is bent at the end thereof to form an arresting portion 100. The arresting portion 100 is opposed to a lower half portion of the cam disk 80 of the mode selection mechanism 51 and is positioned on the locus of movement of the cam protrusion 81 described hereinabove (see FIGS. 10, 22, 30).

Consequently, when the cam protrusion 81 revolves in the lower side revolution (in the CCW direction as viewed from the right) from the initial position A, the slider 35 is pulled by the cam protrusion so that it is pressed rearwardly. When the slider 35 is pressed rearwardly, the locking member 90 is disengaged to allow ejection of the disk cartridge 1 or 23 (see FIG. 22).

Further, when the disk cartridge 1 or 23 is ejected, the cam disk 80 of the mode selection mechanism 51 rotates in the CW direction and the cam protrusion 81 returns to the initial position A. In order for the cam protrusion 81 to return to the initial position A, the position detection switch 82 detects that the cam protrusion 81 comes to the position C (see FIG. 22).

(12-3) Cartridge Pressing Member

Figure 32:
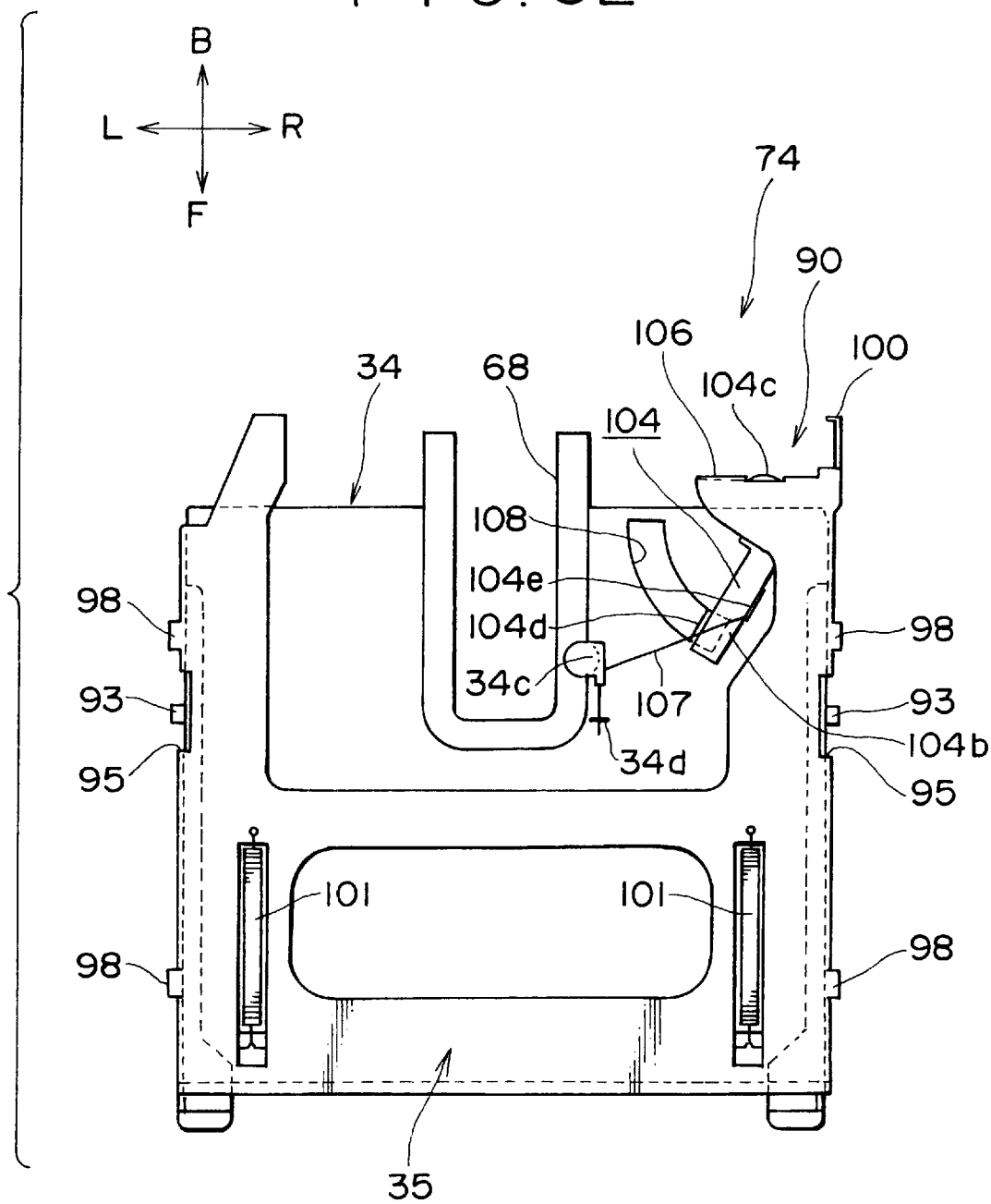
FIG. 32 is a top plan view of the cartridge holder of FIG. 28 and the slider of FIG. 30 in a joined condition.

The cartridge pressing member 89 includes the vertically extending guide pins 93, 93 and the guide groove recesses 53, 53 of the chassis 33 for guiding the cartridge holder 34 vertically, the guided pins 91, 91 and the inclined guide grooves 96, 96 of the slider 35 for moving the cartridge holder 34, tension coil springs 101, 101 serving as biasing means for pressing the cartridge holder 34 downwardly, and the pressed pins 92, 92 and the inclined pressing grooves 97, 97 of the slider 35 for transmitting the biasing forces of the tension coil springs 101, 101 to the cartridge holder 34 (see FIGS. 26, 27 and 32).

The tension coil springs 101, 101 extend between front end edges of spring accommodation holes 102, 102, which extend horizontally along the top plate 34*a* of the cartridge holder 34 spaced apart from each other. The rear end edges of spring accommodation holes 103, 103 are formed along the top plate 37*a* of the slider 35 which substantially vertically coincide with the spring accommodation holes 102, 102 of the cartridge holder 34. Consequently, the cartridge holder 34 is biased rearwardly with respect to the slider 35 while the slider 35 is biased forwardly with respect to the cartridge holder 34. Since the cartridge holder 34 is allowed to move only vertically with respect to the chassis 33, the slider 35 is therefore biased forwardly (see FIGS. 26, 27, 28, 30 and 32).

The forward movement of the slider 35 is stopped when the cartridge holder 34 is positioned on the lower side in the chassis 33. In particular, a locked piece provided on the slider 35 abuts from the rear side thereof with a rear side edge of the top plate 34*a* of the cartridge holder 34. However, when the cartridge holder 34 is positioned on the upper side in the chassis 33, the locked piece abuts a trigger lever supported for pivotal motion on the cartridge holder 34.

Further, when the disk cartridge 1 or 23 is positioned on the lower side in the chassis 33 and the disk cartridge is held on the cartridge holder 34 (in the cartridge loading condition), the disk cartridge 1 or 23 is pressed against the protrusions 58, 58 to prevent downward movement of the cartridge holder 34. Consequently, the inclined pressing grooves 97, 97 are arrested by the pressed pins 92, 92 to prevent forward movement of the slider 35 (see FIG. 38).

However, when the slider 35 moves in the forward or backward directions with respect to the chassis 33, the guided pins 91, 91 of the cartridge holder 34 supported for vertical movement with respect to the chassis 33 move in the inclined guide grooves 96, 96 of the slider 35. If the slider 35 moves forwardly, then the cartridge holder 34 moves downwardly with respect to the chassis 33 (the cartridge loading condition) (see FIG. 27). But, if the slider 35 moves rearwardly, then the cartridge holder 34 moves upwardly with respect to the chassis 33 (the ejection condition) (see FIG. 26).

A pressed condition of the disk cartridge 1 or 23 in the cartridge loading condition is hereinafter described.

(12-4) Locking Member

The locking member 90 is provided to hold the cartridge holder 34 and the slider 35 at the cartridge loading position. The cartridge holder 34 is locked by the locking member 90 after the cartridge holder 34 moves downwardly in the chassis 33 while the slider 35 is locked by the locking member 90 after the slider 35 moves most forwardly within its range of movement, maintaining the cartridge loading condition (see FIGS. 33, 35).

The locking member 90 includes a trigger lever 104 supported for pivotal motion on the cartridge holder 34, a locked piece 106 formed on the slider 35 for engaging with a locking portion 105 formed on the trigger lever 104, and a torsion coil spring 107 for biasing the trigger lever 104 in an unlocking direction (see FIG. 32).

The trigger lever 104 is formed from a sheet metal member having a substantially L-shape and is supported at a bent portion 104a thereof for pivotal motion at a right rear end portion of the top plate 34a of the cartridge holder 34. The trigger lever 104 is disposed in such an orientation that, in the cartridge loading condition, a longer one 104b (hereinafter referred to as "longer piece") of pieces of the trigger lever 104 extends leftwardly and a shorter one 104c (hereinafter referred to as "shorter piece") of the pieces extends rearwardly. It is to be noted that, in the cartridge loading condition, the trigger lever 104 is held in a locking condition (see FIGS. 33, 34).

A downwardly bent pressed piece 104d is formed at a position on a rear side edge of the longer piece 104b of the trigger lever 104 displaced to an end of the same in the locking condition. In addition, an upwardly bent spring arresting portion 104e is formed at a front side edge of the longer piece 104b displaced toward the bent portion 104a (see FIGS. 32 to 34).

The shorter piece 104c of the trigger lever 104 is formed such that the width thereof increases toward the end thereof, and an end edge 104f of the shorter piece 104c is formed in an arc centered at the fulcrum of pivotal motion of the trigger lever 104. Further, a left side edge of the shorter piece 104c serves as the aforementioned locking portion 105 (see FIGS. 33, 34).

Figure 35:
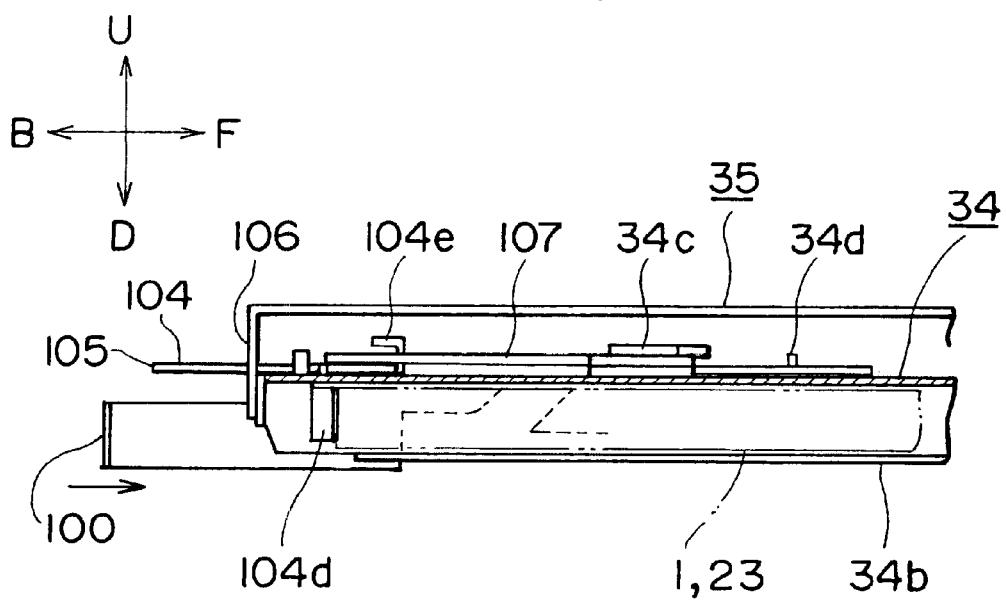
FIG. 35 is an enlarged side elevational view illustrating the locking member of FIG. 33 in the locking condition.
Figure 36:
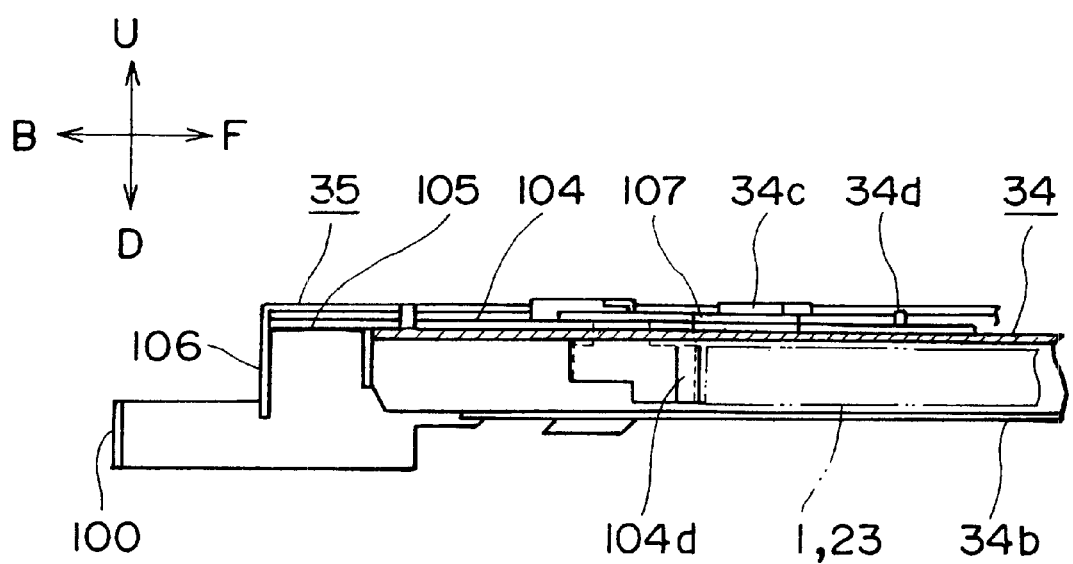
FIG. 36 is an enlarged side elevational view illustrating the locking member of FIG. 33 in the unlocked condition.

At a portion of an inner side of a rear end edge of a right side portion of the top plate 37a of the slider 35, the locked piece 106 is vertically bent downwardly (see FIGS. 35, 36).

An arcuate through-hole 108 with a center of curvature at the fulcrum of pivotal motion of the trigger lever 104 is formed in the top plate 34a of the cartridge holder 34. The pressed piece 104d of the trigger lever 104 is inserted into the through-hole 108 and positioned downwardly inside of the cartridge holder 34 from above to allow pivotal motion of the trigger lever 104 (see FIGS. 32 to 34).

The through-hole 108 is formed with a central angle of approximately 60 degrees and is positioned such that, in the locking condition, the longer piece 104b of the trigger lever 104 extends leftwardly. However, in the unlocking condition, the longer piece 104b of the trigger lever 104 extends leftwardly obliquely forwardly (see FIGS. 32 to 34).

A positioning piece 34c on which a coil portion of the torsion coil spring 107 is positioned is provided at the top plate 34a of the cartridge holder 34 leftwardly obliquely forwardly of the through-hole 108. Further, a spring arresting piece 34d is formed at the top plate 34a of the cartridge holder 34 slightly forwardly from the positioning piece 34c. The torsion coil spring 107 is fitted at the coil portion thereof around the positioning piece 34c and is arrested at one end portion thereof by the spring arresting portion 104e formed on the longer piece 104b of the trigger lever 104 and at the other end portion thereof by the spring arresting piece 34d. Consequently, the trigger lever 104 is biased in the CCW direction as viewed from above by the torsion coil spring 107 (see FIG. 32).

(12-5) Cartridge Loading Operation

Cartridge loading or ejection of the disk cartridge 1 or 23 is performed in the following manner by the cartridge loading mechanism 74.

Loading (cartridge loading) of the disk cartridge 1 or 23 into the FD drive apparatus 30 is performed in a condition wherein the cartridge holder 34 is in a raised position with respect to the chassis 33 and the slider 35 is positioned rearwardly, that is, in the ejection condition.

In the ejection condition, the trigger lever 104 is in the unlocking condition, and the locked piece 106 of the slider 35 is held in resilient contact with the end edge 104f of the shorter piece 104c of the trigger lever 104 from the rear by the tension coil springs 101, 101.

Then, in order to load the disk cartridge 1 or 23 into the FD drive apparatus 30, first the disk cartridge 1 or 23 is artificially inserted into the cartridge slot 43 of the front panel 39 and advanced into the cartridge holder 34. Although the insertion and advancement of the disk is cartridge 1 or 23 are performed artificially, they are not so limited and can be performed by means of a disk changer or the like.

When the disk cartridge 1 or 23 is advanced into the cartridge holder 34, the front end edge 7a or 27a of the cartridge 7 or 27 of the disk cartridge 1 or 23 presses the pressed piece 104d of the trigger lever 104, which projects downwardly from the top plate 34a of the cartridge holder 34. The pressed piece 104d is pressed rearwardly against the resilient force of the torsion coil spring 107 to pivot the trigger lever 104 in the CW direction. Then, while the trigger lever 104 is pivoted, since the locked piece 106 of the slider 35 resiliently contacts from the rear the end edge 104f of the shorter piece 104c of the trigger lever 104, forward movement of the slider 35 is prevented (see FIG. 34).

If the disk cartridge 1 or 23 is inserted in its correct orientation into the cartridge slot 43, a cartridge erroneous insertion prevention lever (not shown) provided on the cartridge holder 34 is pivoted to move past the inclined face 16 of the disk cartridge 1 or is inserted into the erroneous insertion preventing groove 28 of the cartridge 23 to thereby allow insertion of the disk cartridge l or 23 into the cartridge holder 34.

On the other hand, if the disk cartridge 1 or 23 is inserted in error (inserted in the wrong orientation wherein it is reversed upwardly or downwardly, or forwardly or backwardly) into the cartridge slot 43, then the cartridge erroneous insertion prevention lever (not shown) prevents such insertion of the disk cartridge 1 or 23.

Then, when the pressed piece 104d of the trigger lever 104 is pressed by the front end edge 7a or 27a of the cartridge 7 or 27, the shutter 10 mounted for sliding movement on the cartridge 7 or 27 is pressed and moved to its opening position by the pressed piece 104d against the resilient force of the shutter spring 12.

Figure 33:
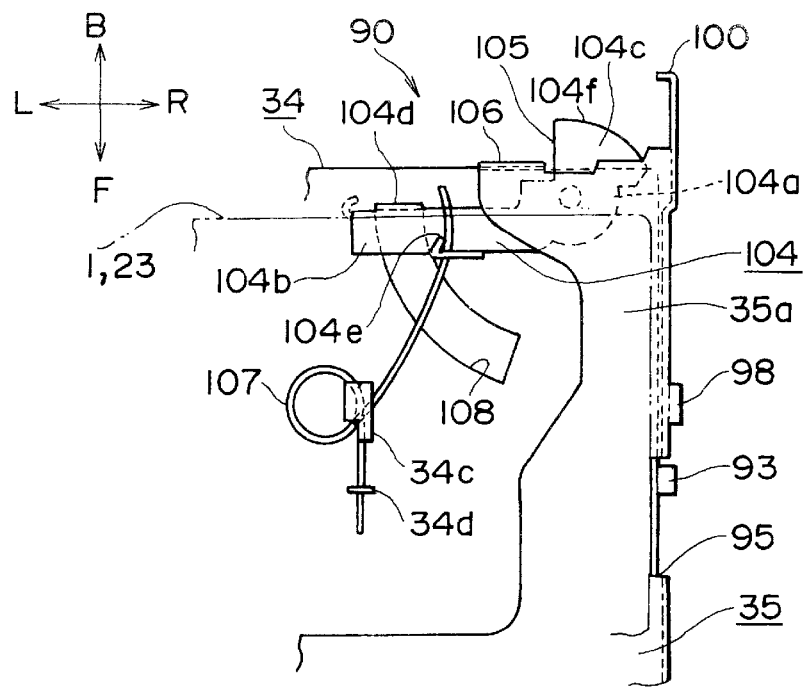
FIG. 33 is an enlarged top plan view illustrating a locking member of the disk drive apparatus of FIG. 9 in a locking condition.

When the trigger lever 104 is pivoted in the CW direction and the locked piece 106 of the slider 35 slides on the end edge 104f of the shorter piece 104c of the trigger lever 104 until the slider 35 no longer slides on the end edge 104f, that is, to a position corresponding to the locking portion 105 (left side edge) of the shorter piece 104c, then the restriction on the forward movement of the locked piece 106 of the slider 35 is canceled and the slider 35 can be moved forwardly by the tension coil springs 101, 101 (see FIG. 33).

At this time, the trigger lever 104 is in abutment with and prevented from pivotal movement by the rear end edge of the through-hole 108 of the top plate 34a of the cartridge holder 34, and the insertion of the disk cartridge 1 or 23 into the cartridge holder 34 is thereby completed (see FIG. 33).

Then, when the locked piece 106 of the slider 35 is brought into abutment with the rear side edge of the top plate 34a of the cartridge holder 34, the forward movement of the slider 35 is stopped and the locking portion 105 of the shorter piece 104c of the trigger lever 104 is engaged with the right side edge of the locked piece 106, thereby causing locking by the locking member 90 described hereinabove (see FIG. 35).

As a result of the forward movement of the slider 35, the guided pins 91, 91 of the left and right side walls 34l, 34r of the cartridge holder 34 slide on the lower end sides of the inclined portion 96b, 96b of the inclined guide grooves 96, 96 of the slider 35 and the cartridge holder 34 is moved downwardly with respect to the cartridge holder 34 (see FIG. 27).

The downward movement of the cartridge holder 34 with respect to the chassis 33 is restricted in the upward and downward directions due to the vertically extending guide pins 93, 93 sliding in the guide groove recesses 53, 53 of the chassis 33 (see FIG. 27).

When the cartridge holder 34 moves downwardly in the chassis 33, the left and right positioning reference pins 57, 57 provided on the bottom plate 33b of the chassis 33 are inserted into the reference holes 13, 13 formed on the lower face of the disk cartridge 1 or 23 which is inserted into the cartridge holder 34, thereby positioning the disc cartridge 1 or 23 with respect to the FD drive apparatus 30.

Figure 37:
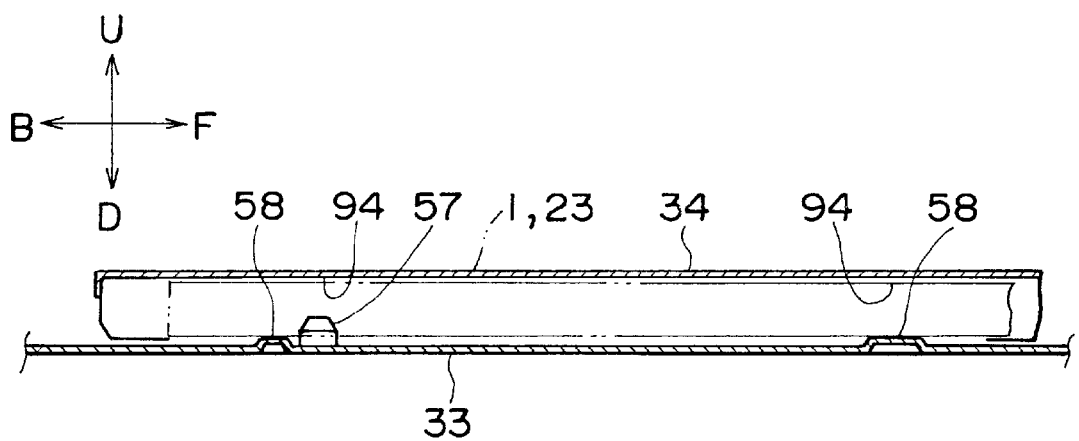
FIG. 37 is a schematic side elevational view which represents the positional relationship between a cartridge and the chassis.

When a lower face 7f or 27f of the cartridge 7 or 27 of the disk cartridge 1 or 23 is positioned as such and placed onto the protrusions 58, 58 projecting on the bottom plate 33b of the chassis 33, and an upper face 7e or 27e of the cartridge 7 or 27 is pushed by the pressing protrusions 94, 94 formed on the top plate 34a of the cartridge holder 34, the cartridge 7 or 27 is positioned in the vertical direction with respect to the chassis 33 (see FIG. 37).

Figure 38:
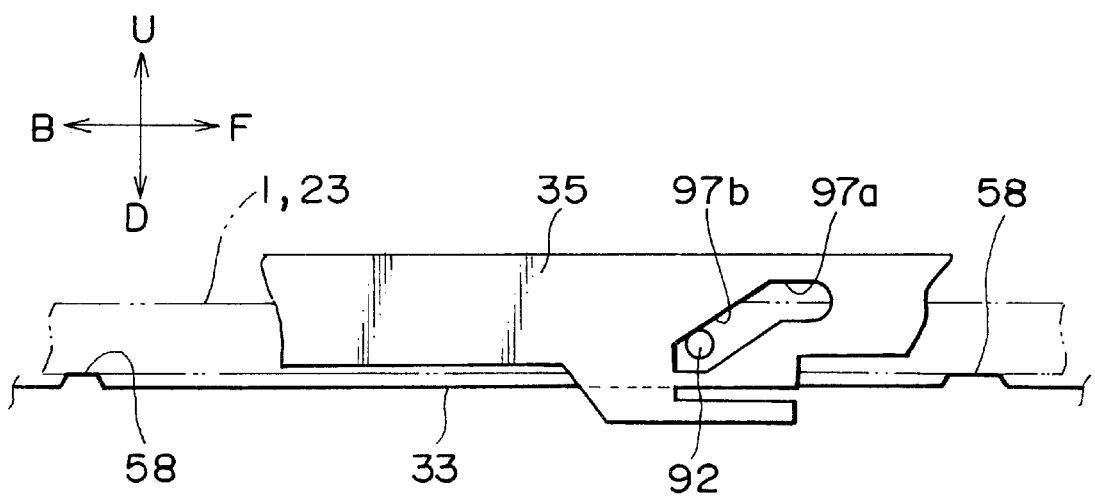
FIG. 38 is a schematic side elevational view specifically illustrating a cartridge pressing member of the disk drive apparatus of FIG. 9.

The downward pressing of the disk cartridge 1 or 23 is performed by a downward force caused by the forward moving force of the slider 35 by the tension coil springs 101, 101 when the slider force presses the pressed pins 92, 92 of the cartridge holder 34 obliquely forwardly through the inclined pressing grooves 97, 97 (see FIG. 38).

Then, since the upper side edge portions of the inclined portions 97b of the inclined pressing grooves 97 are smoothly formed, the downward force applied to the sides thereof are substantially equal to each other, and the cartridge holder 34 is pushed downwardly with substantially equal pressing forces. Accordingly, the pressing protrusions 94, 94 of the cartridge holder 34 press the disk cartridge 1 or 23 against the protrusions 58, 58 of the bottom plate 33b of the chassis 33 equally on the left and right sides thereof (see FIGS. 37, 38).

Moreover, since the pressed pins 92, 92 formed on each of the opposite left and right side walls 34l, 34r of the cartridge holder 34 are pressed, even if the projection amounts of the pressing protrusions 94, 94 formed on the top plate 34a of the cartridge holder 34 are not uniform in the horizontal direction, the cartridge holder 34 acts like a see-saw around the pressed pins 92, 92 and the reactive forces to be applied from the protrusions 58, 58 can be made substantially uniform. Consequently, the disk cartridge 1 or 23 is pressed substantially uniformly in the forward and backward directions. Accordingly, the flatness of the floppy disk 4 or 26 to be rotated in the disk cartridge 1 or 23 can be maintained (see FIG. 38).

Accordingly, if the cartridge holder 34 is pressed at a plurality of locations in the forward and backward directions thereof by the slider 35, then where the pressing protrusions 94, 94 formed on the top plate 34a of the cartridge holder 34 project non-uniformly or where the pressing inclined grooves or the pressed pins or the like are non-uniform, the pressing force for pressing the disk cartridge 1 or 23 is different among the pressing protrusions 94, 94 and the disk cartridge 1 or 23 is deformed such that the flatness of the floppy disk 4 or 26 is difficult to maintain (see FIG. 38).

Then, if the positional relationship between the cartridge holder 34 and the slider 35 is locked by the locking member 90, then the cartridge holder 34 is maintained in a lower condition with respect to the chassis 33 while the slider 35 is held at the front end of the range of movement thereof (see FIGS. 33, 35).

Further, when the cartridge holder 34 is moved downwardly in the chassis 33, the center core 3 or 29 of the floppy disk 4 or 26 of the disk cartridge 1 or 23 is chucked by the magnet sheet 61 on the disk table 60 and is inserted into the center core hole 8 of the cartridge 7 or 27 and a center hole 3a or 29a of the center core 3 or 29 is fitted onto the spindle shaft 59a. Further, the revolutionary driving pin 62 is inserted into the rotational driving pin fitting hole 3b or 29b, thereby completing the cartridge loading operation. When the cassette loading operation is performed, the magnetic heads 37, 37 are in the unloading condition by the head loading mechanism 75, and also the magnetic head 37 on the lower side does not contact with the floppy disk 4 or 26 because the suspension 66 which supports the lower side magnetic head 37 is pressed downwardly by a slide arm 110 to be described in more detail below.

Simultaneously, when the cartridge loading operation is completed, the cartridge loading completion condition is detected by the cartridge insertion detection switch. In addition, the erroneous erasure preventing detection switch detects whether or not erasure of the floppy disk 4 or 26 is permitted. Further, the recording capacity of the disk cartridge 1 or 23 loaded is detected by the small capacity detection switch and the large capacity detection switch.

Then, depending upon the detected type of the floppy disk 4 or 26, the spindle motor 59 is driven to rotate at a predetermined speed, and head loading (head landing) of the magnetic heads 37, 37 is performed and recording/reproduction of data onto/from the floppy disk 4 or 26 is performed.

(12-6) Ejection Operation

The ejection operation of the disk drive apparatus will now be described.

The ejection operation is performed by moving the arresting portion 100 of the slider 35 rearwardly by the mode selection mechanism 51 to thereby disengage the locking condition of the locking member 90. The ejection operation is performed by depressing the eject button described hereinabove.

In particular, if the eject button is depressed, the geared motor 79 of the mode selection mechanism 51 is energized to rotate the cam disk 80 so that the cam protrusion 81 thereon revolves in the lower side direction (CCW direction as viewed from the right) from the initial position A to the position B→position C. Thereupon, the cam protrusion 81 arrests the arresting portion 100 of the slider 35 to move the arresting portion 100 rearwardly (see FIG. 22).

Consequently, the slider 35 is moved rearwardly against the resilient force of the tension coil springs 101, 101. When the slider 35 is moved rearwardly, the guided pins 91, 91 and the pressed pins 92, 92 of the cartridge holder 34 consequently move in the inclined guide grooves 96, 96 and the inclined pressing grooves 97, 97 of the slider 35. Therefore, the cartridge holder 34 moves upwardly with respect to the chassis 33 (see FIGS. 26, 36).

While the slider 35 moves rearwardly, the right side edge of the locked piece 106 of the slider 35 moves rearwardly sliding on the left side edge of the locking portion 105 of the shorter piece 104c of the trigger lever 104. In this manner, the locking condition of the locking member 90 is maintained.

Figure 34:
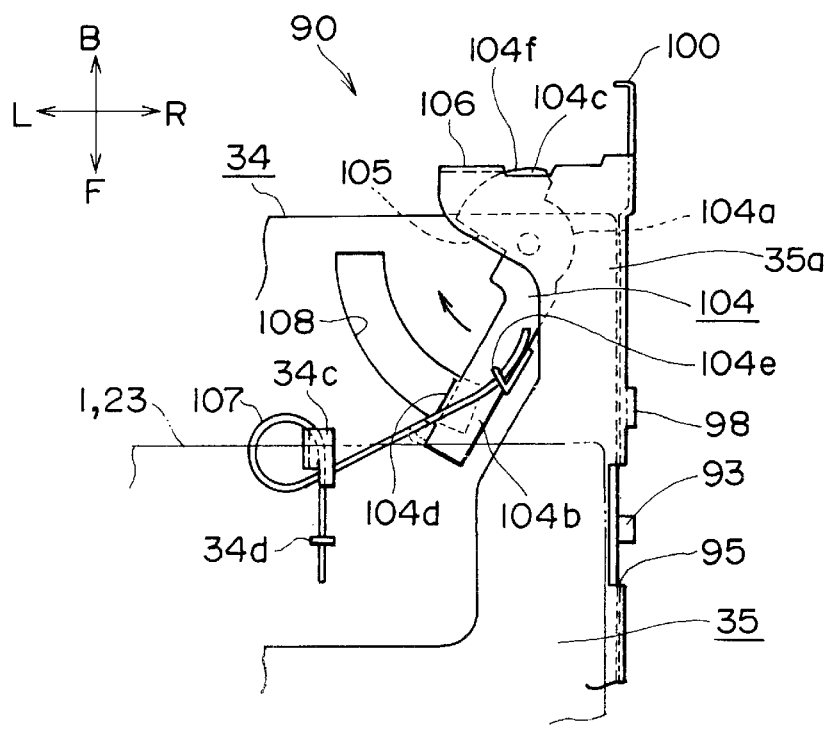
FIG. 34 is an enlarged top plan view illustrating the locking member of FIG. 33 in an unlocking condition.

If the cam protrusion 81 revolves substantially 180 degrees from the initial position A to the position C and the locked piece 106 moves to the end edge 104f of the shorter piece 104c of the trigger lever 104, then the engagement between the locked piece 106 and the locking portion 105 (that is, the locking by the locking member 90) is canceled, and the trigger lever 104 is pivoted in the CCW direction by the torsion coil spring 107 (see FIG. 34).

Such pivotal motion of the trigger lever 104 is relatively quick because of the relatively strong resilient force of the torsion coil spring 107. Consequently, the disk cartridge 1 or 23 is engaged by the trigger lever 104 and ejected with a strong force from the cartridge holder 34 and the front panel 39, thereby completing the ejection operation (see FIGS. 26, 34, 36).

Further, when the disk cartridge 1 or 23 is ejected from the cartridge holder 34, the shutter 10 of the disk cartridge 1 or 23 is slidably moved by the spring 12, and the pair of upper and lower head insertion holes 9, 9 of the cartridge 7 or 27 are closed by the shutter 10.

(13) Head Loading Mechanism

Figure 39:
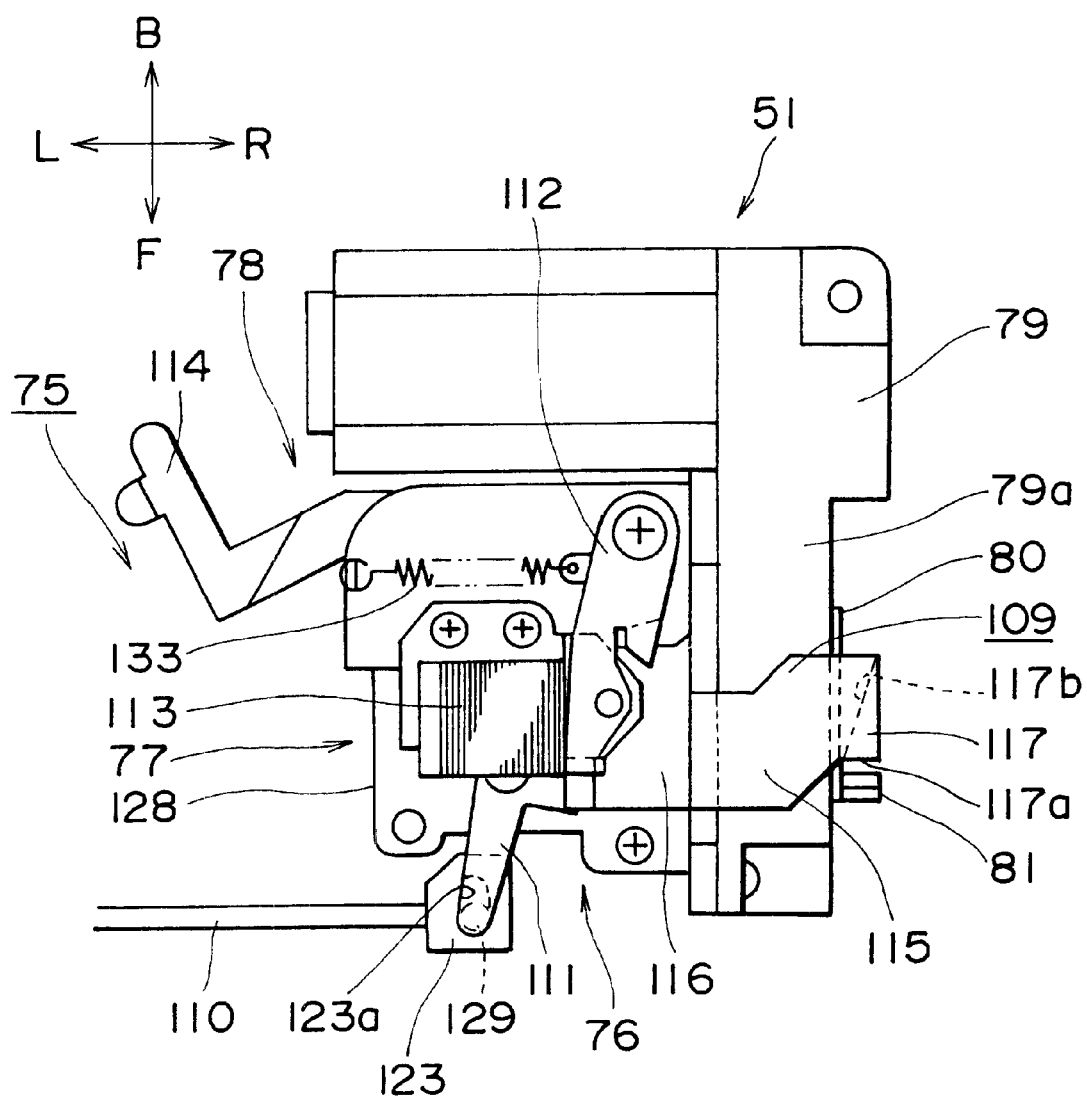
FIG. 39 is a top plan view of the mode selection mechanism and a head loading mechanism of the disk drive apparatus of FIG. 9.

The head loading mechanism 75 includes the head lifting mechanism 76 for causing the magnetic heads 37, 37 to land or takeoff onto or from the floppy disk 4 or 26, the head loading holding mechanism 77 for holding the magnetic heads 37, 37 in a condition (head loading condition) wherein the heads 37, 37 contact the floppy disk 4 or 26, and the head retraction mechanism 78 for moving, when the magnetic heads 37, 37 are removed from the floppy disk 4 or 26, the magnetic heads 37, 37 to the outer circumference side of the floppy disk 4 or 26 (see FIG. 39). As shown in FIG. 39, the head loading mechanism 75 includes a slide member 109 for moving the cam protrusion. 81 to one of a plurality of mode forming arms which are hereinafter described. These mode forming arms include a slide arm 110 for increasing or decreasing the distance between the upper and lower suspensions 66, 66 on which the magnetic heads 37, 37 are supported, a pivotal arm 111 for slidably moving the slide arm 110 in the leftward or rightward directions, an attracted arm 112 for stopping the slide member 109 at a predetermined position, a plunger 113 for attracting the attracted arm 112 and holding the engaged condition of the attracted arm 112 with the slide member 109, and a head retracting arm 114 for compulsorily moving the carriage 64 rearwardly (see FIG. 39).

(13-1) Slide Member

The slide member 109 includes a slide portion 115 having a U-shaped cross section which is opened downwardly and an operation piece 116 provided on a lower end edge of a left side piece of the slide portion 115 which projects leftwardly. The slide portion 115 is supported for sliding movement from above on the casing 79a of the geared motor 79 so that the slide member 109 can be moved in the forward and backward directions (see FIGS. 39 to 41).

A front side edge of a right side piece 117 of the slide portion 115 forms a pressed edge 117a which is pressed by the cam protrusion 81. Further, an inner side face (left side face) 117b of the right side piece 117 is formed as an inclined face which moves toward the rear (see FIGS. 39, 40, 59 to 61).

The right side piece 117 of the slide portion 115 is positioned on the right side with respect to the casing 79a of the geared motor 79 and the cam disk 80 so as to cover them. The pressed edge 117a is positioned on a locus of movement of the cam protrusion 81 on the upper side revolution (in the CW direction). When the cam protrusion 81 revolves in the CW direction, the slide portion 115 is moved rearwardly by the cam protrusion 81. When the slide member 109 is moved rearwardly, the head lifting mechanism 76 is operated as hereinafter described to perform head loading (see FIG. 22).

An engaging protrusion 118 for engaging the attracted arm 112 is formed integrally on an upper face of the operation piece 116. In addition, a projection 119 for pressing the pivotal arm 111 forwardly is formed integrally on a lower face of the operation piece 116 and an engaging groove 120 in the form of an elongated hole is formed integrally at the lower face of the operation piece 116 slightly rearwardly from the projection 119 (see FIG. 40).

The engaging protrusion 118 of the operation piece 116 has a substantially horizontal trapezoidal shape and is formed in such an orientation that the upper side of the trapezoid is provided by the right side edge and the bottom side of the trapezoid is provided by the left side edge. The rear side edge of the trapezoid forms a pressing face 118a which moves forwardly toward the right, and the front side edge of the trapezoid forms the arresting face 118b which moves rearwardly toward the right. Further, the pressing face 118a of the engaging protrusion 118 is formed with an inclination angle of approximately 45 degrees in the CW direction with respect to the front-rear reference line Pfb, and the arresting face 118b of the engaging protrusion 118 is formed with another inclination angle of approximately 20 degrees in the CCW direction with respect to the front-rear reference line Pfb (see FIG. 40).

A front side edge of the projection 119 of the operation piece 116 serves as a pressing portion for pressing the pivotal arm 111 forwardly (see FIGS. 40, 42, 46, 47).

Figure 40:
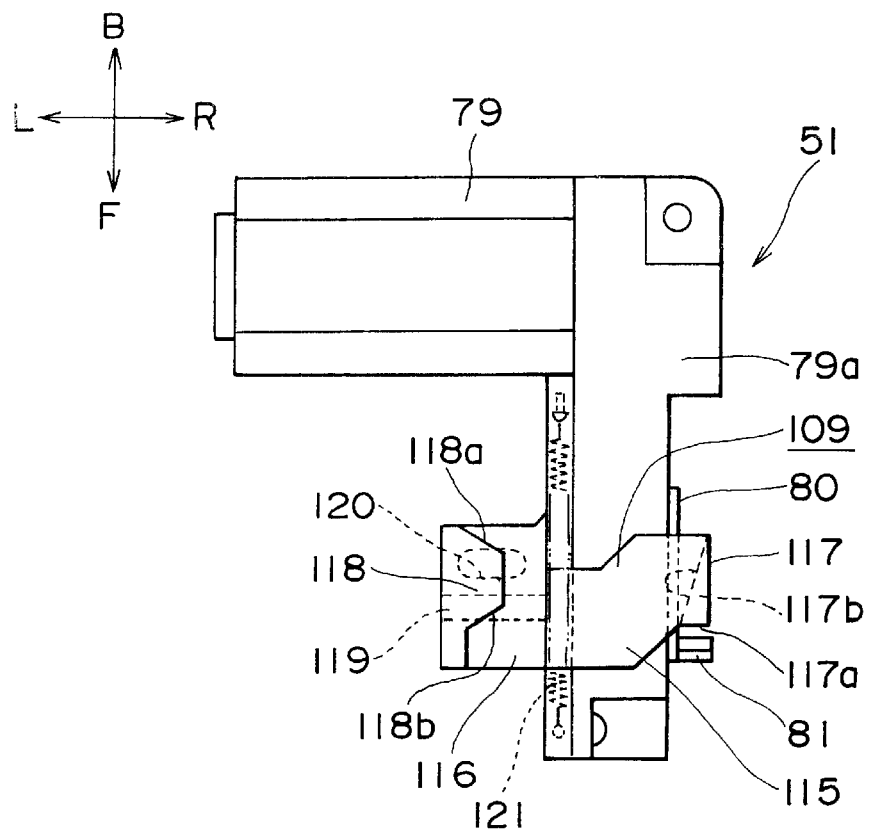
FIG. 40 is a top plan view of the mode selection mechanism of FIG. 39.
Figure 41:
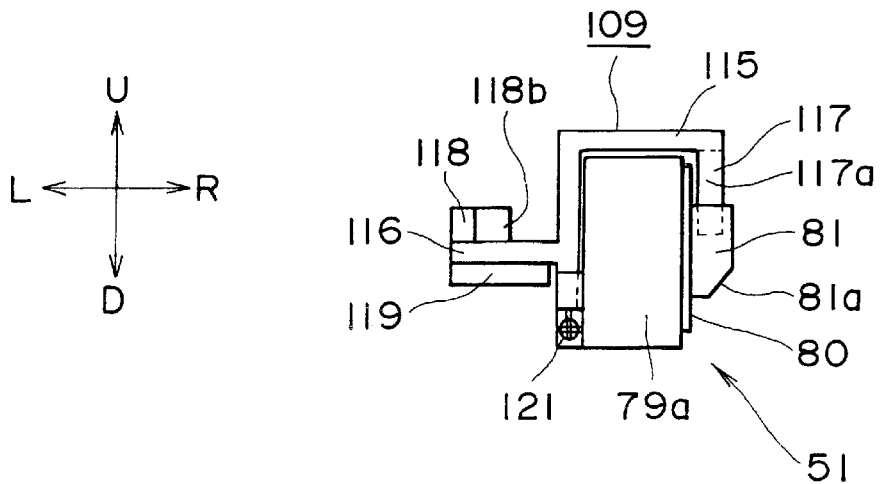
FIG. 41 is a front elevational view of the mode selection mechanism of FIG. 39.
Figure 42:
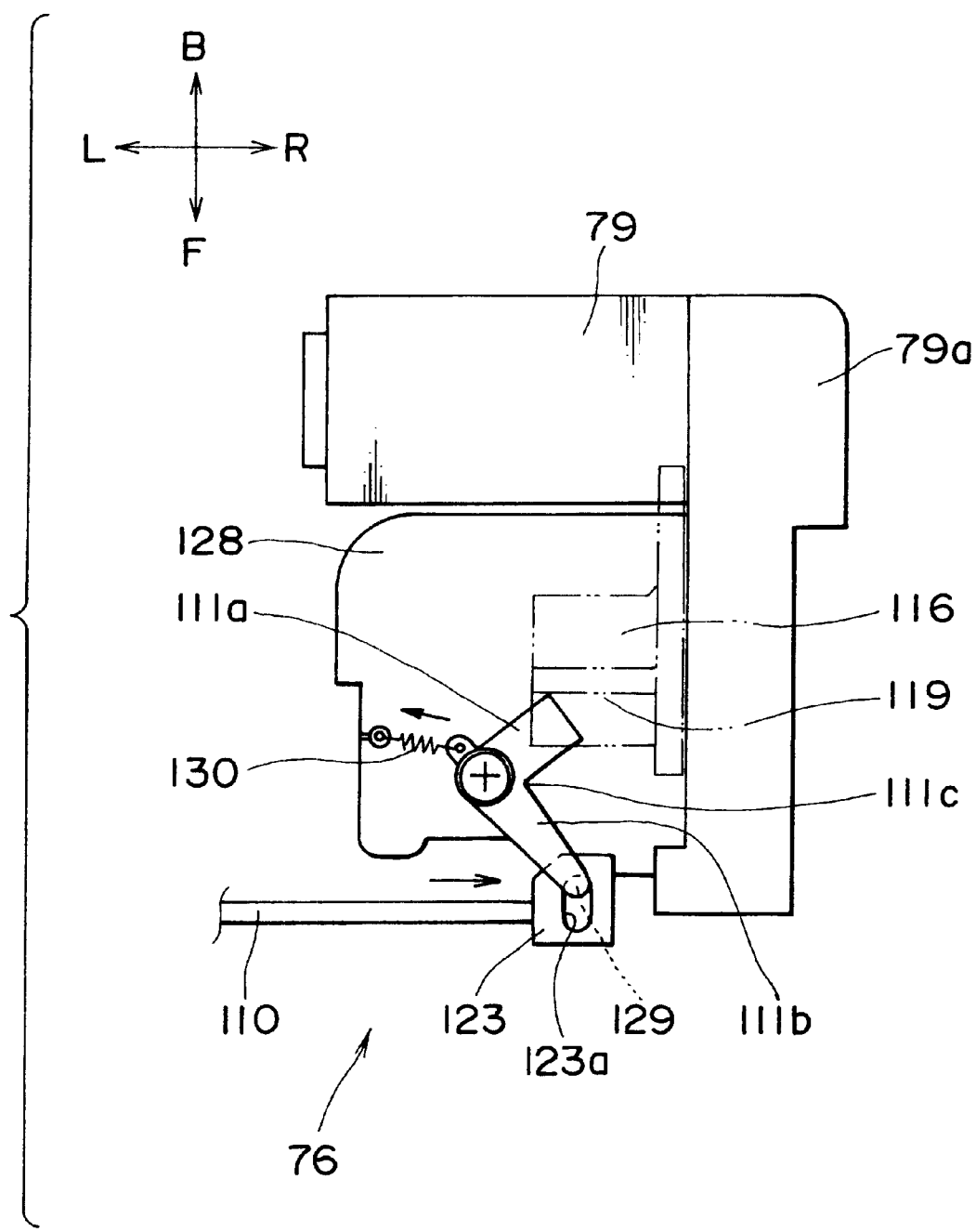
FIG. 42 is a top plan view of a head lifting mechanism of the disk drive apparatus of FIG. 9.

An engaging pin, which is hereinafter described, of the head retracting arm 114 is fitted in the engaging groove 120 of the operation piece 116 (see FIGS. 40, 52, 53).

The slide member 109 as described above is biased forwardly with a comparatively strong force by a tension coil spring 121 serving as a biasing member. Accordingly, when the pressed edge 117a of the slide member 109 is pressed rearwardly by the cam protrusion 81, the slide member is biased against the resilient force of the tension coil spring 121. Further, since the cam protrusion 81 is driven by the geared motor 79, the cam protrusion 81 revolves at a comparatively low speed which in turn moves the slide member 109 rearwardly at a comparatively low speed (see FIG. 22).

(13-2) Slide Arm

The slide arm 110 is in the form of an elongated plate and is positioned such that the thickness thereof coincides with the forward and backward directions. That is, the slide arm 110 is positioned in a vertically placed direction, at a substantially central position between the front-rear reference line Pfb of the chassis 33 and the rear side edge of the chassis 33.

A slit 122 which extends through the slide arm 110 is formed in an approximately ⅓ portion on the left side of the slide arm 110. Further, an engaging portion 123 for engaging with the pivotal arm 111 is provided at a right end portion of the slide arm 110, and an engaged hole 123a in the form of an elongated hole slightly elongated in the forward and backward directions is formed in the engaging portion 123 and extends through the engaging portion 123 in the upward and downward directions (see FIG. 43).

Upper and lower arm portions 124, 124 at the portion of the slide arm 110 at which the slit 122 is formed are displaced upwardly or downwardly toward the ends (left ends) to increase the height dimensions thereof, and end edges 110a, 110a (left end edges) of the slide arm 110 are displaced rightwardly toward the opening edges of the slit 122 from the upper end or the lower end, that is, the central portion in the vertical directions becomes concave. Further, at opposing edge portions at the ends (left ends) of the arm portions 124, 124, protrusions 125, 125 are formed contiguous to the end edges 110a, 110a and approaching each other (see FIG. 43).

Figure 43:
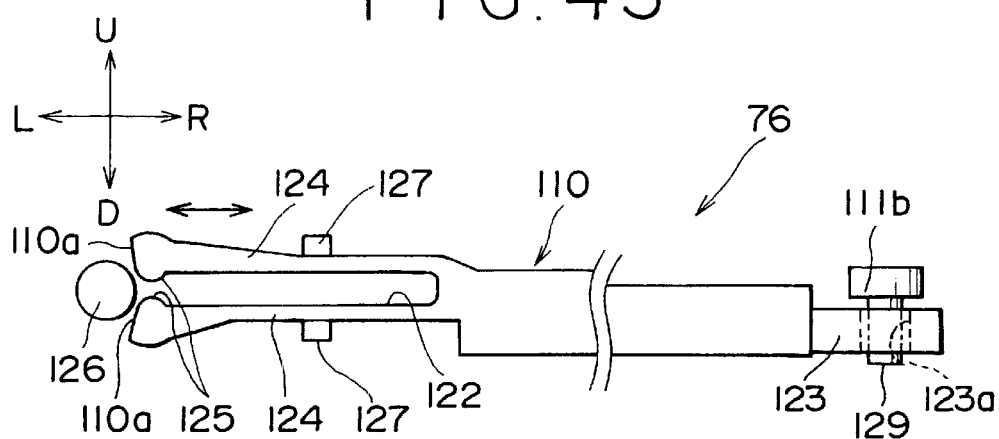
FIG. 43 is a front elevational view of the head lifting mechanism of FIG. 42.

Accordingly, the slit 122 is formed such that the height thereof is fixed but is reduced in height only at the end opening thereof by the protrusions 125, 125 (see FIG. 43).

Figure 44:
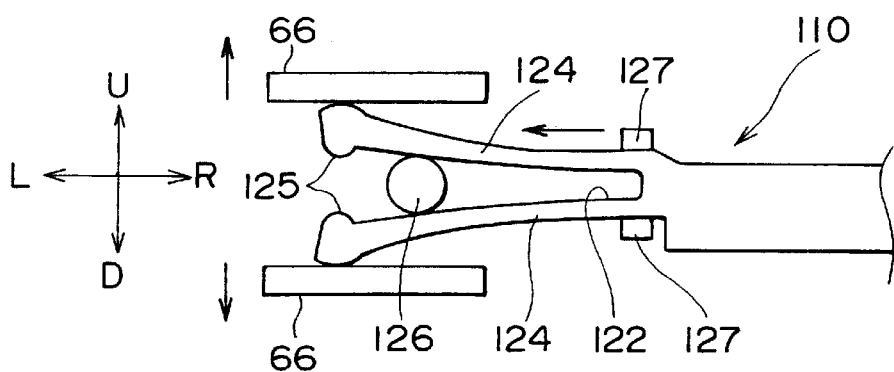
FIG. 44 is an enlarged front elevational view representing the head takeoff operation of the head lifting mechanism of the disk drive apparatus of FIG. 9.
Figure 45:
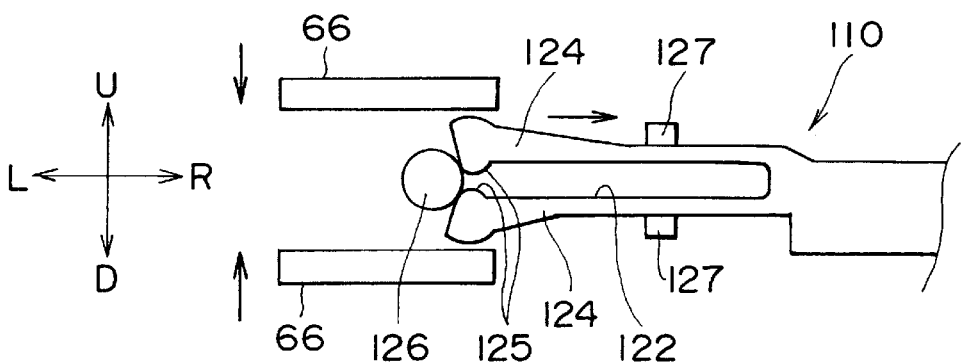
FIG. 45 is an enlarged front elevational view representing the head landing operation of the head lifting mechanism of FIG. 44.

The slide arm 110 is disposed such that the opposite upper and lower arm portions 124, 124 thereof are positioned between the upper and lower suspensions 66, 66 on which the magnetic heads 37, 37 are supported (see FIGS. 44, 45).

At a portion of the chassis 33 at which the slide arm 110 is disposed, a support wall (not shown) for supporting the slide arm 10 for horizontal sliding movement is provided. On the support wall, an insertion shaft 126 is provided which advances into the slit 122 of the slide arm 110 to expand the slit 122. In addition, returning protrusions 127, 127 are provided for holding the slide arm 110 from above and below to return the expanded slide arm 110 rightwardly of the insertion shaft 126 on the support wall (see FIGS. 43 to 45).

The insertion shaft 126 is provided at the support wall (not shown) of the chassis 33 slightly rightwardly of the left-right reference line Plr such that it projects forwardly, and is formed with a diameter slightly greater than the height of the slit 122 (see FIGS. 44, 45).

The returning protrusions 127, 127 are provided at the support wall (not shown) displaced by a distance substantially equal to approximately one half the length of the slit 122 from the insertion shaft 126. The returning protrusions 127, 127 project forwardly. The distance between the returning protrusions 127, 127 is substantially equal to or slightly greater than the height of the slide arm 110 (see FIGS. 43 to 45).

The slide arm 110 is moved by the pivotal arm 111 between a position wherein the insertion shaft 126 contacts with or is spaced slightly from the end edges 110a, 110a (left end edges) of the slit 122 and another position wherein the insertion shaft 126 arrives after the shaft 126 is moved leftwardly to a horizontal position substantially one half the distance of the slit 122 (see FIGS. 44, 45).

Then, when the slide arm 110 is moved leftwardly, the insertion shaft 126 advances into the slit 122 and expands the slit 122 to vertically displace the upper and lower arm portions 124, 124. Consequently, the distance between the suspensions 66, 66 positioned in such a manner as to hold the slide arm 110 therebetween is increased so that the upper side suspension 66 is moved upwardly while the lower side suspension 66 is moved downwardly. Accordingly, the magnetic heads 37, 37 supported at the ends of the opposite upper and lower suspensions 66, 66 are moved upwardly or downwardly, and such upward and downward movements of the magnetic heads 37, 37 act as takeoff movements from the floppy disk 4 or 26 (see FIG. 44).

Then, if the slide arm 110 is moved rightwardly from this condition, the insertion shaft 126 positioned in the slit 122 moves out of the slit 122 and is pressed by the arm portions 124, 124 of the slide arm 110. Consequently, the suspensions 66, 66 which have been displaced upwardly or downwardly are returned to their original condition, and head landing onto the floppy disk 4 or 26 is executed thereby (see FIG. 45). Such head landing is performed when the floppy disk 4 or 26 is being rotated at a predetermined speed by the disk rotational driving mechanism 36.

Further, such head landing and takeoff are performed by slow operations, and so-called soft landing and soft takeoff are achieved.

When head landing is performed, base portion sides of the two upper and lower arm portions 124, 124 are held therebetween by the returning protrusions 127, 127 such that the slide arm 110 is restricted in its vertical range of movement by the returning protrusions 127, 127 so that it does not become greater than the original range of vertical movement. This condition is intended to prevent such a situation that, if movement of the slide arm 110 in the leftward and rightward directions is repeated, the arm portions 124, 124 are repeatedly displaced upwardly or downwardly, by which the arm portions 124, 124 are deformed and cannot be returned to their original condition (see FIG. 45).

(13-3) Pivotal Arm

The pivotal arm 111 has a substantially L-shape and is supported in such orientation that one arm 111a (hereinafter referred to as "pressed arm") thereof extends rightwardly and the other arm 111b (hereinafter referred to as "acting arm") extends forwardly. The pivotal arm 111 is supported at a bent portion 111c thereof for pivotal motion on a base member 128 securely mounted on the casing 79a of the geared motor 79 (see FIG. 42).

The pressed arm 111a of the pivotal arm 111 is positioned on a locus of movement of the projection 119 of the operation piece 116 of the slide member 109. Further, an engaging pin 129 projects from a lower face of the acting arm 111b. The engaging pin 129 is inserted into the engaged hole 123a of the engaging portion 123 of the slide arm 110 (see FIGS. 42, 43).

The pivotal arm 111 is biased in the CCW direction by a coil spring 130. When the slide member 109 is positioned at the rear end in the range of movement thereof, the pivotal motion of the pivotal arm 111 in the CCW direction is stopped by a stopper (not shown). However, when the slide member 109 is positioned at the front end in the range of movement, the pressed arm 111a resiliently engages the projection 119 of the slide member 109 from the front to prevent the pivotal motion of the pivotal arm 111. Consequently, when the slide member 109 moves forwardly, the slide member 109 arrests the pressed arm 111a of the pivotal arm 111 during the forward movement thereof to pivot the pivotal arm 111 in the CW direction (see FIGS. 42, 46, 47).

When the slide member 109 moves forwardly, the pressed arm 111a of the pivotal arm 111 is pushed forwardly by the slide member 109 so that the pivotal arm 111 is in turn pivoted in the CW direction. However, when the slide member 109 moves rearwardly, the pivotal arm 111 is pivoted in the CCW direction by the resilient force of the coil spring 130. Consequently, the forwardly extending engaging pin 129 of the acting arm 111b is moved substantially in the leftward and rightward directions (see FIGS. 46, 47).

Figure 46:
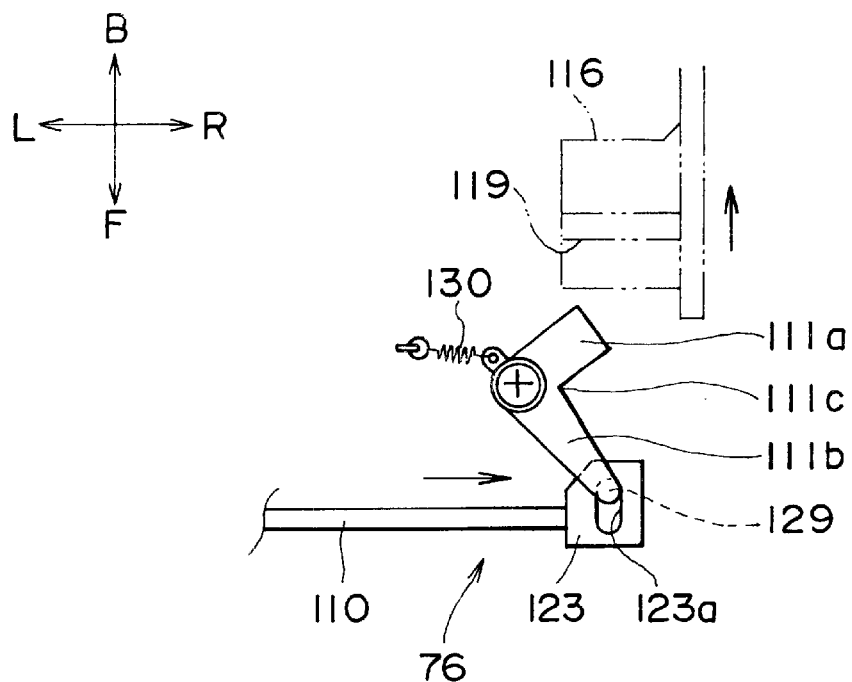
FIG. 46 is an enlarged top plan view representing the head landing operation of the head lifting mechanism of FIG. 44.
Figure 47:
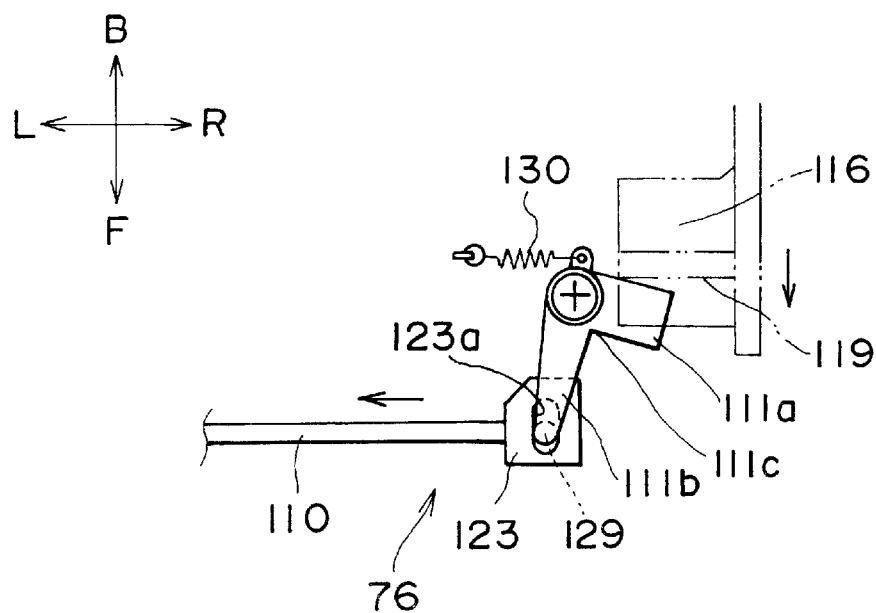
FIG. 47 is an enlarged top plan view representing the head takeoff operation of the head lifting mechanism of FIG. 44.
Figure 48:
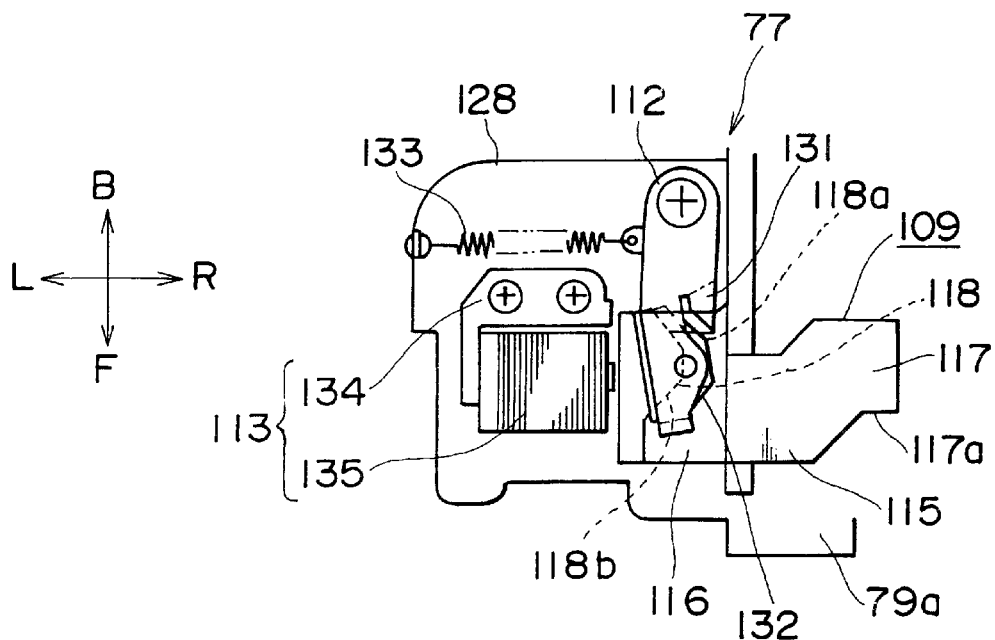
FIG. 48 is a top plan view of a preferred embodiment of head retention mechanism of the disk drive apparatus of FIG. 9.

Further, since the engaging pin 129 projecting from the acting arm 111b of the pivotal arm 111 is held in engagement with the engaged hole 123a of the slide arm 110, the engaging pin 129 acts upon the engaged hole 123a to slidably move the slide arm 110 in the leftward and rightward directions (see FIGS. 46, 47).

Then, when the slide arm 110 is moved in the leftward and rightward directions, the distance between the pair of upper and lower suspensions 66 and 66 on which the magnetic heads 37, 37 are supported is varied by the slide arm 110, and the magnetic heads 37, 37 land onto or removing from the floppy disk 4 or 26.

The landing or removal of the magnetic heads 37, 37 is performed through the head insertion holes 9, 9 of the disk cartridge 1 or 23 whose lid is opened.

In this manner, the head lifting mechanism 76 is formed from the projection 119 of the operation piece 116 of the slide member 109, the pivotal arm 111, and the slide arm 110.

(13-4) Attracted Arm

The attracted arm 112 is elongated in the forward and backward directions and is supported at a rear end portion thereof for pivotal motion on the base member 128. The attracted arm 112 is positioned leftwardly of the slide portion 115 of the slide member 109 and upwardly of the operation piece 116 (see FIGS. 36, 48 to 51).

An arrested projection 131 for engaging the engaging protrusion 118 of the operation piece 116 is formed integrally on a lower face of the attracted arm 112. The arrested projection 131 is positioned on a locus of movement of the engaging protrusion 118 (see FIGS. 48 to 51).

The arrested projection 131 has a substantially trapezoidal shape, and the right side coincides with a right side edge of the attracted arm 112. One of the other sides of the arresting projection 131 (i.e., the front side edge) includes pressed face 131a which is directed leftwardly obliquely forwardly and is pressed by the pressing face 118 of the engaging protrusion 118. Another side of the arresting projection (i.e., the rear side edge) includes an arrested face 131b which is directed slightly obliquely leftwardly from rearwardly and is engaged with the arresting face 118b of the engaging protrusion 118 (see FIGS. 48 to 51).

Further, an attracting piece 132 is attached to a lower face of the attracted arm 112 forwardly of the arrested projection 131 such that the attracting piece 132 can be pivoted within a fixed angle in a direction in which an attracting face thereof is directed leftwardly. The attracting piece 132 is attracted by the plunger 113 when the attracted arm 112 is pivoted in the CW direction. Since the attracting piece 132 is intended to stabilize the attraction condition when the attracting piece 132 is attracted to the plunger 113, the attracting piece 132 is mounted for pivotal motion on the attracted arm 112 (see FIG. 48).

The attracted arm 112 is biased in the CW direction by a coil spring 133. Consequently, when the slide member 109 is positioned rearwardly within a range of movement thereof, the arrested face 131b of the arrested projection 131 is resiliently contacted so that the arrested projection 131 is engaged with the arresting face 118b of the engaging protrusion 118. The direction in which the attracted arm 112 is biased is also a direction in which the attracting piece 132 is attracted to the plunger 113 (see FIGS. 48 to 51).

The coil spring 133 allows the attracted arm 112 to be reliably attracted to the plunger 113 and can normally cause the attracted arm 112 (attracting piece 132) to be held in contact with the plunger 113 (yoke 134) irrespective of whether or not the plunger 113 is in operation. Consequently, adherence of dust and so forth to the contact faces of the attracting piece 132 and the yoke 134 of the plunger 113 can be prevented (see FIGS. 49, 50).

If dust or the like adheres to the contact faces of the attracting piece 132 and the yoke 134 of the plunger 113, then the attracting force is deteriorated. Therefore, in order to keep the attracted condition, a greater amount of current must be supplied. In the present embodiment, however, since dust or the like does not stick to the contact faces, it is only required to supply current sufficient to obtain a necessary and minimum attracting force, and reduction in power is achieved.

(13-5) Plunger

The plunger 113 includes an opened U-shaped yoke 134, and a coil 135 wound around one piece (the piece positioned on the front side) of the yoke 134. The plunger 113 is securely mounted on the base member 128 such that an attracting face of the yoke 134 is directed rightwardly and is opposed adjacent to the attracting piece 132 of the attracted arm 112 (see FIGS. 48 to 51).

Energization of the plunger 113 causes the engaging protrusion 118 of the operation piece 116 of the slide member 109 to arrest the arrested projection 131 of the attracted arm 112. In particular, when the slide member 109 is positioned rearwardly within a range of movement thereof, the attracted arm 112 is pivoted in the CW direction by the coil spring 133. Consequently, the arrested face 131b of the arrested projection 131 of the attracted arm 112 and the arresting face 118b of the engaging protrusion 118 of the operation piece 116 are engaged with each other, and operation of the plunger 113 causes the attracting piece 132 to contact the plunger 113 (see FIG. 50). The plunger 113 retains the attracted condition of the attracting piece 132, and consequently, power requirement for operation of the plunger 113 may be low and the amount of heat generated by the plunger 113 can be suppressed. In addition, by miniaturizing the plunger 113, space reduction is achieved (see FIG. 50).

However, when the plunger 113 is operated, since the attracting piece 132 of the attracted arm 112 is held attracted to the plunger 113 and the arrested face 131b of the arrested projection 131 of the attracted arm 112 and the arresting face 118b of the engaging protrusion 118 of the operation piece 116 of the slide member 109 are engaged with each other, the slide member 109 can be positioned to the rear end portion within the range of movement thereof. Consequently, the condition (head loading condition) wherein the magnetic heads 37, 37 are landed on the floppy disk 4 or 26 is maintained by the head lifting mechanism 76 without pivoting the pivotal arm 111 in the CW direction by the projection 119 of the slide member 109.

Then, the loaded condition of the magnetic heads 37, 37 is canceled by a takeoff operation as hereinafter described. In this instance, if operation of the plunger 113 is interrupted, the contacting force between the plunger 113 and the attracted arm 112 is provided only by the coil spring 133. Consequently, the attracted arm 112 is spaced away from the plunger 113 by the tensile force of the tension coil spring 121 which acts upon the contact faces of the arresting face 118b and the arrested face 131b (see FIG. 51).

In particular, since a comparatively strong forward tensile force of the tension coil spring 121 acts upon the slide member 109 so as to act upon the inclined contact faces of the arresting face 118b and the arrested face 131b (that is, inclined slightly with respect to the front-rear reference line Pfb) force in the rightward direction (CCW direction as viewed from above) acts upon the attracted arm 112. Since the force component is set greater than the biasing force of the coil spring 133 (accurately calculated in terms of torque from a relationship between a point of application and a fulcrum), the attracted arm 112 is pivoted in the CCW direction so that the arresting face 118b and the arrested face 131b are disengaged (see FIG. 51).

Consequently, any element which stops the forward moving force of the slide member 109 is eliminated, and the slide member 109 moves forwardly. When the slide member 109 moves forwardly, since it moves under the guidance of comparatively slow movement of the cam protrusion 81, unloading (takeoff) of the magnetic heads 37, 37 is performed at a low speed. Such a head takeoff operation is hereinafter described in detail.

In this manner, the head retention mechanism 77 for maintaining the head loading condition includes the plunger 113, the attracted arm 112, the arrested face 131b of the arrested projection 131 of the attracted arm 112, and the arresting face 118b of the engaging protrusion 118 of the operation piece 116 of the slide member 109.

(13-6) Head Retracting Arm

The head retracting arm 114 has a deformed W-shape and is supported at a middle location thereof for pivotal motion on a lower face side of the base member 128 beneath the location at which the plunger 113 is securely mounted. An upwardly projecting engaging pin 136 is formed integrally at one end 114a of the head retracting arm 114 while an upwardly projecting pressing pin 137 is formed integrally at the other end 114b of the head retracting arm 114 (see FIGS. 52, 53).

Figure 52:
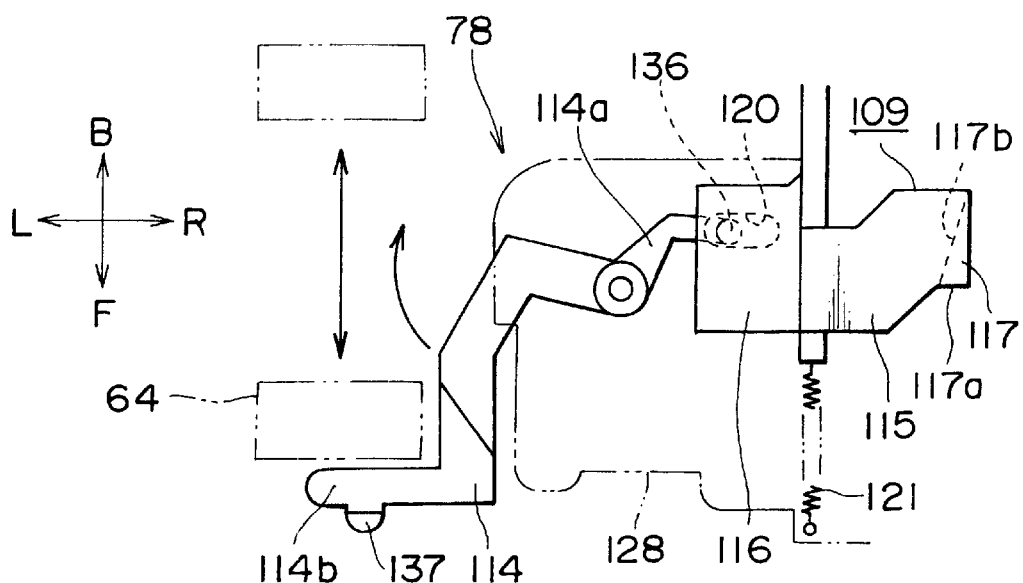
FIG. 52 is a top plan view of a head retracting mechanism for the disk drive apparatus of FIG. 9 specifically illustrating a head retracting arm in the head landing condition.
Figure 53:
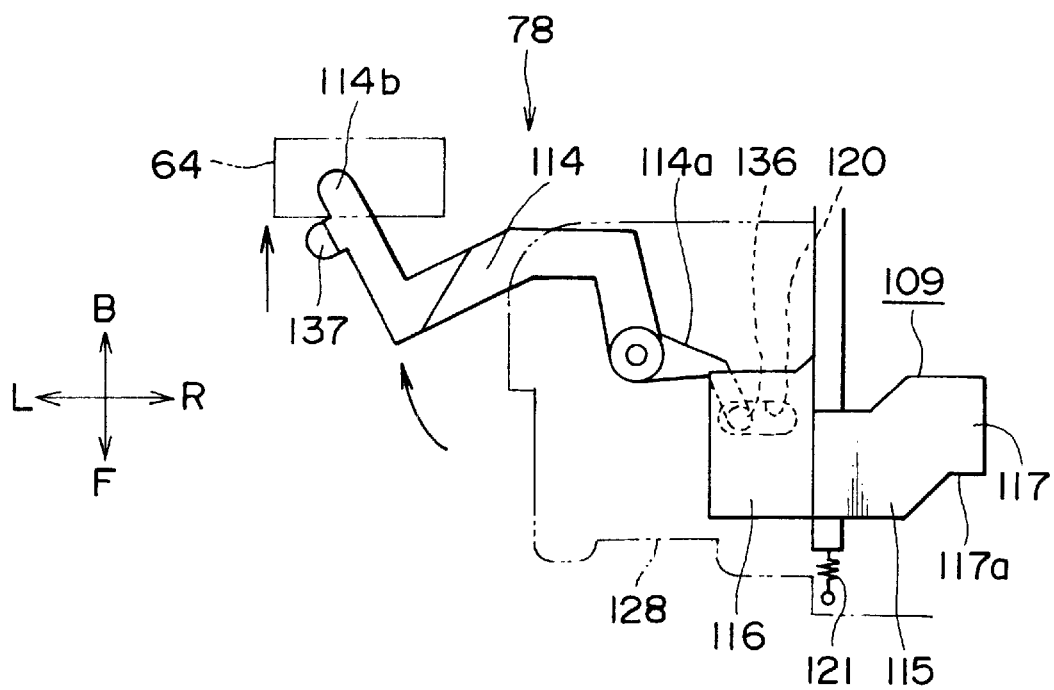
FIG. 53 is a top plan view of the head retracting mechanism of FIG. 52 showing the head retracting arm in its head takeoff condition.

The engaging pin 136 at the one end 114a of the head retracting arm 114 is engaged in the engaging groove 120 of the operating piece 116 of the slide member 109, and the other end 114b of the head retracting arm 114 extends toward the left-right reference line Plr side of the chassis 33 and the pressing pin 137 at the other end 114b contacts with the front side edge of the carriage 64 (see FIGS. 52, 53).

When the slide member 109 moves rearwardly, the engaging pin 136 is in turn moved rearwardly and the head retracting arm 114 is pivoted in the CCW direction to move forwardly the pressing pin 137 at the other end 114b (see FIG. 52). In contrast, when the slide member 109 moves forwardly, the head retracting arm 114 is pivoted in the CW direction to rearwardly move the pressing pin 137 at the other end 114b (see FIG. 53).

When the head retracting arm 114 is pivoted in the CW direction to move the pressing pin 137 at the other end 114b of the head retracting arm 114 rearwardly, the pressing pin 137 is brought into contact with the carriage 64 and moves the carriage 64 rearwardly. Consequently, the magnetic heads 37, 37 are moved to the outer circumference side of the floppy disk 4 or 26. When the head retracting arm 114 is pivoted in the CCW direction, the pressing pin 137 at the other end 114b of the head retracting arm 114 is spaced forwardly away from the carriage 64 (see FIG. 52).

In this manner, the head retraction mechanism 78 for moving the magnetic heads 37, 37 to the outer circumference side of the floppy disk 4 or 26 upon removal thereof is formed from the engaging groove 120 of the slide member 109 and the head retracting arm 114.

(14) Head Loading Operation (Head Landing)

Figure 54:
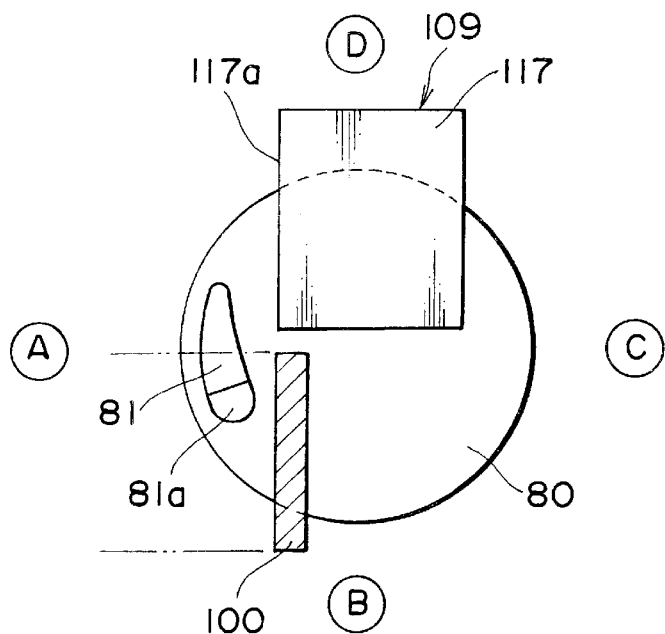
FIG. 54 is a side elevational view illustrating the operation of a mode selection mechanism for the disk drive apparatus of FIG. 9 wherein a cam protrusion is at an initial position A.

Subsequently, if a recording/reproduction instruction is issued in the cartridge loading condition, the spindle motor 59 is rotated at a predetermined speed and the geared motor 79 of the mode selection mechanism 51 is driven to rotate the cam disk 80. As a result, the cam protrusion 81 on the cam disk 80 may revolve in the upper side revolution (in the CW direction as viewed from the right) from the initial position A until the cam protrusion 81 is moved to the position D→Deposition C. Movement of the cam protrusion 81 is slow because the geared motor 79 serves as its driving source (see FIGS. 54 to 56).

By the rotation of the cam protrusion 81 in the CW direction, the cam protrusion 81 is brought into abutment with and arrests against the pressed edge 117a of the right side piece 117 of the slide member 109 to slowly move the slide member 109 rearwardly.

Figure 49:
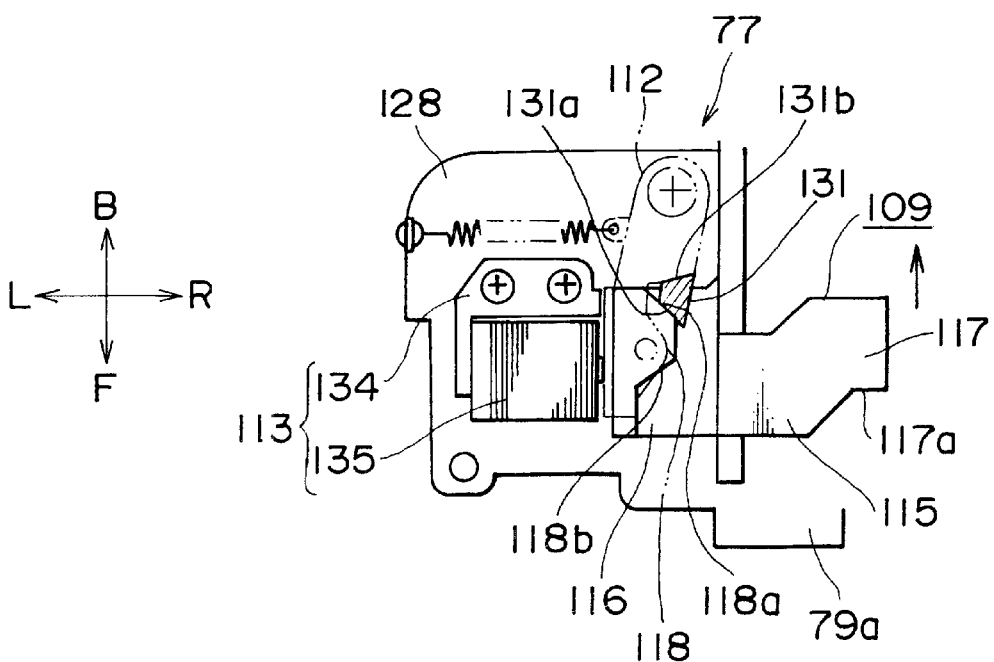
FIG. 49 is a top plan view of the head retention mechanism of FIG. 48 specifically illustrating head landing.
Figure 50:
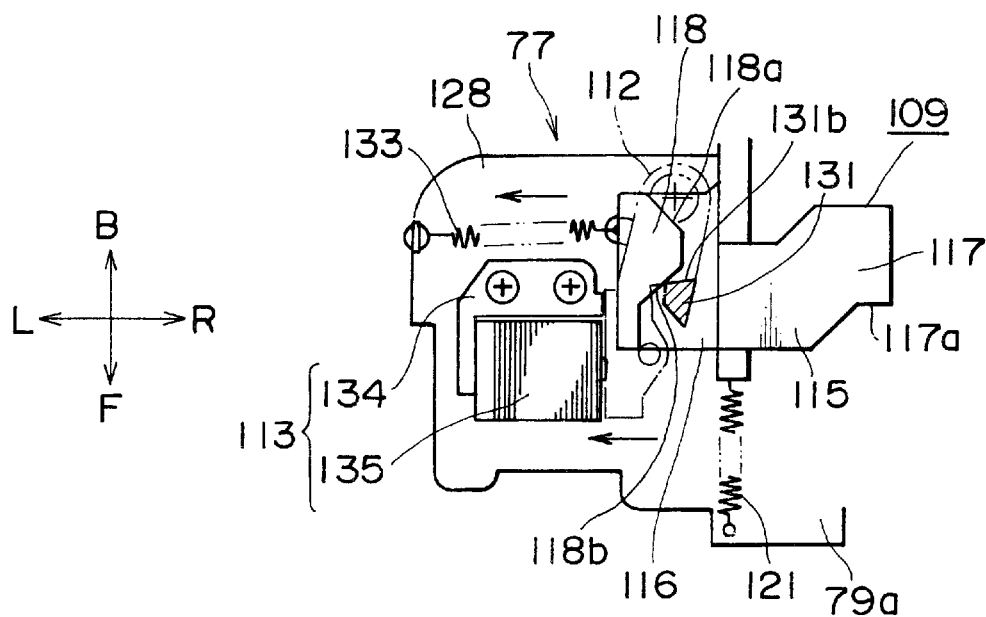
FIG. 50 is a top plan view of the head retention mechanism of FIG. 48 specifically illustrating a condition wherein the head landing condition is maintained.
Figure 51:
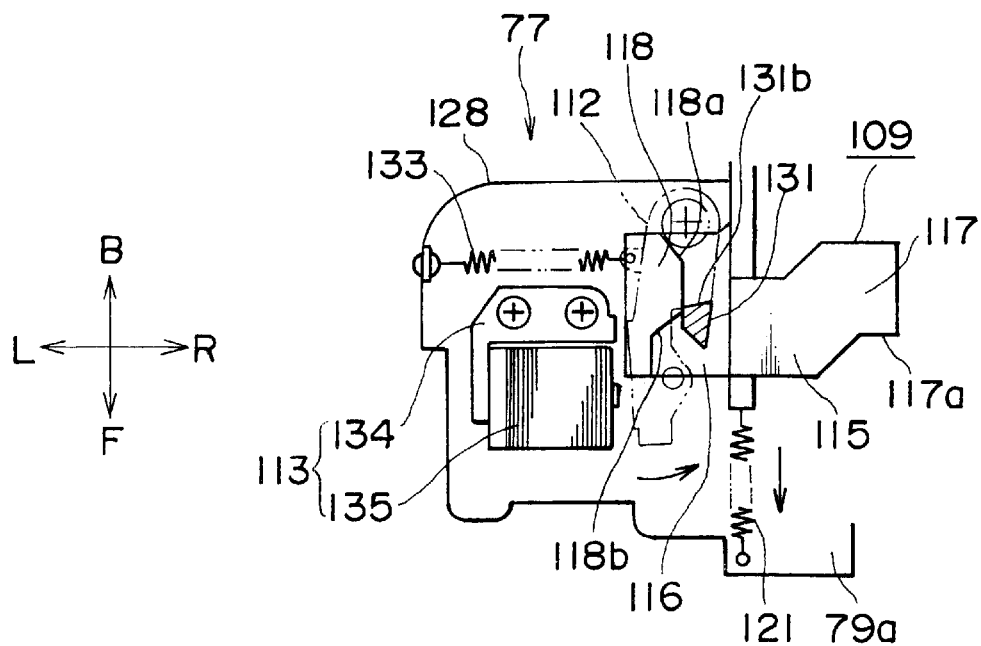
FIG. 51 is a top plan view of the head retention mechanism of FIG. 48 specifically illustrating cancellation of the head landing condition.

The rearward movement of the slide member 109 covers the pressing face 118a of the engaging protrusion 118 formed on the upper face of the operation piece 116 of the slide member 109 to press against the pressed face 131a of the arrested projection 131 of the attracted arm 112 rearwardly so that the attracted arm 112 is pivoted in the CCW direction against the resilient force of the coil spring 133 (see FIG. 49).

Then, when the engaging protrusion 118 of the slide member 109 rides over the arrested projection 131 of the attracted arm 112, the attracted arm 112 is pivoted in the CW direction by the resilient force of the coil spring 133. Thereupon, the arresting face 118b of the engaging protrusion 118 and the arrested face 131b of the arrested projection 131 are engaged with each other to establish arresting engagement between the engaging protrusion 118 and the arrested projection 131 (see FIG. 50).

Further, the attracted arm 112 pivoted in the CW direction is brought into contact at the attracting piece 132 thereof with the plunger 113 and simultaneously the plunger 113 is brought into an operating condition. Consequently, the attracting piece 132 is attracted to the plunger 113.

On the other hand, rearward movement of the operation piece 116 is opposite to the direction in which the operation piece 116 presses against the pressed arm 111a of the pivotal arm 111, and consequently, the pivotal arm 111 is pivoted in the CCW direction by the coil spring 130 (see FIG. 46).

When the pivotal arm 111 is pivoted in the CCW direction, the slide arm 110 is slidably moved rightwardly. The insertion shaft 126 inserted in the slit 122 of the slide arm 110 is relatively moved out of the slit 122 and the arm portions 124, 124 are returned to their initial condition and displaced toward each other. Consequently, the distance between the upper and lower suspensions 66, 66 is decreased and the magnetic heads 37, 37 are brought into contact with the floppy disk 4 or 26 (see FIG. 45).

Since this sequence of operations (head landing) as described above is performed using the geared motor 79 as a driving source, it is performed slowly. Consequently, the contacting of the magnetic heads 37, 37 with the floppy disk 4 or 26 is performed slowly and so-called soft landing of the magnetic heads 37, 37 is achieved.

When head landing is performed, the floppy disk 4 or 26 is already being rotated. Where the HiFD cartridge 23 is loaded, since contacting in a so-called flying state (that is, non-contacting) is performed because the speed of rotation thereof is high, the magnetic heads 37, 37 do not initially contact the floppy disk 26. However, if the landing speed of the magnetic heads 37, 37 upon head landing is high, then they sometimes contact the floppy disk 26 because of their inertia. In the present embodiment, however, since soft landing is achieved, damage to the floppy disk 26 and the magnetic heads 37, 37 can be eliminated.

On the other hand, where the FD cartridge 1 is loaded, although the magnetic heads 37, 37 contact with the floppy disk 4, since the impact becomes higher if the landing speed is higher but is lower if the landing speed is lower, damage to the floppy disk 4 and the magnetic heads 37, 37 can be eliminated.

Further, as the slide member 109 moves rearwardly, since the engaging pin 136 at the other end 114b of the head retracting arm 114 is moved rearwardly, the head retracting arm 114 is pivoted in the CCW direction to move forwardly the pressing pin 137 at the other end 114b thereof Consequently, the pressing pin 137 is spaced away from the carriage 64. Accordingly, the carriage 64 is permitted to move freely in the forward and backward directions irrespective of the condition of the head retracting arm 114 (see FIG. 52).

Then, when soft landing ceases, the carriage 64 and the head arms 63, 63 are moved in the forward and backward directions by the head feeding mechanism 50 in accordance with an instruction signal from the host computer, and the magnetic heads 37, 37 perform scanning (seeking and tracking) on the cartridge center P1 of the floppy disk 4 or 26 to perform recording and/or reproduction of data onto/from the magnetic sheet 2 or 24.

Figure 57:
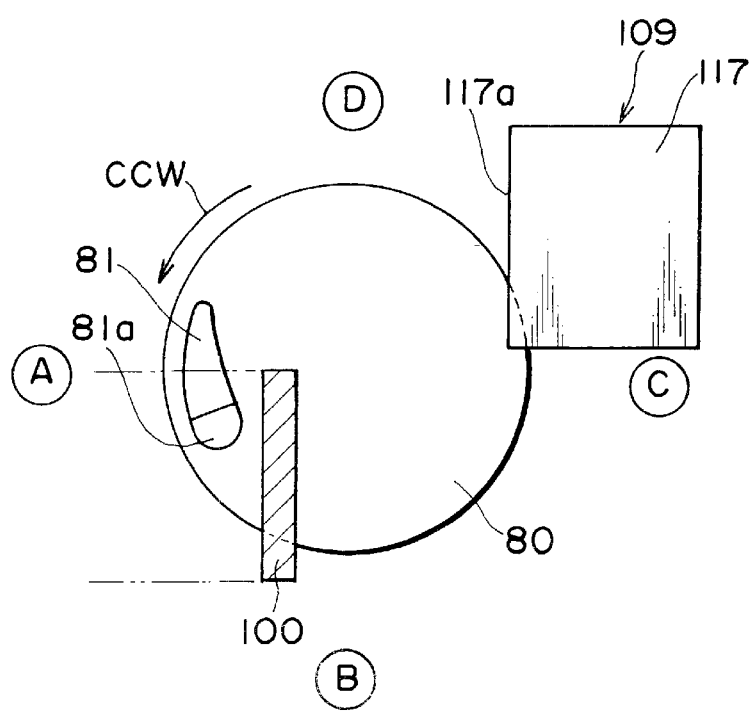
FIG. 57 is a side elevational view illustrating operation of the mode selection mechanism of FIG. 54 specifically illustrating the cam protrusion returning to the initial position A after head landing is completed.

Further, after the cam protrusion 81 moves from the initial position A to the position D→position C to complete head landing, the geared motor 79 is reversed so that the cam disk 80 is rotated in the CCW direction. As a result, the cam protrusion 81 is revolved substantially 180 degrees in the upper side direction to return to the initial position A (see FIG. 57).

In this condition, during recording/reproduction onto/from the floppy disk 4 or 26, the magnetic heads 37, 37 are maintained in the head loading condition by the attracting force of the plunger 113 of the head loading holding mechanism 77.

(15) Head Unloading Operation (Head Takeoff)

Subsequently, if a head unloading (takeoff) instruction is issued, the geared motor 79 of the mode selection mechanism 51 is first driven to rotate the cam disk 80 over approximately 180 degrees in the CW direction. As a result, the cam protrusion 81 is moved from the initial position A to the position D→position C. Consequently, the cam protrusion 81 is moved so that it contacts or is close to the pressed edge 117a of the right side piece 117 of the slide member 109 (see FIG. 56).

Then, the plunger 113 is deenergized. Consequently, the attracting force between the plunger 113 and the attracting piece 132 is removed.

Because the attracting force of the plunger 113 is removed, the plunger 113 is not attracted to the contact faces of the arresting face 118b of the engaging protrusion 118 of the slide member 109 and the arrested face 131b of the arrested projection 131 of the attracted arm 112. Instead, the resilient force of the coil spring 133 and a component of the tensile force of the tension coil spring 121 act upon the contact faces (see FIG. 51).

Then, since the component of the tensile force of the tension coil spring 121 for pivoting the attracted arm 112 in the CCW direction is set to overcome the resilient force of the coil spring 133 biased to pivot the attracted arm 112 in the CW direction, the attracted arm 112 is pivoted in the CCW direction. Consequently, the arresting engagement between the engaging protrusion 118 of the slide member 109 and the arrested projection 131 of the attracted arm 112 is canceled and the slide member 109 is permitted to move forwardly (see FIG. 51).

After the slide member 109 and the attracted arm 112 are disengaged, the slide member 109 tends to energetically move forwardly by the tension coil spring 121. However, since the cam protrusion 81 is present, the pressed edge 117a of the right side piece 117 of the slide member 109 is brought into contact with the cam protrusion 81 (see FIG. 56).

Figure 55:
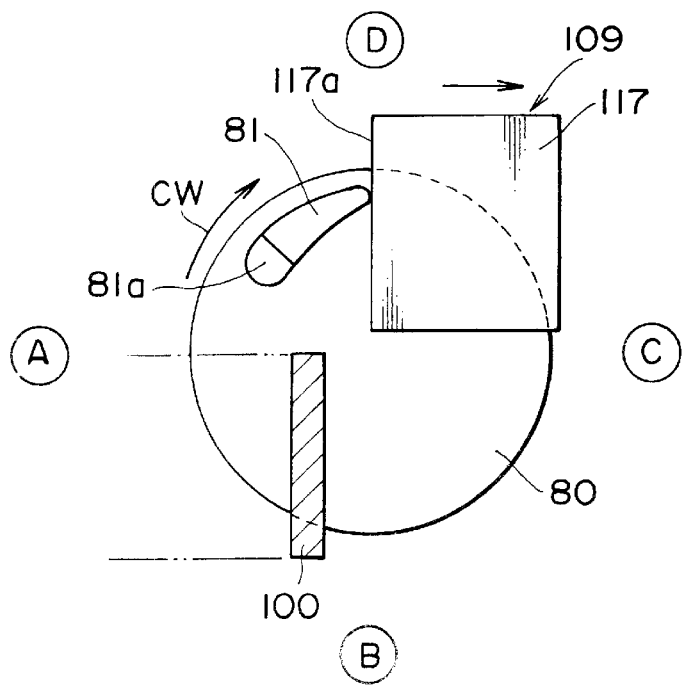
FIG. 55 is a side elevational view of the operation of the mode selection mechanism of FIG. 54 specifically illustrating the cam protrusion at a position D wherein head landing is performed.
Figure 56:
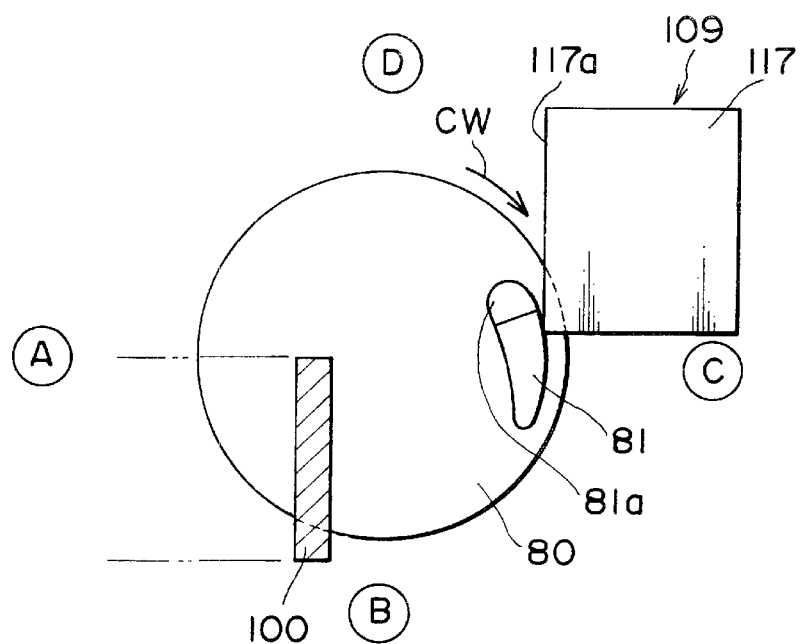
FIG. 56 is a side elevational view of the operation of the mode selection of FIG. 54 specifically illustrating the cam protrusion at a position C wherein head landing is completed.

Then, when the cam protrusion 81 revolves in the upper side revolution direction (CCW direction), the slide member 109 is moved forwardly (see FIG. 55).

Such forward movement of the slide member 109 is performed slowly because the cam protrusion 81 is driven by the geared motor 79.

Then, when the slide member 109 is slowly moved forwardly, the head retracting arm 114 is simultaneously pivoted in the CW direction to move the pressing pin 137 at the other end 114b thereof rearwardly. Consequently, the pressing pin 137 moves the carriage 64 rearwardly, and the magnetic heads 37, 37 are moved to an outer circumference portion of the floppy disk 4 or 26 (see FIG. 53).

Thereafter, the projection 119 of the slide member 109 arrests, intermediately of the forward movement of the slide member 109, the pressed arm 111a of the pivotal arm 111 and pivots the pivotal arm 111 slowly in the CW direction. Consequently, the slide arm 110 is slowly moved leftwardly (see FIG. 47).

When the slide arm 110 moves slowly leftwardly, the insertion shaft 126 is inserted slowly into the slit 122 of the slide arm 110. Consequently, the arm portions 124, 124 are individually deformed upwardly or downwardly to increase the distance between the upper and lower suspensions 66, 66 to move the upper side suspension 66 upwardly and move the lower side suspension 66 downwardly. Accordingly, the magnetic heads 37, 37 supported at the ends of the opposite upper and lower suspensions 66, 66 are individually moved upwardly or downwardly slowly to effect takeoff (see FIG. 44).

In this manner, after the magnetic heads 37, 37 are moved slowly to the outer circumference portion of the floppy disk 4 or 26, the heads 37, 37 are taken off slowly, and so-called soft takeoff is achieved.

Further, as described herein above, the cam protrusion 81 is normally positioned forwardly of the right side piece 117 of the slide member 109 and the arresting portion 100 formed on the right side piece 35r of the slider 35. When the cam disk 80 revolves in the upper side revolution or the lower side revolution, the cam protrusion 81 arrests and moves the right side piece 117 or the arresting portion 100 rearwardly. However, if the cam protrusion 81 is inadvertently positioned rearwardly of the right side piece 117 and the arresting portion 100 (in an abnormal condition) (see FIG. 58), then the normal condition can be restored by rotating the cam disk 80 in the CCW direction.

Figure 58:
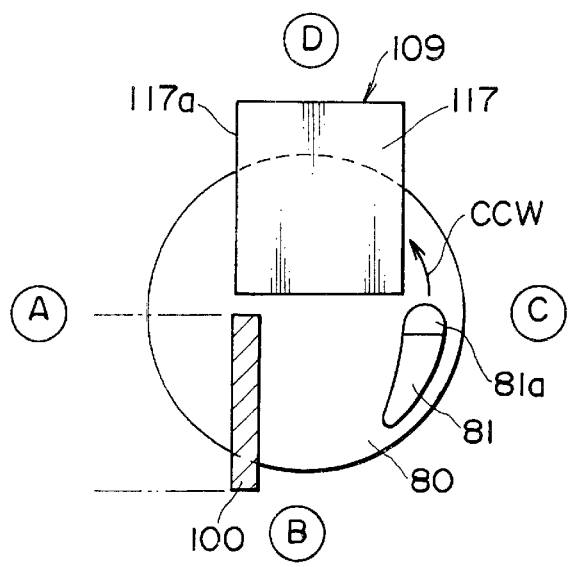
FIG. 58 is a side elevational view of the mode selection mechanism of FIG. 54 illustrating restoration of the cam disk to a normal condition from an abnormal condition wherein the cam protrusion is positioned rearwardly of a right side piece and an arresting portion.
Figure 59:
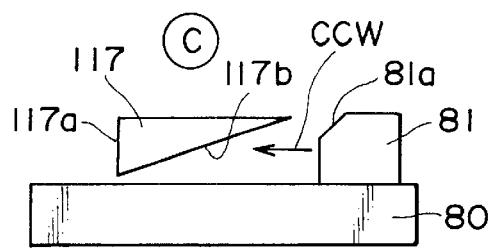
FIG. 59 is a bottom plan view of the cam disk of FIG. 58 in the abnormal condition.
Figure 60:
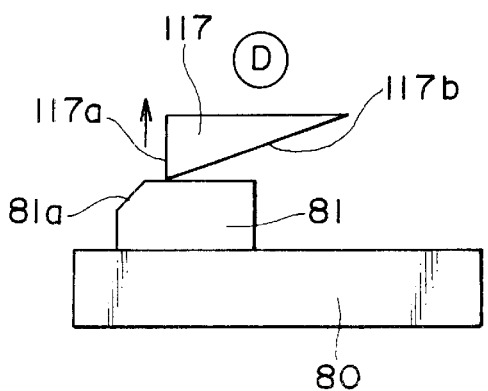
FIG. 60 is a bottom plan view of the cam disk of FIG. 58 illustrating a manner in which the cam disk is returning to its normal condition.
Figure 61:
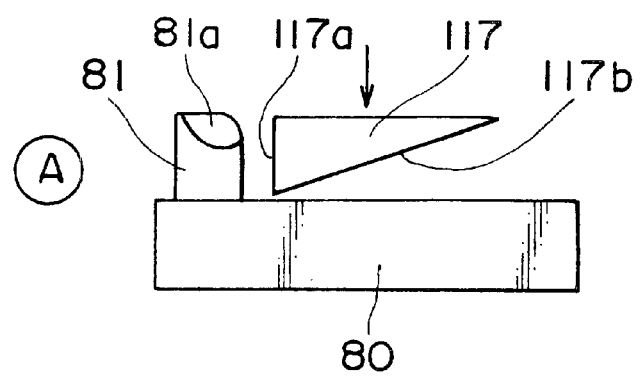
FIG. 61 is a bottom plan view of the cam disk of FIG. 58 illustrating a manner in which the cam disk has returned to its normal condition.
Figure 62:
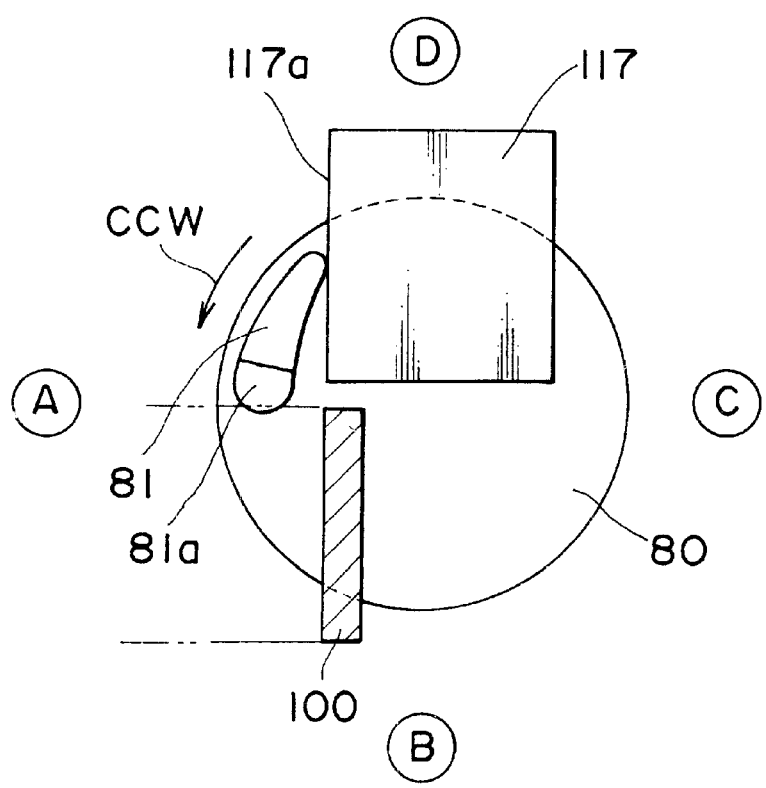
FIG. 62 is a side elevational view of the cam disk of FIG. 58 illustrating a manner in which the cam disk has returned to its normal condition.

In particular, if the cam disk 80 is rotated in the CCW direction, since the inner side face 117b (left side face) of the right side piece 117 is formed as an inclined face, the inclined face 81a of the cam protrusion 81 is contacted with the inner side face 117b of the right side piece 117 from the inner side to press the inner side face 117b outwardly (see FIGS. 58, 59). Consequently, the right side piece 117 is deformed outwardly and the cam protrusion 81 slips into the inner side of the right side piece 117 (see FIG. 60). Then, the cam protrusion 81 returns to the initial position A passing the inner side of the right side piece 117 (see FIGS. 61, 62).

Such an abnormal condition as described above may possibly occur such that, during an ejection operation of the disk cartridge 1 or 23 while the cam protrusion 81 presses the arresting portion 100 of the slider 35 rearwardly, the arresting engagement between the cam protrusion 81 and the arresting portion 100 is lost inadvertently and the arresting portion 100 is positioned rearwardly of the cam protrusion 81. Such a situation as just described results in ejection failure, and an abnormal condition is detected when the position of the cam protrusion 81 detected by the position detection switch 82 is not the position A although the disk cartridge 1 or 23 is in the loading condition and rotation of the cam disk 80 in the CCW direction is executed as described above (see FIGS. 58 to 62).

While that cartridge loading is performed when the slider 35 is moved forwardly but ejection is performed when the slider 35 is moved rearwardly, the FD drive apparatus 30 of the present invention is not limited to this, and it is otherwise possible to design a FD drive apparatus 30 such that, when the slider 35 is moved rearwardly, cartridge loading is performed, but when the slider 35 is moved forwardly, ejection is performed.

Further, the particular shapes and structures of the individual members presented in the embodiment described above are mere examples of embodiment in carrying out the present invention, and the technical scope of the present invention shall not be interpreted as requiring those particular shapes and structures.

As apparent from the foregoing description, a disk drive apparatus according to the present invention is provided which includes a cartridge holder for holding a disk cartridge in which a disk-shaped recording medium is accommodated, the cartridge holder being supported for movement in upward and downward directions with respect to a chassis for moving the disk cartridge between a cartridge loading position and a cartridge unloading position, a slider supported for movement in forward and backward directions with respect to the chassis for moving the cartridge holder in the upward and downward directions by the movement thereof in the forward and backward directions, biasing member for biasing the slider to move the cartridge holder to an eject position, a head supported on a carriage by a head arm and moved to a head landing position at which recording/reproduction onto/from the disk-shaped recording medium in the loading condition of the disk cartridge, a head lifting mechanism for acting upon the head arm in the loading condition of the disk cartridge to move the head from a head loading position at which recording/reproduction of data onto/from the disk-shaped recording medium is possible to a head unloading position at which recording/reproduction of data is impossible and the head lifting mechanism is spaced away from the head arm to allow the head to move from the head unloading position to the head loading position, locking member for locking a positional relationship between the slider and the cartridge holder in the cartridge loading condition of the cartridge holder and unlocking the positional relationship in response to forward or backward movement of the slider, and a rotatable driving member to move the slider forwardly or backwardly to unlock the locking member, and an outputting section of the driving member moves at a low speed and the driving member is rotated in a direction opposite to the direction in which the driving member acts upon the slider to cause the outputting section to act upon the head lifting mechanism to perform head loading of the head.

Accordingly, with the disk drive apparatus of the present invention, unloading (ejection) of a disk cartridge and loading (landing) and/or unloading (takeoff) of the head onto/from a disk-shaped recording medium can be performed by the single driving source, and miniaturization and reduction in weight of the drive apparatus as well as reduction of the number of parts are achieved. Further, since the outputting section of the driving member is moved at a low speed and head loading is performed by the head lifting mechanism, so-called "soft landing" of the head onto the disk is achieved. Consequently, damage to the disk upon head landing is eliminated.

In addition, since the driving means is a geared motor, a reliable operation can be achieved with a simple arrangement.

Meanwhile, a disk drive apparatus according to another aspect of the present invention is designed which includes a head supported on a carriage by a head arm and is moved to a head loading position at which recording/reproduction onto/from a disk-shaped recording medium is possible in a loading condition of a disk cartridge, a head lifting mechanism for acting upon the head arm in the loading condition of the disk cartridge to move the head from a head loading position at which recording/reproduction of data onto/from the disk-shaped recording medium is possible to a head unloading positioning at which recording/reproduction of data is impossible and the head lifting mechanism is spaced away from the head arm to allow the head to move from the head unloading position to the head loading position, a biasing member for biasing the head lifting mechanism in a direction in which the head lifting mechanism acts upon the head arm, and a head retention mechanism wherein a biasing force of the biasing member does not act upon the head lifting mechanism to hold the head in the head loading condition, and that, when the holding by the head retention mechanism is canceled, the head lifting mechanism acts upon the head arm while decreasing the biasing force of the biasing member to perform head unloading.

Accordingly, with the disk drive apparatus of the present invention, while the biasing force by the biasing member in the unloading direction of the head from the disk is attenuated, so-called "soft takeoff" of the head from the disk is achieved. Consequently, damage to the disk upon takeoff is eliminated.

Although the invention has been particularly shown and described with reference to certain preferred embodiments, it will be readily appreciated by those of ordinary skill in the art that various changes and modifications may be made therein without departing from the spirit and scope of the invention. It is intended that the appended claims be interpreted as including the foregoing as well as various other such changes and modifications.

What is claimed is:

1. A disk drive apparatus for recording data on and/or reproducing data from a disk-shaped recording medium, said disk drive apparatus comprising:

a cartridge holder for holding a disk cartridge in which the disk-shaped recording medium is accommodated, said cartridge holder being supported for movement in upward and downward directions with respect to a chassis for moving the disk cartridge between a cartridge loading position and a cartridge unloading position, a slider supported for movement in forward and backward directions with respect to said chassis for moving said cartridge holder in the upward and downward directions by the movement thereof in the forward and backward directions, biasing means for biasing said slider to move said cartridge holder to an eject position, head means for recording data on or reproducing data from the disk-shaped recording medium, said head means supported by a head arm and movable between a head loading position and a head unloading position, a head lifting mechanism for acting upon said head arm to move said head means between the head loading position and the head unloading position, locking means for locking a positional relationship between said slider and said cartridge holder in the cartridge loading position of said cartridge holder and unlocking the positional relationship in response to forward or backward movement of said slider, and driving means rotatable between a first direction and a second direction opposite to the first direction for moving said slider to unlock said locking means when said driving means is rotated in the first direction, wherein when said driving means is rotated in the second direction at a low speed and said driving means acts upon said head lifting mechanism, said head means is retained in its loading position.

2. The disk drive apparatus according to claim 1, wherein said driving means comprises a geared motor.

3. The disk drive apparatus according to claim 1, wherein said head means and said head arm are provided at both sides of the disk shaped recording medium.

4. The disk drive apparatus according to claim 3, wherein said head lifting mechanism moves said both sides of the head arm between the head loading position and the head unloading position.

5. The disk drive apparatus according to claim 1, wherein said head lifting mechanism comprises a moving portion which acts upon said head arm to move said head arm to the head loading position when the moving portion moves in a first direction and said moving portion acts upon said head arm to move said head arm to the head unloading position when the moving portion moves in a second direction.

6. The disk drive apparatus according to claim 1, wherein said disk drive apparatus further comprises:

a biasing member for biasing said head lifting mechanism in a direction in which said head lifting mechanism acts upon said head arm to move said head arm to the head unloading position, and a head retention mechanism for holding said head lifting mechanism at a position wherein a biasing force of said biasing member does not act thereupon, wherein when said head retention mechanism is disengaged from said head lifting mechanism, said driving means is rotated in the second direction at a low speed and said driving means acts upon said head lifting mechanism so that said lifting mechanism acts upon said head arm while decreasing the biasing force of said biasing member so as to move said head arm to the head unloading position.

7. The disk drive apparatus according to claim 1, wherein said head retention mechanism comprises a plunger.

8. A disk drive apparatus for recording data on and/or reproducing data from a disk-shaped recording medium, said disk drive apparatus comprising:

a cartridge holder for holding a disk cartridge in which the disk-shaped recording medium is accommodated, said cartridge holder being supported for movement in upward and downward directions with respect to a chassis for moving the disk cartridge between a cartridge loading position and a cartridge unloading position, moving means for moving said cartridge holder in the upward and downward directions, head means for recording/reproducing data onto/from the disk-shaped recording medium, head supporting means for supporting head means, a head lifting mechanism for acting upon said head supporting means to move said head means from the head loading position, wherein recording/reproducing data onto/from the disk-shaped recording medium is possible, to a head unloading position, wherein recording/reproducing of data is impossible, said head lifting mechanism being capable of acting upon said head supporting means to move said head means from the head unloading position to the head loading position, and driving means for driving said moving means and said head lifting mechanism, wherein said driving means is rotated between a first direction, wherein said moving means moves said cartridge holder in the upward direction, and a second direction opposite to the first direction, wherein said head lifting mechanism acts upon said head supporting means to move said head means from the head unloading position to the head loading position.

* * * * *